US010775543B2

(12) United States Patent
Harada et al.

(10) Patent No.: US 10,775,543 B2
(45) Date of Patent: Sep. 15, 2020

(54) LIGHTING DEVICE, DISPLAY DEVICE, TELEVISION DEVICE, AND METHOD FOR MANUFACTURING WAVELENGTH CONVERTER

(71) Applicant: SHARP KABUSHIKI KAISHA, Sakai, Osaka (JP)

(72) Inventors: Masanobu Harada, Sakai (JP); Akira Gotou, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 135 days.

(21) Appl. No.: 15/762,449

(22) PCT Filed: Sep. 23, 2016

(86) PCT No.: PCT/JP2016/077958
§ 371 (c)(1),
(2) Date: Mar. 22, 2018

(87) PCT Pub. No.: WO2017/051848
PCT Pub. Date: Mar. 30, 2017

(65) Prior Publication Data
US 2018/0275331 A1    Sep. 27, 2018

(30) Foreign Application Priority Data

Sep. 25, 2015    (JP) .................................. 2015-188508
Sep. 25, 2015    (JP) .................................. 2015-188611

(51) Int. Cl.
*F21V 8/00*      (2006.01)
*G02F 1/13357*   (2006.01)
*G02F 1/1333*    (2006.01)

(52) U.S. Cl.
CPC .........  *G02B 6/0023* (2013.01); *G02B 6/0065* (2013.01); *G02B 6/0068* (2013.01);
(Continued)

(58) Field of Classification Search
CPC .. G02B 6/0023; G02B 6/0065; G02B 6/0068; G02B 6/0088; F21V 9/30; G02F 1/1336;
(Continued)

(56) References Cited

U.S. PATENT DOCUMENTS

2006/0268537 A1    11/2006   Kurihara et al.
2013/0114301 A1*   5/2013    Um ...................... G02B 6/0023
                                                          362/621
(Continued)

FOREIGN PATENT DOCUMENTS

EP    2650721 A1    10/2013
JP    3114805 B2    12/2000

*Primary Examiner* — Cara E Rakowski
*Assistant Examiner* — Jessica M Apenteng
(74) *Attorney, Agent, or Firm* — ScienBiziP, P.C.

(57) ABSTRACT

A backlight unit includes LEDs a light guide plate, and a wavelength converter. The light guide plate includes a light entering end surface and a light exiting plate surface. The light entering end surface is at least a section of an outer peripheral end surface of the light guide plate. The light exiting plate surface is a plate surface of the light guide plate. The wavelength converter is interposed among the LEDs and the light entering end surface to extend along the length direction of the light entering end surface. The wavelength converter includes phosphors configured to wavelength-convert light. The wavelength converter is configured such that at least any one of end portions in the length direction is formed as a great light emission portion configured to emit a greater amount of wavelength-converted light per unit length in the length direction than that of a center portion.

8 Claims, 59 Drawing Sheets

(52) U.S. Cl.
CPC ......... *G02B 6/0088* (2013.01); *G02F 1/1336* (2013.01); *G02F 1/133615* (2013.01); *G02F 1/133308* (2013.01); *G02F 2001/13332* (2013.01); *G02F 2001/133314* (2013.01); *G02F 2001/133317* (2013.01); *G02F 2001/133614* (2013.01)

(58) Field of Classification Search
CPC ... G02F 1/133615; G02F 2001/133314; G02F 2001/133317; G02F 2001/13332; G02F 2001/133614
USPC ....................................................... 362/608
See application file for complete search history.

(56) References Cited

U.S. PATENT DOCUMENTS

2014/0009959 A1    1/2014  Park
2015/0219311 A1*   8/2015  Cho .................... G02B 6/0065
                                                       362/608

* cited by examiner

LIGHTING DEVICE, DISPLAY DEVICE, TELEVISION DEVICE, AND METHOD FOR MANUFACTURING WAVELENGTH CONVERTER

TECHNICAL FIELD

The present invention relates to a lighting device, a display device, a television device, and the method for manufacturing a wavelength converter.

BACKGROUND ART

A backlight described in Patent Document 1 described below has been known as an example of a backlight used for a typical liquid crystal display device. A planar light source as the backlight described in Patent Document 1 includes LEDs configured to emit blue light, a wavelength converter including a fluorescent substance excited by light emission from the LEDs to emit fluorescent light, and a light guide plate provided through the LEDs and the wavelength converter and configured to take in, through an end surface thereof, synthesized light of the light emitted from the LEDs and the light emitted from the fluorescent substance to release the light from a light emission observation surface side.

PATENT DOCUMENT

Patent Document 1: Japanese Patent No. 3114805

Problem to be Solved by the Invention

The wavelength converter as in Patent Document 1 described above extends along the length direction of the end surface of the light guide plate, but the region provided with no fluorescent substance is formed at the edge of the wavelength converter in the length direction thereof. With advancement of frame-size reduction of the backlight, a position relationship in which the region of the wavelength converter provided with no fluorescent substance overlaps with the LED is easily brought. Due to such a relationship, the light from the LEDs, without being wavelength-converted by the phosphor, enters an end portion of the end surface of the light guide plate in the length direction thereof, and therefore, occurrence of color unevenness has been concerned.

DISCLOSURE OF THE PRESENT INVENTION

The present invention has been made in view of the above-described circumstances, and an object of the present invention is to reduce occurrence of color unevenness.

Means for Solving the Problem

A lighting device of the present invention includes a light source, a light guide plate, and at least one wavelength converter. The light guide plate includes a light entering end surface is at least a section of an outer peripheral end surface of the light guide plate through which light from the light source enters. The light exiting plate surface is one of plate surfaces of the light guide plate through which the light exits. The at least one wavelength converter extends along a length direction of the light entering end surface and interposed between the light source and the light entering end surface. The at least one wavelength converter includes a phosphor configured to wavelength-convert the light from the light source. The wavelength converter is configured such that at least any one of end portions in the length direction is formed as a great light emission portion configured to emit a greater amount of wavelength-converted light per unit length in the length direction than that of a center portion.

With this configuration, the light emitted by the light source is wavelength-converted by the phosphor contained in the wavelength converter interposed between the light source and the light entering end surface. The light then enters the light guide plate through the light entering end surface and travels through the light guide plate. Thereafter, the light exits through the light exiting plate surface. This wavelength converter extends along the length direction of the light entering end surface, but the region provided with no phosphor is formed at the edge of the wavelength converter in the length direction thereof. With advancement of frame-size reduction of the lighting device, a position relationship in which the region of the wavelength converter provided with no phosphor overlaps with the light source is easily brought. Due to such a relationship, the light from the light source may enter the light guide plate through an end portion of the light entering end surface in the length direction thereof without wavelength conversion by the phosphor. In response, the wavelength converter is configured such that at least any one of the end portions in the length direction is formed as the great light emission portion configured to emit a greater amount of wavelength-converted light per unit length in the length direction of the light entering end surface than that of the center portion. Thus, even when the region provided with no phosphor is formed at the edge of the wavelength converter in the length direction and the position relationship in which such a region overlaps with the light source is brought, the light from the light source is efficiently wavelength-converted by the great light emission portion. With this configuration, a difference is less likely to be produced between the color tone of light that enters the light guide plate through the end portion of the light entering end surface in the length direction and the color tone of light that enters the light guide plate through a center portion of the light entering end surface in the length direction. Even with advancement of frame-size reduction, color unevenness is less caused in the light output from the light exiting plate surface.

As a different aspect, the lighting device of the present invention includes a light source, a light guide plate, a main wavelength converter, and a secondary wavelength converter. The light guide plate includes a light entering end surface is at least a section of an outer peripheral end surface through which light from the light source enters. The light exiting plate surface is one of plate surfaces through which the light exits. The main wavelength converter extends along the length direction of the light entering end surface and interposed between the light source and the light entering end surface. The main wavelength converter includes a phosphor configured to wavelength-convert the light from the light source. The secondary wavelength converter is disposed in at least an end portion of the main wave length converter in the length direction to wavelength-convert the light from the light source.

With this configuration, the light emitted by the light source is wavelength-converted by the phosphor contained in the main wavelength converter interposed between the light source and the light entering end surface. The light then enters the light guide plate through the light entering end surface of the light guide plate and travel through the light guide plate. Thereafter, the light exits through the light exiting plate surface. The main wavelength converter extends along the length direction of the light entering end surface, but the region provided with no phosphor is formed at the edge of the main wavelength converter in the length direction thereof. With advancement of frame-size reduction of the lighting device, a position relationship in which the region of the main wavelength converter provided with no phosphor overlaps with the light source is easily brought. Due to such a relationship, the light from the light source may enter the light guide plate through an end portion of the light entering end surface in the length direction thereof without wavelength conversion by the phosphor. In response, secondary wavelength converter configured to wavelength-convert the light from the light source is provided in at least the end portion of the main wavelength converter in the length direction. Thus, even when the region provided with no phosphor is formed at the edge of the main wavelength converter in the length direction and the position relationship in which such a region overlaps with the light source in the length direction is brought, non-wavelength-converted light contained in the light having transmitted through the end portion of the main wavelength converter in the length direction can be wavelength-converted by the secondary wavelength converter. With this configuration, a difference between the color tone of light input to the end portion of the light entering end surface of the light guide plate in the length direction and the color tone of light input to a center portion of the light entering end surface in the length direction is less caused. Even with advancement of frame-size reduction, color unevenness is less likely to occur in the light exiting from the light exiting plate surface.

For solving the above-described problem, a display device of the present invention includes any of the above-described lighting devices and a display panel configured to display an image by means of light emitted by the lighting device. According to the display device with such a configuration, color unevenness is less likely to occur in the light from the lighting device, and therefore, displaying can be realized with excellent display quality. Moreover, for solving the above-described problem, a television device of the present invention includes the above-described display device. According to such a television device, excellent display quality of the display device is provided, and therefore, displaying of a television image can be realized with excellent display quality.

For solving the above-described problem, the method for manufacturing the wavelength converter according to the present invention is provided. The method for manufacturing a wavelength converter which is interposed between a light source and a light entering end surface through which light from the light source enters and which includes a phosphor configured to wavelength-convert the light from the light source. The method includes a container producing step of producing a container extending along the length direction of the light entering end surface in a state in which at least any one of end portions of the container in the length direction opens; a first phosphor solution injection step of injecting a first phosphor solution containing a phosphor in a light curable resin material into the container through an opening thereof, thereby arranging the first phosphor solution in at least a center portion of the container in the length direction; a first phosphor solution hardening step of irradiating the first phosphor solution injected into the container with light, thereby hardening the first phosphor solution; a second phosphor solution injection step of injecting a second phosphor solution having a higher concentration of the contained phosphor than that of the first phosphor solution into the container through the opening thereof, thereby arranging the second phosphor solution in at least any one of the end portions of the container in the length direction; a second phosphor solution hardening step of irradiating the second phosphor solution injected into the container with light, thereby hardening the second phosphor solution; and a sealing step of sealing the opening of the container.

First, at the first phosphor solution injection step, the first phosphor solution containing the phosphor in the light curable resin material is, through the opening, injected into the container manufactured through the container producing step. At this step, the injected first phosphor solution is arranged in at least the center portion of the container in the length direction thereof. In this state, the first phosphor solution hardening step is performed to harden the first phosphor solution with the light. Subsequently, at the second phosphor solution injection step, the second phosphor solution having a higher concentration of the contained phosphor than that of the first phosphor solution is injected into the container through the opening. The first phosphor solution has been injected and hardened in advance in at least the center portion of the container in the length direction thereof, and therefore, the second phosphor solution injected at the second phosphor solution injection step is, without being mixed with the first phosphor solution, arranged in at least any one of the end portions of the container in the length direction thereof. In this state, the second phosphor solution hardening step is performed to harden the second phosphor solution with the light. Then, the opening of the container is sealed at the sealing step. The wavelength converter manufactured as described above is interposed between the light source and the light entering end surface, and therefore, the light emitted from the light source can be input to the light entering end surface after having been wavelength-converted by the phosphor. In this state, the region provided with no phosphor is formed at the edge of the wavelength converter in the length direction. With advancement of the frame-size reduction of the lighting device, the position relationship in which the region of the wavelength converter provided with no phosphor overlaps with the light source is easily brought. Due to such a relationship, input of the light from the light source to an end portion of the light entering end surface of the light guide plate in the length direction thereof without wavelength conversion of the light by the phosphor has been concerned. In response, the wavelength converter is configured such that the second phosphor solution having a higher concentration of the contained phosphor than that of the first phosphor solution arranged at the center portion is arranged in at least any one of the end portions in the length direction of the light entering end surface. Thus, even when the region provided with no phosphor is formed at the edge of the wavelength converter in the length direction and the position relationship in which such a region overlaps with the light source is brought, the light of the light source is efficiently wavelength-converted by the phosphor contained in the second phosphor solution. With this configuration, a difference between the color tone of light input to the end portion of the light entering end surface of the light guide plate in the length direction and the color tone of light input to a center portion of the light entering end surface in the length direction is less caused. Even with advancement of frame-size reduction, color unevenness is less caused.

Advantageous Effect of the Invention

According to the present invention, occurrence of color unevenness can be reduced.

BEST MODE FOR CARRYING OUT THE INVENTION

First Embodiment

Figure 3:
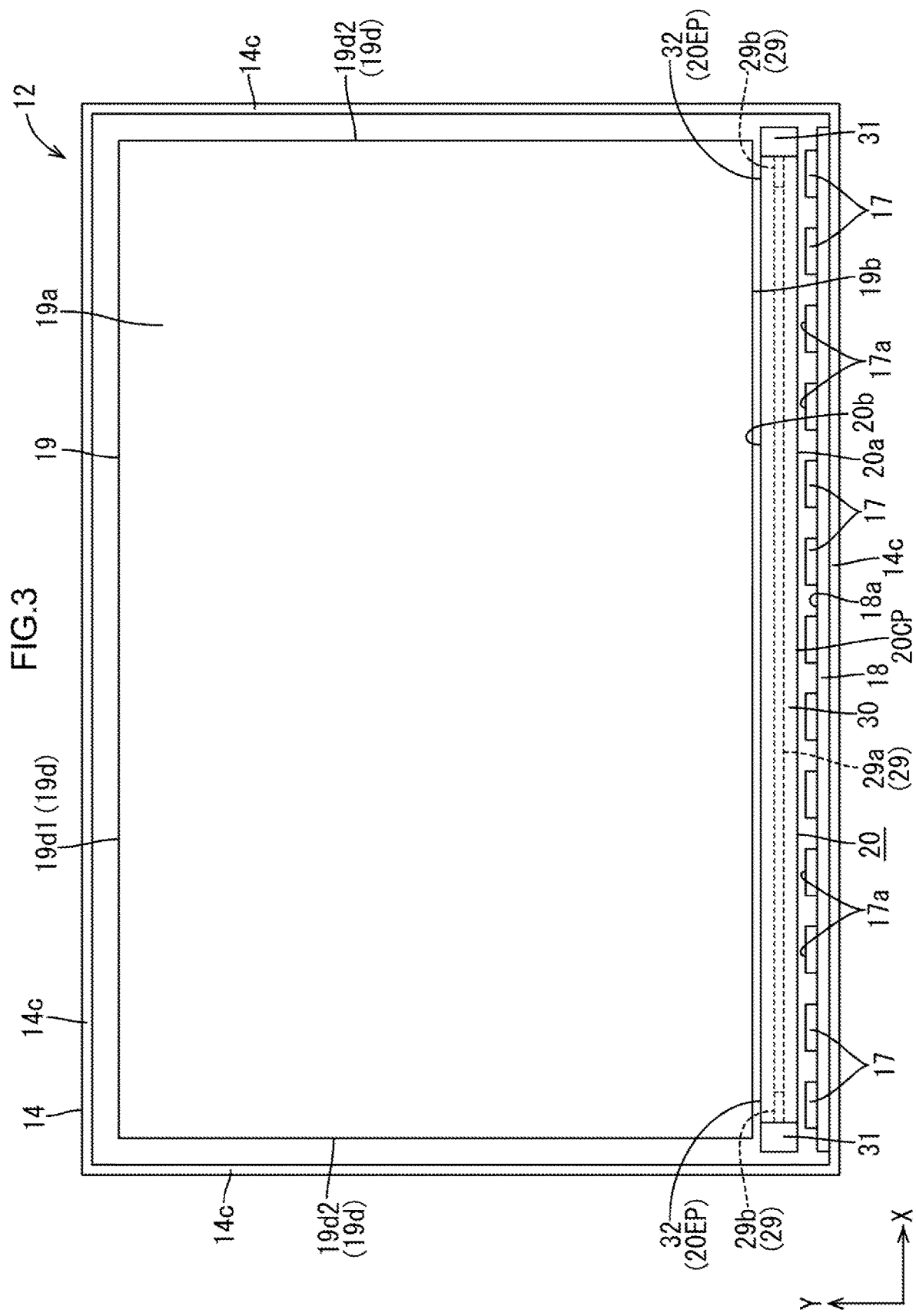
FIG. 3 is a plan view of a chassis, an LED substrate, and a light guide plate forming a backlight unit provided at the liquid crystal display device.
Figure 4:
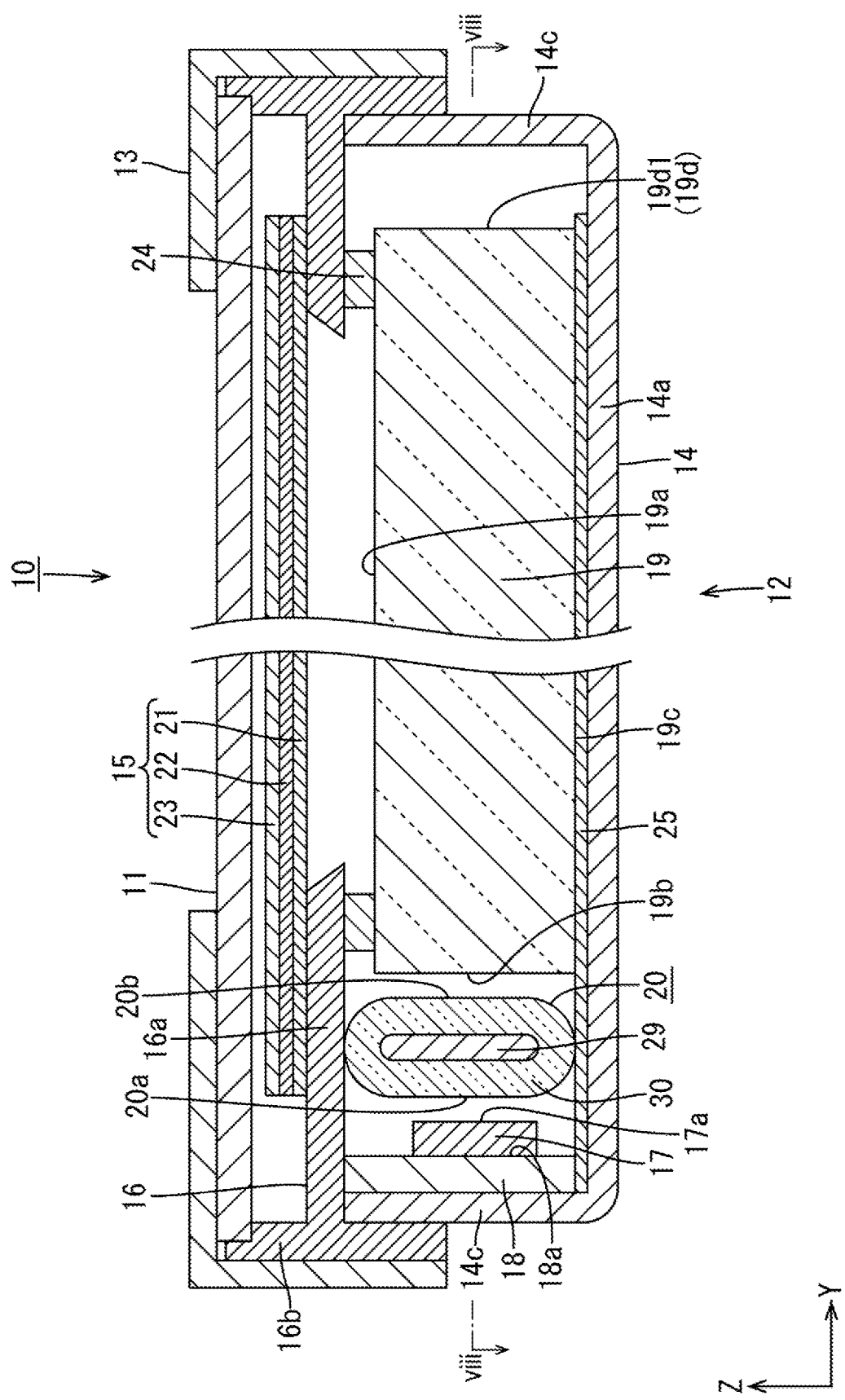
FIG. 4 is a sectional view of a sectional configuration of the liquid crystal display device along a short-side direction.
Figure 5:
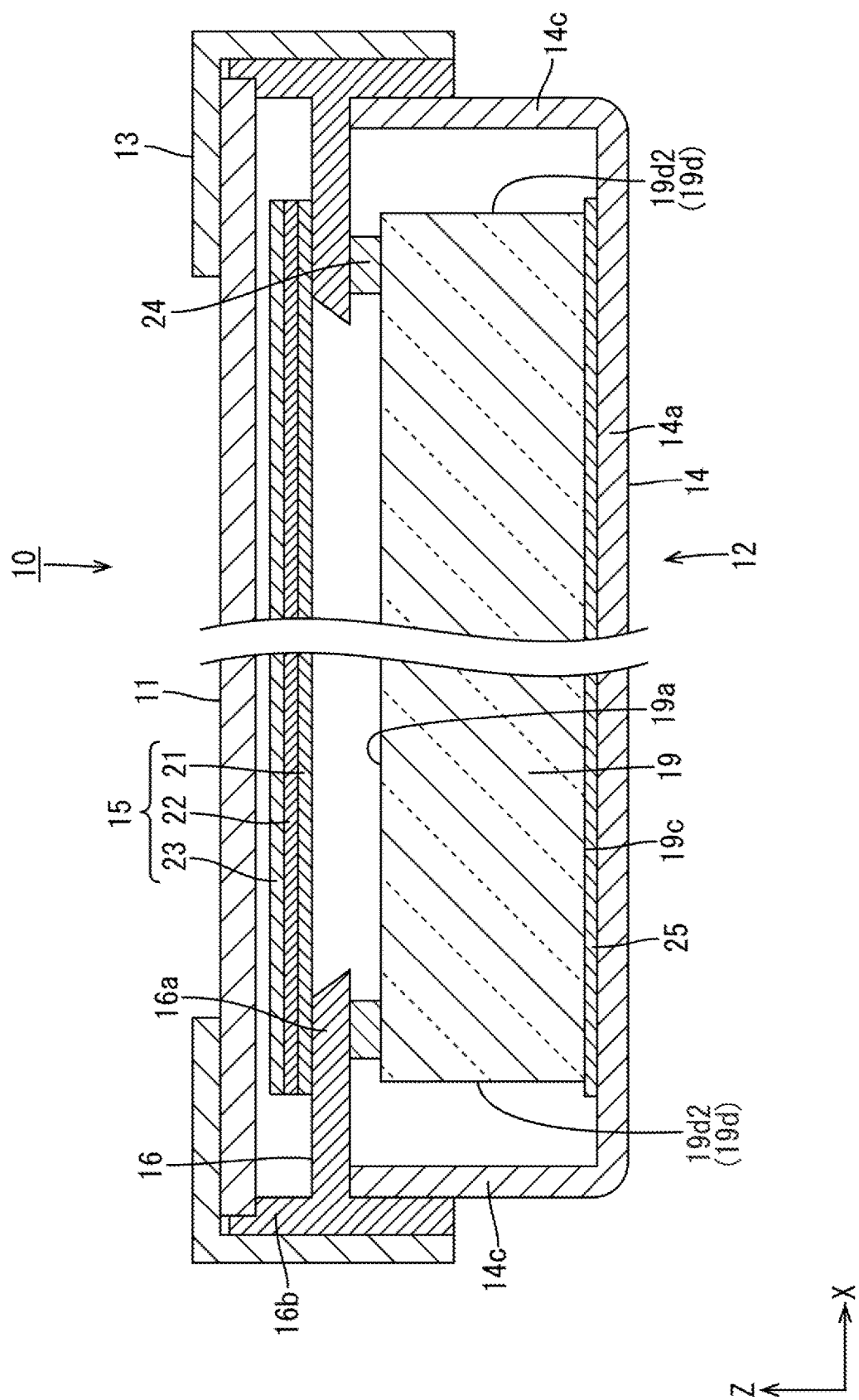
FIG. 5 is a sectional view of a sectional configuration of the liquid crystal display device along a long-side direction.

A first embodiment of the present invention will be described with reference to FIGS. 1 to 14. In the present embodiment, a backlight unit 12 and a liquid crystal display device 10 and a television device 10TV using the backlight unit 12 will be described by way of example. Moreover, in the present embodiment, the method for manufacturing a wavelength converter 20 included in the backlight unit 12 will be also described by way of example. Note that an X-axis, a Y-axis, and a Z-axis are illustrated in some of the drawings, and are each illustrated as corresponding directions in the drawings. Moreover, an upper side as viewed in, e.g., FIGS. 4 and 5 is a front side, and a lower side as viewed in, e.g., FIGS. 4 and 5 is a back side.

Figure 1:
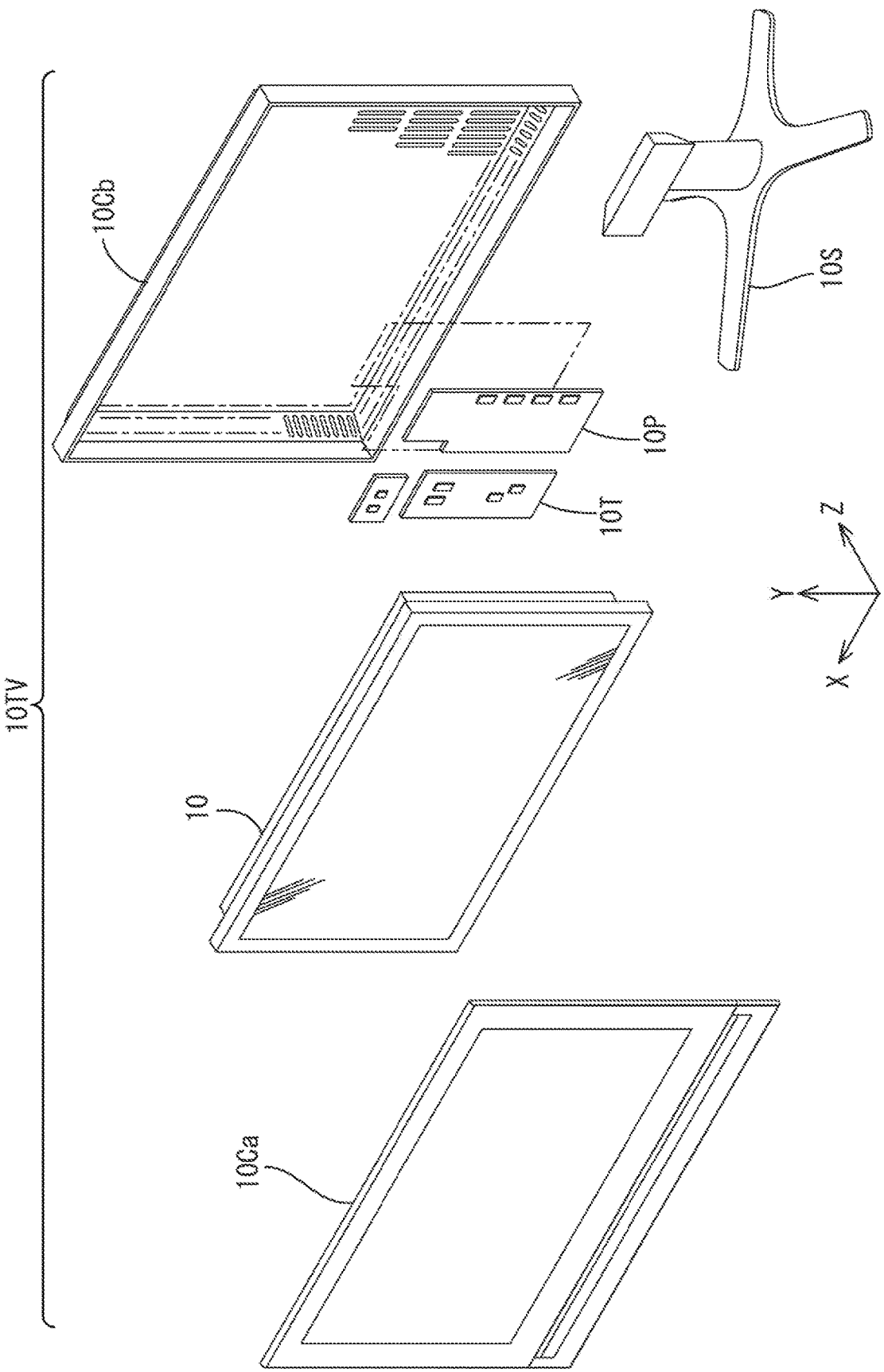
FIG. 1 is an exploded perspective view of an outline configuration of television device according to a first embodiment of the present invention.
Figure 2:
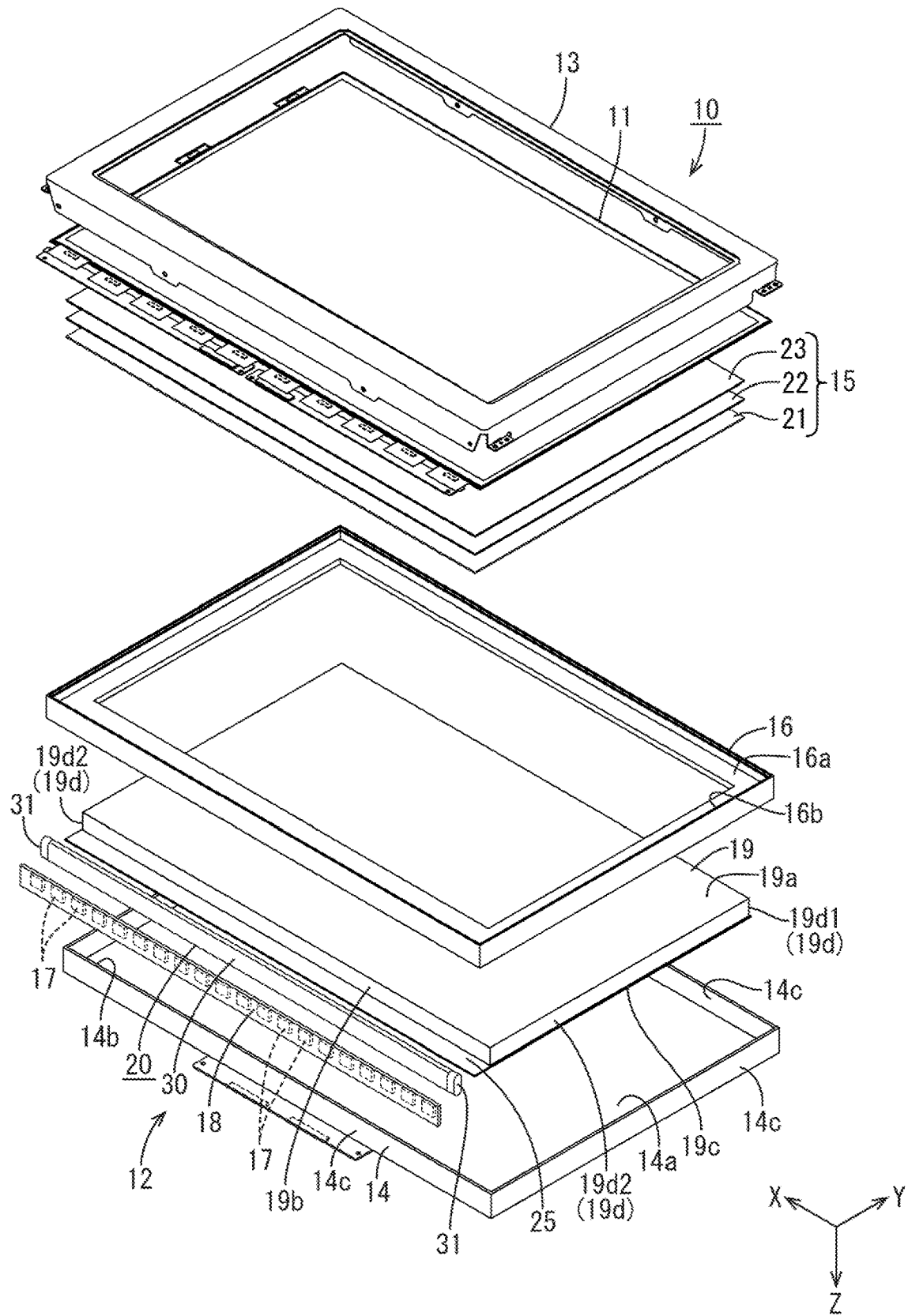
FIG. 2 is an exploded perspective view of an outline configuration of a liquid crystal display device provided at the television device.

As illustrated in FIG. 1, the television device 10TV according to the present embodiment includes the liquid crystal display device 10, both of front and back cabinets 10Ca, 10Cb housing the liquid crystal display device 10 to sandwich the liquid crystal display device 10, a power source 10P, a tuner (a device) 10T configured to receive a television signal, and a stand 10S. The liquid crystal display device (a display device) 10 is entirely formed in a horizontally-elongated (longitudinal) quadrangular (rectangular) shape, and is housed in a portrait orientation. As illustrated in FIG. 2, the liquid crystal display device 10 includes a liquid crystal panel 11 as a display panel configured to display an image, and the backlight unit (a lighting device) 12 as an external light source configured to supply light for displaying to the liquid crystal panel 11. These components are integrally held by a frame-shaped bezel 13, etc.

Next, the liquid crystal panel 11 and the backlight unit 12 forming the liquid crystal display device 10 will be sequentially described. Of these components, the liquid crystal panel (the display panel) 11 is in a horizontally-elongated quadrangular shape as viewed in the plane, and is configured such that a pair of glass substrates is bonded with a predetermined gap and a liquid crystal layer (not shown) containing liquid crystal molecules as a substance with optical properties changeable according to electric field application is sealed between both glass substrates. On the inside of one glass substrate (an array substrate, an active matrix substrate), switching elements (e.g., TFTs) each connected to source lines and gate lines perpendicular to each other and pixel electrodes each arranged in quadrangular regions surrounded by the source lines and gate lines and connected to the switching elements are arranged in a matrix as viewed in the plane, and an alignment film, etc. are also provided. On the inside of the other glass substrate (a counter substrate, a CF substrate), a color filter configured such that, e.g., color sections of red (R), green (G), and blue (B) are arranged in a predetermined array in a matrix as viewed in the plane is provided, and a light blocking layer (a black matrix) arranged in a grid pattern among the color sections, a solid counter electrode facing the pixel electrodes, an alignment film, etc. are also provided. Note that a polarizing plate is arranged on the outside of each glass substrate. Moreover, the long-side direction of the liquid crystal panel 11 is coincident with an X-axis direction, the short-side direction of the liquid crystal panel 11 is coincident with a Y-axis direction, and the thickness direction of the liquid crystal panel 11 is coincident with a Z-axis direction.

As illustrated in FIG. 2, the backlight unit 12 includes a substantially box-shaped chassis 14 having a light output portion 14b opening toward the outside on the front side (a liquid crystal panel 11 side, a light output side), and multiple optical members (optical sheets) 15 arranged to cover the light output portion 14b of the chassis 14. Further, LEDs 17 as light sources, an LED substrate 18 on which the LEDs 17 are mounted, a light guide plate 19 configured to guide light from the LEDs 17 to the optical members 15 (the liquid crystal panel 11), the wavelength converter 20 interposed among the LEDs 17 and the light guide plate 19 to wavelength-convert the light from, the LEDs 17, and a frame 16 configured to hold the light guide plate 19, etc. from the front side and receive the optical members 15 from the back side are provided in the chassis 14. The LED substrate 18 is arranged at one (the near side as viewed in FIGS. 2 and 3, the left side as viewed in FIG. 4) of both long-side end portions of the backlight unit 12, and each LED 17 mounted on the LED substrate 18 is eccentrically located closer to one long-side end portion of the liquid crystal panel 11. As described above, the backlight unit 12 according to the present embodiment is of a one-sided light input edge light type (a side light type) such that the light of the LEDs 17 is input to the light guide plate 19 only from one side. Subsequently, each component of the backlight unit 12 will be described in detail.

The chassis 14 is made of metal. As illustrated in FIGS. 2 and 3, the chassis 14 includes, as in the liquid crystal panel 11, a bottom portion 14a in a horizontally-elongated quadrangular shape, and side portions 14c each standing from outer ends of the sides of the bottom portion 14a The chassis 14 is entirely formed in a substantially shallow box shape opening toward the front side. The chassis 14 (the bottom portion 14a) is configured such that the long-side direction thereof is coincident with the X-axis direction (the horizontal direction) and the short-side direction thereof is coincident with the Y-axis direction (the vertical direction). Moreover, the frame 16 and the bezel 13 can be fixed to the side portions 14c.

As illustrated in FIG. 2, the optical member 15 is, as in the liquid crystal panel 11 and the chassis 14, in a horizontally-elongated quadrangular shape as viewed in the plane. The optical members 15 cover the light output portion 14b of the chassis 14, and are interposed between the liquid crystal panel 11 and the light guide plate 19. That is, it can be said that the optical members 15 are arranged on an outlet side in a light output path with respect to the LEDs 17. Each optical member 15 is in a sheet shape, and three optical members 15 in total are provided. Specifically, the optical members 15 include a microlens sheet 21 configured to provide isotropic light collection action to light, a prism sheet 22 configured to provide anisotropic light collection action to light, and a reflection type polarizing sheet 23 configured to polarize and reflect light. As illustrated in FIGS. 4 and 5, the optical members 15 are configured such that the microlens sheet 21, the prism sheet 22, and the reflection type polarizing sheet 23 are stacked on each other in this order from the back side and outer edge portions of these sheets are placed on the front side of the frame 16. That is, the microlens sheet 21, the prism sheet 22, and the reflection type polarizing sheet 23 forming the optical members 15 face the light guide plate 19 with a clearance corresponding to the frame 16 (specifically, a later-described frame-shaped portion 16a) on the front side, i.e., on the light output side.

As illustrated in FIG. 2, the frame 16 has the horizontally-elongated frame-shaped portion (a picture-frame-shaped portion, a frame-shaped support portion) 16a extending along outer peripheral edge portions of the light guide plate 19 and the optical members 15, and the frame-shaped portion 16a holds and supports, from the front side, the outer peripheral edge portion of the light guide plate 19 across the entire circumference thereof. The frame-shaped portion 16a of the frame 16 is interposed between the optical member 15 (the microlens sheet 21) and the light guide plate 19, and receives and supports the outer peripheral edge portions of the optical members 15 from the back side. With this configuration, the optical members 15 are held at positions apart from the light guide plate 19 with the clearance corresponding to the frame-shaped portion 16a Moreover, a buffer material 24 made of, e.g., poron (registered trademark) is provided on the surface of the frame-shaped portion 16a of the frame 16 on the back side (a light guide plate 19 side). The buffer material 24 is in a frame shape extending across the entire circumference of the frame-shaped portion 16a Further, the frame 16 has a crystal liquid panel support portion. 16b protruding from the frame-shaped portion 16a toward the front side to support an outer peripheral edge portion of the liquid crystal panel 11 from the back side.

Next, the LEDs 17 and the LED substrate 18 on which the LEDs 17 are mounted will be described. As illustrated in FIGS. 3 and 4, the LEDs 17 are of a so-called top-emitting type such that the LEDs 17 are surface-mounted on the LED substrate 18 and light emission surfaces 17a of the LEDs 17 face the opposite side of the LED substrate 18. These LEDs 17 are blue LEDs configured to emit monochromatic blue light. Specifically, the blue light emitted from the LEDs 17 is partially wavelength-converted into green light and red light by the wavelength converter 20 described later in detail, and the output light of the backlight unit 12 shows a substantially white color by additive color mixing of the wavelength-converted green and red light (secondary light) and the blue light (primary light) of the LEDs 17.

Figure 6:
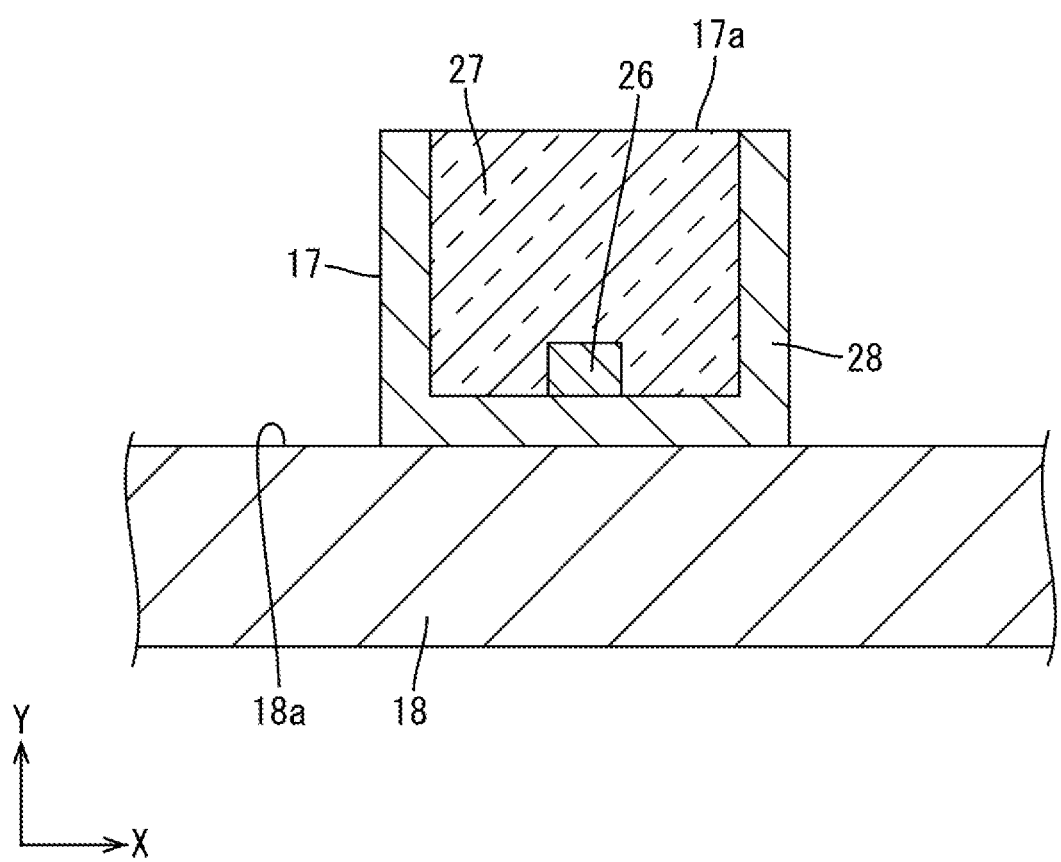
FIG. 6 is a sectional view of an LED and the LED substrate.

Specifically, each LED 17 includes, as illustrated in FIG. 6, a blue LED element (a blue light emitting element, a blue LED chip) 26 as a light source, a sealing material 27 configured to seal the blue LED element 26, and a case (a housing body, a housing) 28 housing the blue LED element 26 and filled with the sealing material 27. The blue LED element 26 is, for example, a semiconductor made of a semiconductor material such as InGaN, and is configured to emit, by voltage application in a forward direction, monochromatic blue light with a wavelength within a blue wavelength region (about 420 nm to about 500 nm). That is, the light emitted from the LEDs 17 is monochromatic light in the same color as that of the light emitted from the blue LED element 26. The blue LED element 26 is, via a not-shown lead frame, connected to a wiring pattern on the LED substrate 18 arranged outside the case 28. At the step of manufacturing the LED 17, an internal space of the case 28 housing the blue LED element 26 is filled with the sealing material 27, and in this manner, the blue LED element 26 and the lead frame are sealed and protected. The sealing material 27 is made of a substantially transparent thermoset resin material (e.g., an epoxy resin material and a silicone resin material). Thus, the monochromatic blue light emitted from the blue LED element 26 is directly used as the light emitted from the LED 17. The case 28 is made of a synthetic resin material (e.g., a polyamide-based resin material) or a ceramic material forming a surface with excellent light reflectivity and showing a white color. The case 28 is entirely formed in a cylindrical shape with a bottom, the cylindrical shape opening toward a light emission surface 17a The blue LED element 26 is arranged on a bottom surface of the case 28. Moreover, the above-described lead frame penetrates a peripheral wall of the case 28, and therefore, the blue LED element 26 is connected to the wiring pattern of the LED substrate 18.

As illustrated, in FIGS. 3 and 4, the LED substrate 18 is in an elongated plate shape extending along the long-side direction (the X-axis direction, the longitudinal direction of a light entering end surface 19b of the light guide plate 19) of the chassis 14, and is housed in the chassis 14 in a posture such that a plate surface of the LED substrate 18 is parallel with the X-axis direction and the Z-axis direction, i.e., the plate surface of the LED substrate 18 is perpendicular to plate surfaces of the liquid crystal panel 11 and the light guide plate 19 (the optical members 15). That is, the LED substrate 18 is in a posture such that the long-side direction (the length direction) of the plate surface thereof is coincident with the X-axis direction, the short-side direction (the width direction) of the plate surface thereof is coincident with the Z-axis direction, and the plate thickness direction perpendicular to the plate surface is coincident with the Y-axis direction. The LED substrate 18 is interposed between the light guide plate 19 and one of the long-side portions 14c of the chassis 14, and is housed in the chassis 14 from the front side along the Z-axis direction. The LED substrate 18 is attached in a form such that the plate surface on the opposite side of a mounting surface 18a on which the LEDs 17 are mounted contacts an inner surface of the long-side side portion 14c of the chassis 14. Thus, the light emission surface 17a of each LED 17 mounted on the LED substrate 18 faces the later-described long-side end surface (the light entering end surface 19b) of the light guide plate 19, and the optical axis of each LED 17, i.e., a light traveling direction with highest emission intensity, is substantially coincident with the Y-axis direction (the direction parallel with the plate surface of the LEDs liquid crystal panel 11, the direction of arrangement of the LEDs 17 and the light guide plate 19, the normal direction of the light entering end surface 19b).

As illustrated in FIGS. 3 and 4, the LED substrate 18 is configured such that the inside of the LED substrate 18, i.e., the plate surface (the surface facing the light guide plate 19) of the LED substrate 18 facing the light guide plate 19 side, is formed as the mounting surface 18a on which the LEDs 17 with the above-described configuration are surface-mounted. The multiple LEDs 17 are, on the mounting surface 18a of the LED substrate 18, arranged in line (linearly) at predetermined intervals along the length direction (the X-axis direction) of the mounting surface 18a. That is, it can be said that the multiple LEDs 17 are intermittently arranged along the long-side direction (the length direction of the light entering end surface 19b) of the backlight unit 12 at one long-side end portion thereof. Thus, the direction of arrangement of the LEDs 17 is coincident with the length direction of the LED substrate 18 (the length direction of the light entering end surface 19b). An interval between adjacent ones of the LEDs 17 in the X-axis direction, i.e., the interval of array (the pitch of array) of the LEDs 17, is substantially constant. In other words, it can be said that the LEDs 17 are arrayed at equal pitches. The dimension of the LED 17 in the X-axis direction on the LED substrate 18 is greater than the interval of array of the LEDs 17, and specifically, is about 5 mm to 10 mm, for example. Moreover, a wiring pattern (not shown) extending along the X-axis direction, connecting the adjacent LEDs 17 in series across the group of LEDs 17, and made of a metal film (copper foil, etc.) is formed on the mounting surface 18a of the LED substrate 18. A not-shown LED drive circuit board is, via a not-shown wiring member, electrically connected to a terminal portion formed at an end portion of the wiring pattern, and therefore, drive power can be supplied to each LED 17. The LED substrate 18 is of a one-sided mounting type such that the mounting surface 18a is formed only by one of the plate surfaces. A base material of the LED substrate 18 is made of metal such as aluminum, and the above-described wiring pattern (not shown) is formed on the surface of the base material via an insulating layer. Note that an insulating material such as synthetic resin or ceramic can be used as the material used for the base material of the LED substrate 18.

The light guide plate 19 is made of a substantially transparent synthetic resin material (an acrylic resin material such as PMMA) exhibiting excellent light transmission. The index of refraction of the light guide plate 19 is, for example, about 1.49 which is sufficiently higher than that of air. As illustrated in FIGS. 2 and 3, the light guide plate 19 is, as in the liquid crystal panel 11 and the chassis 14, in a horizontally-elongated quadrangular shape as viewed in the plane, and is also in a plate shape having a greater thickness than that of the optical members 15. The long-side direction of a plate surface of the light guide plate 19 is coincident with the X-axis direction, the short-side direction of the plate surface of the light guide plate 19 is coincident with the Y-axis direction, and the plate thickness direction perpendicular to the plate surface is coincident with the Z-axis direction. As illustrated in FIGS. 4 and 5, the light guide plate 19 is arranged at a position right below the liquid crystal panel 11 and the optical members 15 in the chassis 14, and one (on the near side as viewed in FIGS. 2 and 3, on the left side as viewed in FIG. 4) of long-side end surfaces of an outer peripheral end surface of the light guide plate 19 faces each LED 17 on the LED substrate 18 arranged at one long-side end portion of the chassis 14. Thus, the direction of arrangement of the LEDs 17 (the LED substrate 18) and the light guide plate 19 is coincident with the Y-axis direction. Meanwhile, the direction of arrangement of the optical members 15 (the liquid crystal panel 11) and the light guide plate 19 is coincident with the Z-axis direction. Thus, both of these arrangement directions are perpendicular to each other. Moreover, the light guide plate 19 has the function of guiding light emitted from the LEDs 17 in the Y-axis direction and propagating the light in the light guide plate 19 while outputting the light upwardly to an optical member 15 side (the front side). The thickness (the dimension in the Z-axis direction) of the light guide plate 19 is greater than the height dimension (the dimension in the Z-axis direction) of the LED 17.

As illustrated in FIGS. 4 and 5, a front plate surface of both plate surfaces of the light guide plate 19 is formed as a light exiting plate surface (a light output surface) 19a configured to output internal light toward the optical members 15 and the liquid crystal panel 11. The outer peripheral end surface of the light guide plate 19 adjacent to the plate surfaces thereof includes a pair of long-side end surfaces elongated along the X-axis direction (the direction of arrangement of the LEDs 17, the long-side direction of the LED substrate 18, the long-side direction of the light guide plate 19) as the circumferential direction of the light guide plate 19, and a pair of short-side end surfaces elongated along the Y-axis direction (the direction of arrangement of the LEDs 17 and the light guide plate 19, the plate thickness direction of the LED substrate 18, the short-side direction of the light guide plate 19) as the circumferential direction of the light guide plate 19. Of both long-side end surfaces forming the outer peripheral end surface of the light guide plate 19, one long-side end surface (on the near side as viewed in FIGS. 2 and 3) faces the LEDs 17 (the LED substrate 18) with a predetermined space (an arrangement space of the later-described wavelength converter 20), and is formed as the light entering end surface (a light input surface) 19b to which the light emitted from the LEDs 17 is input via the later-described wavelength converter 20. Since the light entering end surface 19b faces the LEDs 17, it can be said that the light entering end surface 19b is an LED-facing end surface (a light-source-facing end surface). The light entering end surface 19b is configured such that the length direction (the long-side direction), the width direction (the short-side direction), and the normal direction thereof are coincident respectively with the X-axis direction, the Z-axis direction, and the Y-axis direction, and is formed as the surface substantially perpendicular to the light exiting plate surface 19a On the other hand, part (the other long-side end surface and the pair of short-side end surfaces) of the above-described outer peripheral end surface of the light guide plate 19 other than the light entering end surface 19b is formed as a non-light-input end surface 19d to which no light emitted from the LEDs 17 is directly input. The non-light-input end surface 19d does not face the LEDs 17, and therefore, it can be also said that the non-light-input end surface 19d is a non-LED-facing end surface (a non-light-source-facing end surface). The non-light-input end surface 19d includes the other long-side end surface of the above-described outer peripheral end surface of the light guide plate 19, i.e., a non-light-input opposite end surface 19d1 formed by the opposite end surface of the at light entering end surface 19b, and a pair of non-light-input-side end surfaces 19d2 formed by the pair of short-side end surfaces adjacent to the light entering end surface 19b and the non-light-input opposite end surface 19d1. Note that in the present embodiment, the non-LED-facing end surface has been described as the "non-light-input end surface 19d," but does not mean that no light is input at all. For example, in a case where light having leaked to the outside from the non-light-input end surface 19d once returns due to reflection by the side portion 14c of the chassis 14, such returned light might be input to the non-light-input end surface 19d.

As illustrated in FIGS. 4 and 5, a reflection sheet (a reflection member) 25 is arranged to overlap with the back side of the light guide plate 19, i.e., the opposite plate surface 19c on the opposite side of the light exiting plate surface 19a The reflection sheet 25 is made of synthetic resin (e.g., foamed PET) forming a surface with excellent light reflectivity and showing a white color. The reflection sheet 25 is configured to reflect the light reaching the opposite plate surface 19c after having propagated in the light guide plate 19, thereby outputting the light upwardly to the front side, i.e., the light exiting plate surface 19a The reflection sheet 25 is arranged to cover the substantially entire area of the opposite plate surface 19c of the light guide plate 19. The reflection sheet 25 extends to an area overlapping with the LED substrate 18 (the LEDs 17) as viewed in the plane, and is arranged such that the LED substrate 18 (the LEDs 17) is sandwiched between such an extended portion and the frame-shaped portion 16a of the frame 16 on the front side. With this configuration, the light from the LEDs 17 is reflected by the extended portion of the reflection sheet 25, and therefore, can be efficiently input to the light entering end surface 19b. A light reflection pattern (not shown) including a light reflector configured to reflect the light in the light wide plate 19 toward the exiting plate surface 19a to prompt light output from the light exiting plate surface 19a is formed on the opposite plate surface 19c of the light guide plate 19. The light reflector forming this light reflection pattern includes many light reflection dots. The distribution density of the dots varies according to a distance from the light entering end surface 19b (the LEDs 17). Specifically, a greater distance from the light entering end surface 19b (a smaller distance to the non-light-input opposite end surface 19d1) in the Y-axis direction results in a higher distribution density of the light reflection dots forming the light reflector. Conversely, a smaller distance to the light entering end surface 19b (a greater distance from the non-light-input opposite end surface 19d1) results in a lower distribution density. This controls such that the light emitted from the light exiting plate surface 19a shows uniform distribution in a plane.

Figure 7:
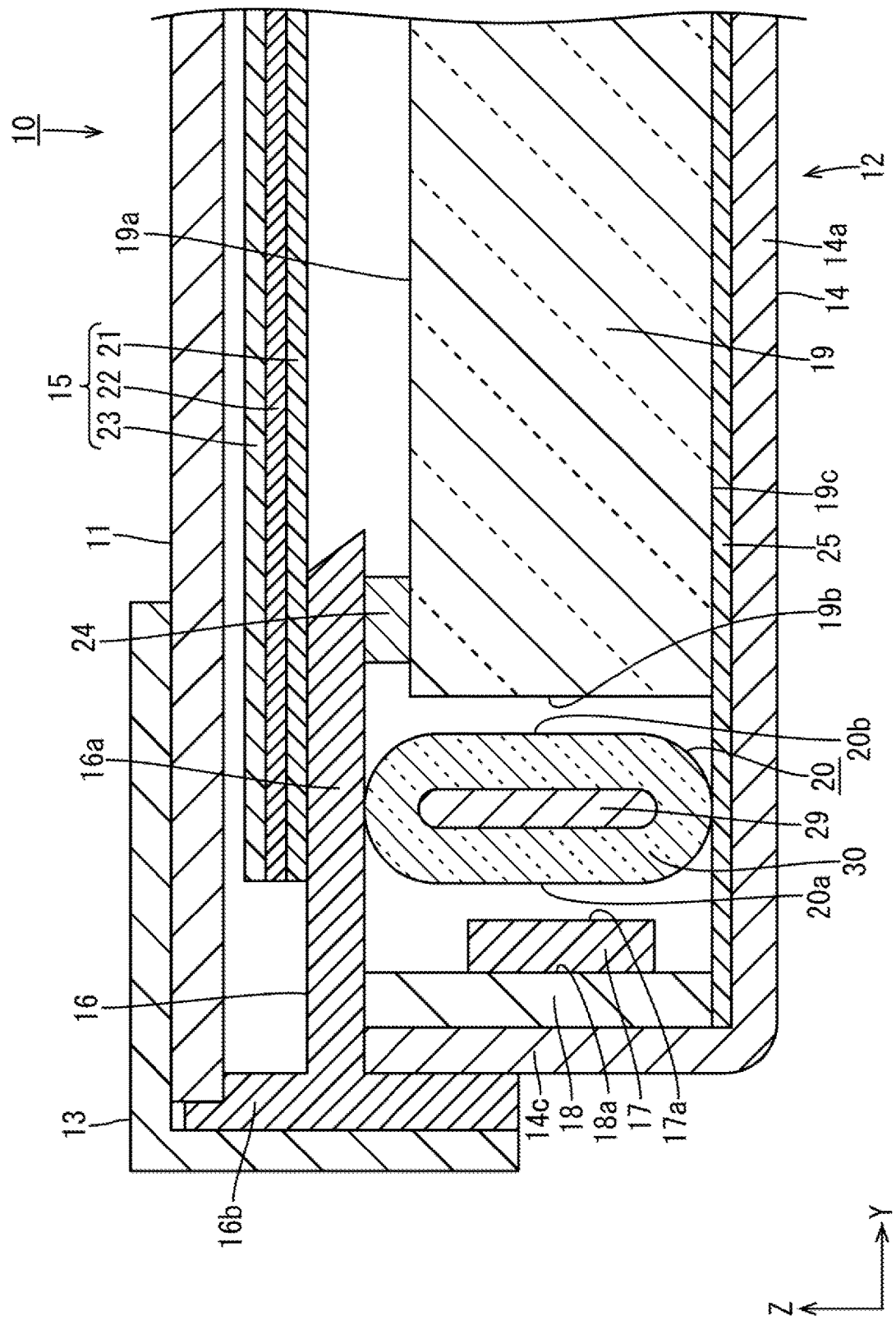
FIG. 7 is an enlarged view of FIG. 4.
Figure 8:
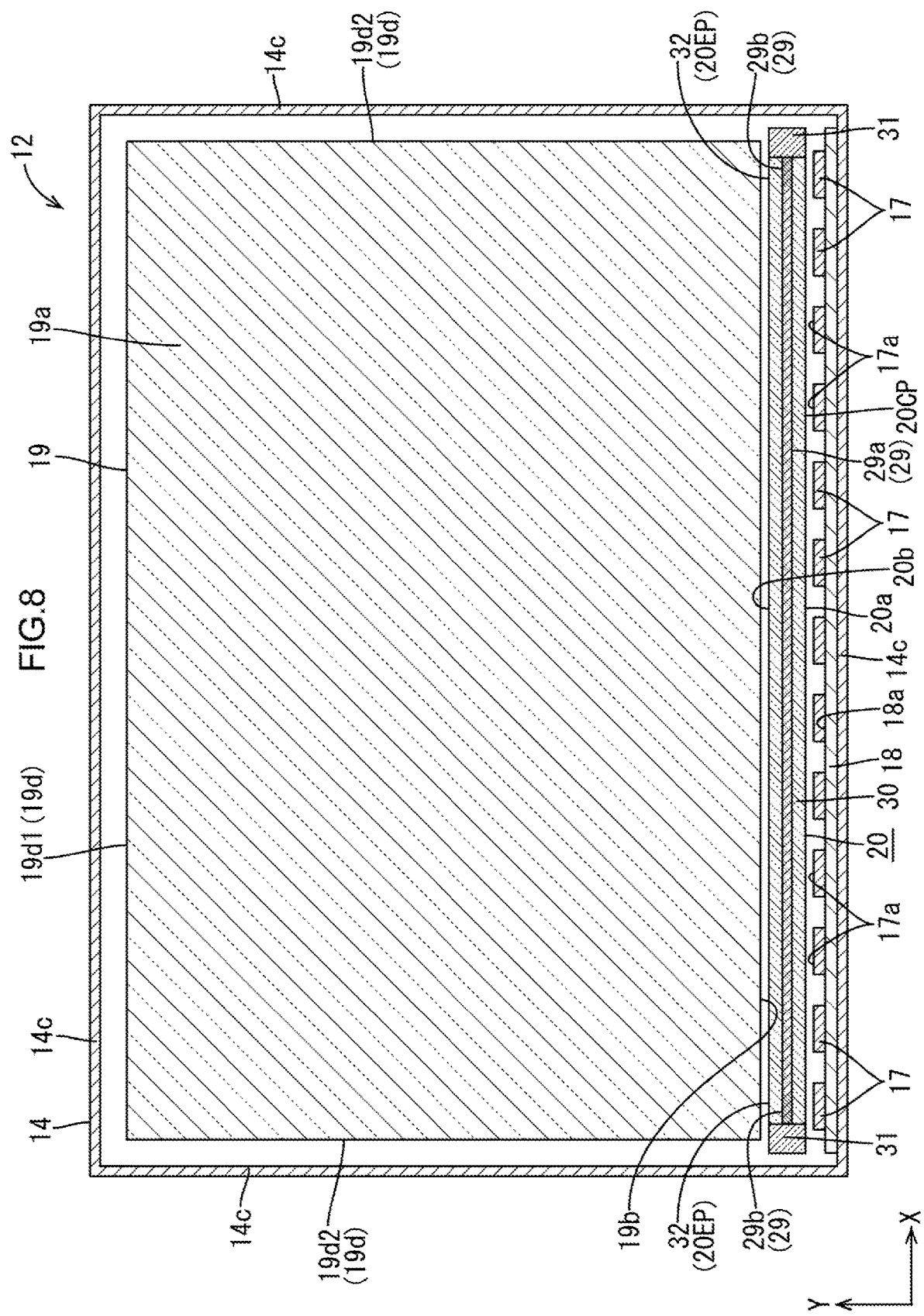
FIG. 8 is a sectional view of FIG. 4 along a viii-viii line.

The wavelength converter 20 will be described in detail. As illustrated in FIGS. 7 and 8, the wavelength converter 20 has phosphors (wavelength conversion substances) configured to wavelength-convert the light (the primary light) emitted from the LEDs 17 into the light (the secondary light) with other wavelengths, and is interposed among the LEDs 17 and the light entering end surface 19b of the light guide plate 19. The wavelength converter 20 is held in the above-described posture by a not-shown holding unit. The wavelength converter 20 extends in the length direction (the X-axis direction) of the light entering end surface 19b of the light guide plate 19, and is arranged to face the light entering end surface 19b across the substantially entire length thereof while facing all of the LEDs 17 mounted on the LED substrate 18. The wavelength converter 20 is configured such that a section along the direction perpendicular to the length direction (the extension direction, the X-axis direction) of the wavelength converter 20 is in a substantially vertically-elongated oval shape, the length dimension (the dimension in the X-axis direction) of the wavelength converter 20 is greater than the long-side dimension (the length dimension of the light entering end surface 19b) of the light guide plate 19, and the height dimension (the dimension in the Z-axis direction) of the wavelength converter 20 is greater than the thickness dimension (the width dimension of the light entering end surface 19b) of the light guide plate 19. The wavelength converter 20 has substantially flat outer surfaces along the X-axis direction and the Z-axis direction. The outer surface of the wavelength converter 20 facing the light emission surface 17a of each LED 17 is formed as a light input surface 20a parallel with the light emission surface 17a such that the light from the light emission surface 17a is input to the light input surface 20a. On the other hand, the outer surface of the wavelength converter 20 facing the light entering end surface 19b of the light guide plate 19 is formed as a light output surface 20b parallel with the light entering end surface 19b such that the light is output from the light output surface 20b to the light entering end surface 19b. The wavelength converter 20 is arranged such that an inner end position thereof is outside an inner end position of the frame-shaped portion 16a of the frame 16 in the width direction (the Y-axis direction) of the wavelength converter 20. That is, the wavelength converter 20 is arranged such that the entire area thereof overlaps with the frame shaped portion 16a of the frame 16 as viewed in the plane, and therefore, e.g., a situation where a user of the liquid crystal display device 10 directly views the wavelength converter 20 from the front side is less caused. According to such a configuration, the light emitted from the LEDs 17 is wavelength-converted in the course of transmitting through the wavelength converter 20 interposed among the LEDs 17 and the light entering end surface 19b of the light guide plate 19, and then, is input to the light entering end surface 19b to propagate in the light guide plate 19. Thereafter, the light is output from the light exiting plate surface 19a The wavelength converter 20 is interposed among the LEDs 17 and the light entering end surface 19b of the light guide plate 19, and therefore, it is preferable because a manufacturing cost is reduced with a less usage of the phosphors as compared to a case where a wavelength converter is formed in a sheet shape and is arranged to overlap with a light exiting plate surface 19a or an opposite plate surface 19c of a light guide plate 19.

As illustrated in FIGS. 7 and 8, the wavelength converter 20 has a phosphor containing portion 29 containing the phosphors (the wavelength conversion substances) for wavelength-converting the light from the LEDs 17, a container (a capillary) 30 extending along the X-axis direction as the length direction of the light entering end surface 19b to house the phosphor containing portion 29, and sealing portions 31 configured to seal end portions of the container 30 in the X-axis direction. In the phosphor containing portion 29, a red phosphor configured to emit red light (a visible light beam in a specific wavelength region belonging to a red color) by means of the monochromatic blue light from the LEDs 17 as excitation light and a green phosphor configured to emit green light (a visible light beam in a specific wavelength region belonging to a green color) by means of the monochromatic blue light from the LEDs 17 as the excitation light are dispersively mixed. With this configuration, the wavelength converter 20 wavelength-converts the light (the blue light, the primary light) emitted from the LEDs 17 into the secondary light (the green light and the red light showing a color tone (a yellow color) as a complementary color for the color tone (the blue color) of the light emitted from the LEDs 17. The phosphor containing portion 29 is formed in such a manner that a phosphor solution obtained by dispersively mixing of the red phosphor and the green phosphor in a ultraviolet curable resin material in a liquid form is injected into the container 30, and then, is hardened by irradiation with ultraviolet light, for example.

More specifically, for the phosphor in each color in the phosphor containing portion 29, the excitation light is the blue light, and such a phosphor has the following emission spectrum. That is, the green phosphor uses the blue light as the excitation light, thereby emitting, as fluorescent light, the light in the wavelength region (about 500 nm to 570 nm) belonging to the green color, i.e., the green light. Preferably, the green phosphor has an emission spectrum with a peak wavelength of about 530 nm in the wavelength range of the green light and a half bandwidth of less than 40 nm. The red phosphor uses the blue light as the excitation light, thereby emitting, as fluorescent light, the light in the wavelength region (about 600 nm to 780 nm) belonging to the red color, i.e., the red light. Preferably, the red phosphor has an emission spectrum with a peak wavelength of about 610 nm in the wavelength range of the red light and a half bandwidth of less than 40 nm.

As described above, the phosphor in each color is of a down-conversion type (a downshifting type) with a shorter excitation wavelength than a fluorescence wavelength. The phosphor of this down-conversion type converts high-energy excitation light with a relatively-long wavelength into low-energy fluorescent light with a relatively-long wavelength. Thus, as compared to the case of using an up-conversion type phosphor with a longer excitation wavelength than the fluorescence wavelength (a quantum efficiency of, e.g., about 28%), a quantum efficiency (a light conversion efficiency) is a higher value of about 30% to 50%. The phosphor in each color is a quantum dot phosphor. The quantum dot phosphor has a discrete energy level in such a manner that electrons/electron holes and excitons are confined in all directions of a three-dimensional space in a nanosize (e.g., a diameter of about 2 nm to 10 nm) semiconductor crystal, and the dot size of the quantum dot phosphor is changed so that the peak wavelength (the emission color) of emitted light, etc. can be selected as necessary. The light (the fluorescent light) emitted from the quantum dot phosphor has an extremely-high color purity and a wide color gamut because a peak in the emission spectrum of such light is steep and the half bandwidth of such an emission spectrum is narrow. A material of the quantum dot phosphor includes, for example, material combinations (e.g., cadmium selenide (CdSe) and zinc sulfide (ZnS)) of Zn, Cd, Hg, Pb, etc, as divalent cations and O, S, Se, Te, etc. as divalent anions, material combinations (e.g., indium phosphide (InP) and gallium arsenide (GaAs)) of Ga, In, etc, as trivalent cations and P, As, Sb, etc. as trivalent anions, and chalcopyrite compounds (e.g., $CuInSe_2$). Of the above-described materials, CdSe and ZnS are used in combination as the material of the quantum dot phosphor in the present embodiment. Moreover, the quantum dot phosphor used in the present embodiment is a so-called core-shell quantum dot phosphor. The core-shell quantum dot phosphor is configured such that the periphery of a quantum dot is covered with a shell made of a semiconductor substance with a relatively-great bandqap. Specifically, "Lumidot (registered trademark) CdSe/ZnS" as a product of Sigma-Aldrich Japan is preferably used as the core-shell quantum dot phosphor.

As illustrated in FIGS. 7 and 8, the phosphor containing portion 29 is sealed in an internal space of the container 30, and has surfaces along the X-axis direction and the Z-axis direction. A formation area of the phosphor containing portion 29 is set such that the phosphor containing portion 29 overlaps with a large portion of a mounting area of the LEDs 17 on the LED substrate 18 in the X-axis direction and overlaps with the entire area of the light emission surfaces 17*a* of the LEDs 17 in the Z-axis direction. The thickness dimension (the dimension in the Y-axis direction) of the phosphor containing portion 29 is smaller than the thickness dimension of the container 30 described later, and is specifically about 0.5 mm. Both of the front and back surfaces of the phosphor containing portion 29 along the X-axis direction and the Z-axis direction are formed as flat surfaces, and are parallel with the light emission surfaces 17*a* of the LEDs 17 and the light entering end surface 19*b* of the light guide plate 19.

The container is made of a substantially-transparent inorganic glass material (e.g., alkali-free glass or quartz glass) exhibiting excellent light transmission, and the index of refraction of the container 30 is about 1.5, for example. As illustrated in FIGS. 7 and 8, the container 30 surrounds the phosphor containing portion 29 across the entire length thereof, and is in a substantially cylindrical shape extending along the X-axis direction. Moreover, the section of the container 30 perpendicular to the length direction (the extension direction) thereof in a substantially vertically-elongated oval shape. Both outer surfaces of the container 30 along the length direction thereof is formed as the light input surface 20*a* and the light output surface 20*b* described above. The thickness dimension of the container 30 is greater than that of the above-described phosphor containing portion 29, and is specifically about 1 mm. The container 30 is, at each end portion thereof in the length direction, sealed by the sealing portion 31. The sealing portions 31 are provided in a pair to seal both end portions of the container 30 in the length direction thereof. The sealing portions 31 are made of the same inorganic glass material as that of the container 30, and therefore, both end portions of the container 30 can be sealed with high sealability. The dimension of the sealing portion 31 in the X-axis direction is substantially equal to or smaller than the dimension of the LED 17 in the X-axis direction, and is specifically about 5 mm, for example.

The wavelength converter 20 with the above-described configuration is, at each end portion 20EP thereof in the length direction, sealed by the sealing portion 31, and therefore, no phosphors are arranged at a portion corresponding to the dimension of the sealing portion 31 in the X-axis direction at each edge of the wavelength converter 20 provided with the sealing portion 31. With advancement of frame-size reduction of the liquid crystal display device 10 and the backlight unit 12, a position relationship in which the region (the sealing portion 31) of the wavelength converter 20 provided with no phosphors overlaps with the LED 17 in the X-axis direction is easily brought Due to such a relationship, the blue light from the LED 17 is input to an end portion of the light entering end surface 19*b* of the light guide plate 19 in the length direction thereof without the blue light being wavelength-converted by the phosphors, and the light emitted from the end portion of the light guide plate 19 in the X-axis direction is blue-tinged. A situation leading to such color unevenness has been concerned.

Figure 9:
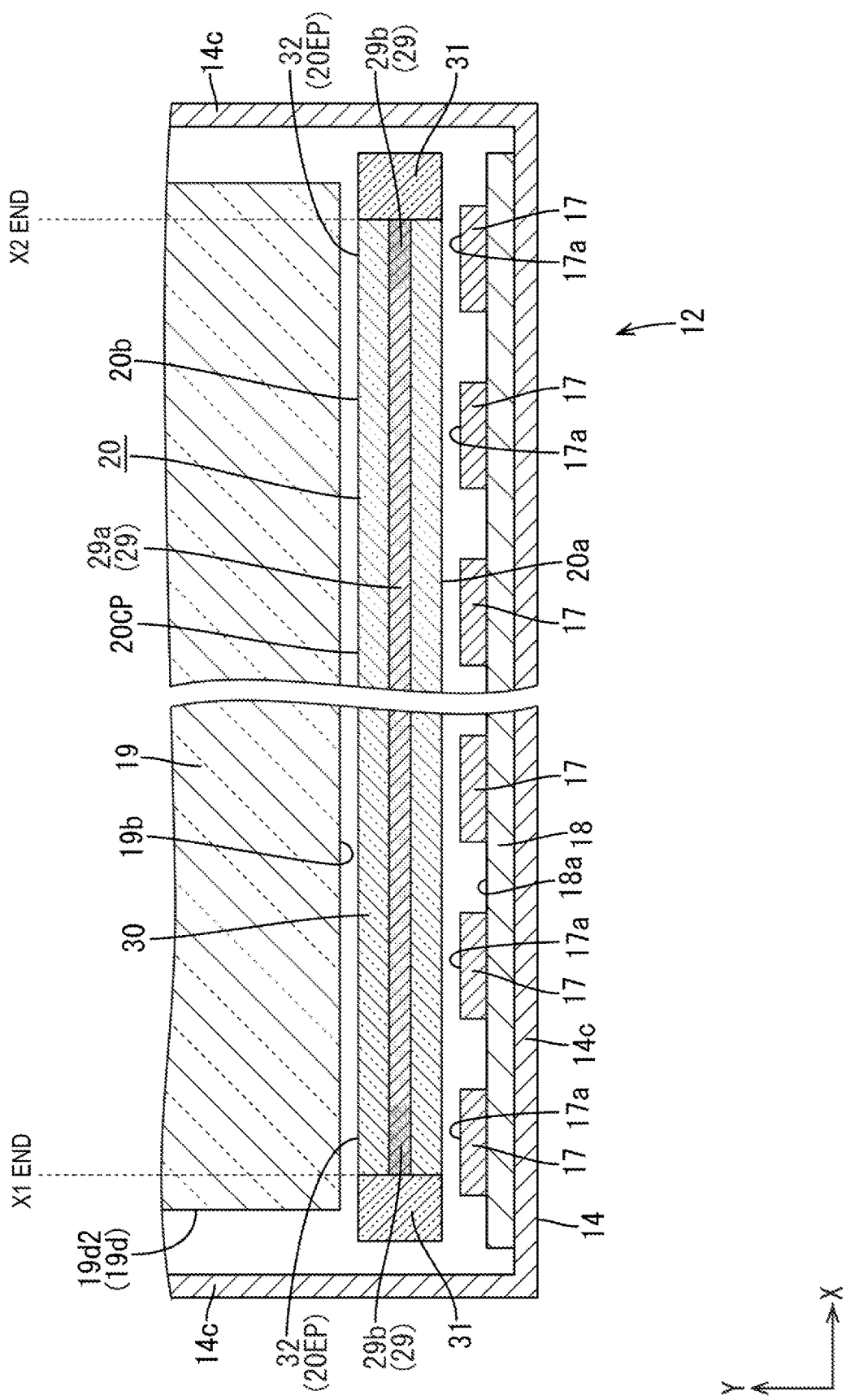
FIG. 9 is an enlarged view of FIG. 8.

For this reason, the wavelength converter 20 according to the present embodiment is, as illustrated in FIG. 9, configured such that both end portions 20EP in the length direction of the light entering end surface 19b are formed as great light emission portions 32 configured to emit a greater amount of light (a greater phosphor content) to be wavelength-converted per unit length in the length direction than that of a center portion 20CP. With this configuration, the region (the sealing portion 31) provided with no phosphors is formed at each edge of the wavelength converter in the length direction thereof. Even in the position relationship in which such a region overlaps with the LED 17, the blue light from the LED 17 is efficiently wavelength-converted into the green light and the red light by the great light emission portion 32. Thus, the color tone of the light input to the end portion of the light entering end surface 19b of the light guide plate 19 in the length direction thereof is less blue-tinged, and therefore, a color tone difference from the light input to a center portion of the light entering end surface 19b in the length direction thereof is less caused. Even with advancement of frame-size reduction, color unevenness in the light emitted from the light exiting plate surface 19a is less caused.

Figure 10:
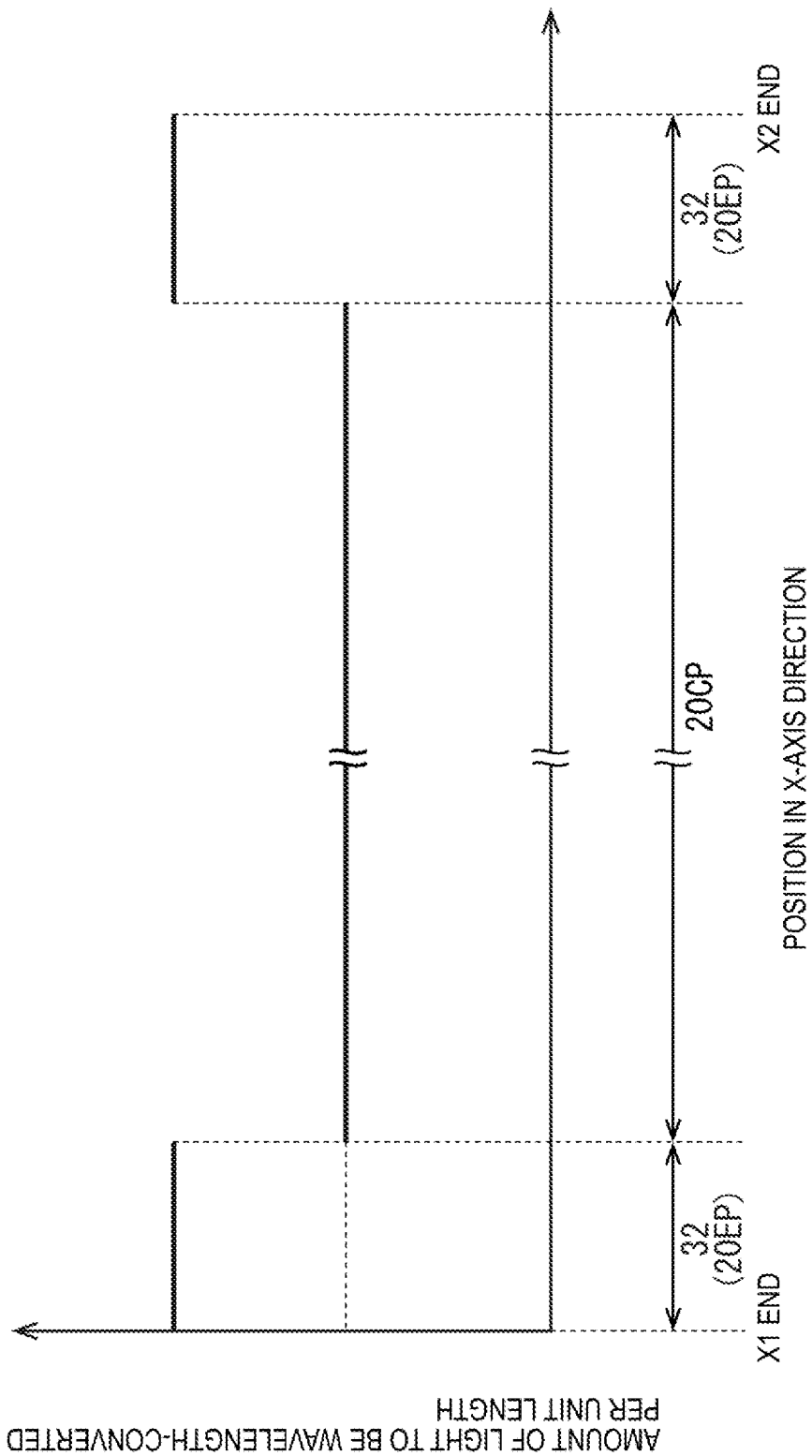
FIG. 10 is a graph of a change in the amount of light to be wavelength-converted per unit length from an X1 end to an X2 end of a wavelength converter.

As illustrated in FIG. 9, the wavelength converter 20 is configured such that the great light emission portions 32 have a higher concentration of the contained phosphor (a higher mixing ratio) than that of the center portion 20CP. Specifically, the phosphor containing portion 29 forming the wavelength converter 20 includes a first phosphor containing portion 29a arranged at the center portion 20CP, and a pair of second phosphor containing portions 29b each arranged at both end portions 20EP as the great light emission portions 32 and having higher concentrations of the contained red and green phosphors (the quantum dot phosphors) than those of the first phosphor containing portion 29a. In addition, the wavelength converter 20 is configured such that the thicknesses of the container 30 and the phosphor containing portion 29 are uniformly set and the diameter dimension of each of the container 30 and the phosphor containing portion 29 is substantially constant across the substantially entire length in the X-axis direction. Thus, as illustrated in FIG. 10, the first phosphor containing portion 29a of the center portion 20CP has a relatively-small content of the quantum dot phosphors per unit length in the X-axis direction, and therefore, the amount of light to be wavelength-converted is relatively small. The second phosphor containing portion 29b of each end portion 20EP as the great light emission portion 32 has a relatively-great content of the red and green phosphors per unit length, and therefore, the amount of light to be wavelength-converted is relatively great. Moreover, in the present embodiment, a position relationship is brought such that part (an inner end portion) of the sealing portion 31 and the entire area of the second phosphor containing portion 29b overlap, in the X-axis direction, with most of the LEDs 17 positioned at each end of the LED substrate 18 in the X-axis direction. According to such a configuration, the light from the LEDs 17 to both end portions 20EP as the great light emission portions 32 is efficiently wavelength-converted, and therefore, occurrence of color unevenness can be suitably reduced. Moreover, the thickness of the wavelength converter 20 is uniformly set, and therefore, the distance of the wavelength converter 20 to the LEDs 17 and the light entering end surface 19b of the light guide plate 19 is held constant in the length direction. With this configuration, the efficiency of Light input from the LEDs 17 to the light input surface 20a of the wavelength converter 20 and the efficiency of light input from the light output surface 20b of the wavelength converter 20 to the light entering end surface 19b of the light guide plate 19 are stabilized. Moreover, the container 30 with a uniform thickness may only be manufactured, and therefore the cost for manufacturing the wavelength converter 20 is suitably reduced.

Note that in FIG. 9, the content of the phosphors (the red phosphor and the green phosphor) per unit length in the X-axis direction in the wavelength converter 20 (the phosphor containing portion 29) is represented by the density of dots. A higher density of dots results in a greater content of the phosphors per unit length, and therefore, results in a greater amount of light to be wavelength-converted. Conversely, a lower density of dots results in a smaller content of the phosphors per unit length, and therefore, results in a smaller amount of light to be wavelength-converted. Moreover, FIG. 10 is a graph of distribution from an X1 end to an X2 end of the wavelength converter 20 in the X-axis direction regarding the amount (the content of the phosphors (the red phosphor and the green phosphor)) of (the red light and the green light) to be wavelength-converted per unit length in the X-axis direction in the wavelength converter 20 (the phosphor containing portion 29).

The present embodiment employs the above-described structure, and features of such a structure will be subsequently described. First, the method for manufacturing the wavelength converter 20 will be described. The method for manufacturing the wavelength converter 20 includes the container producing step of producing the container 30, the first phosphor solution injection step of injecting a first phosphor solution as the first phosphor containing portion 29a into the container 30 through an opening, the first phosphor solution hardening step of hardening the first phosphor solution with light, the second phosphor solution injection step of injecting a second phosphor solution as the second phosphor containing portions 29b into the container 30 through openings, the second phosphor solution hardening step of hardening the second phosphor solution with light, and the sealing step of sealing both openings at both end portions of the container 30. Hereinafter, each step will be described in detail.

Figure 11:
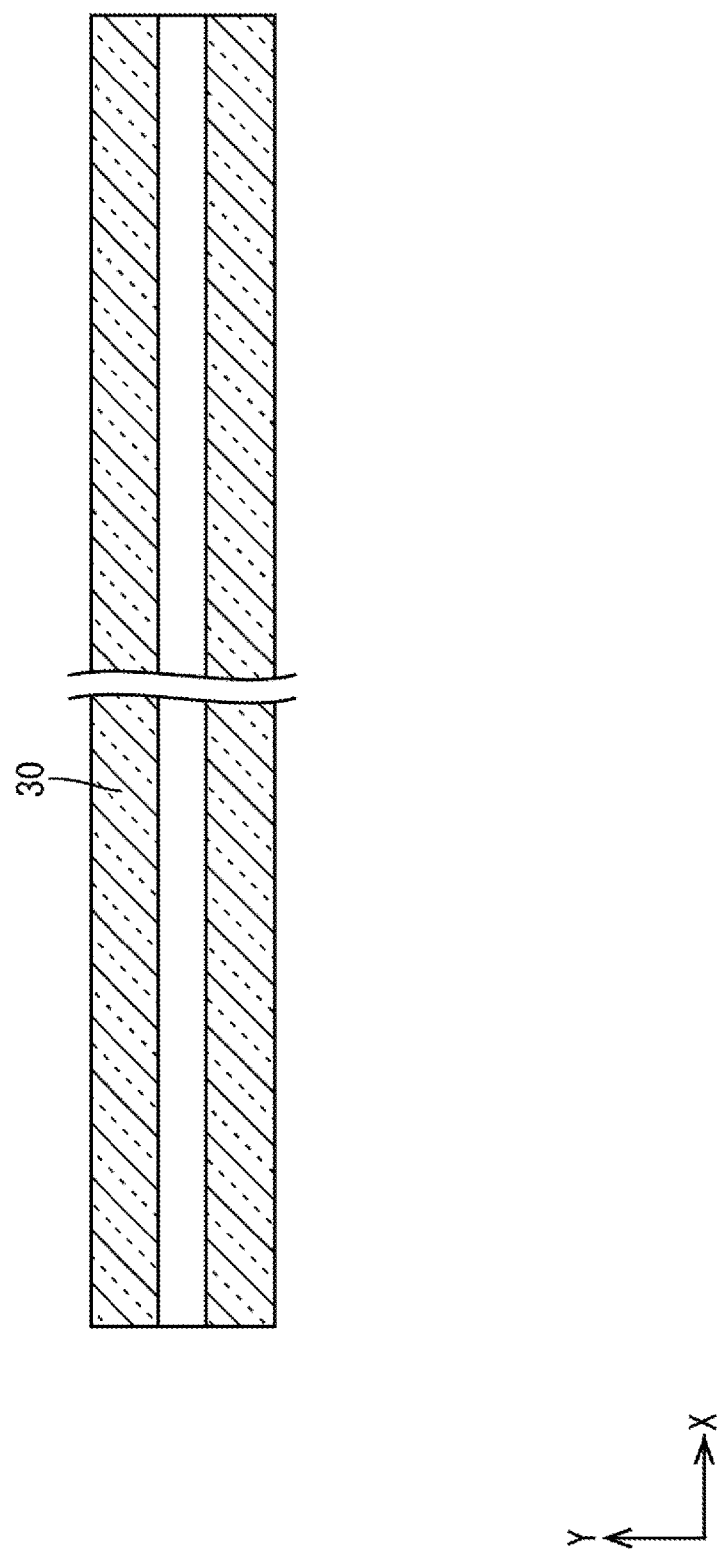
FIG. 11 is a sectional view of a container manufactured through a container producing step in the course of manufacturing the wavelength converter.
Figure 12:
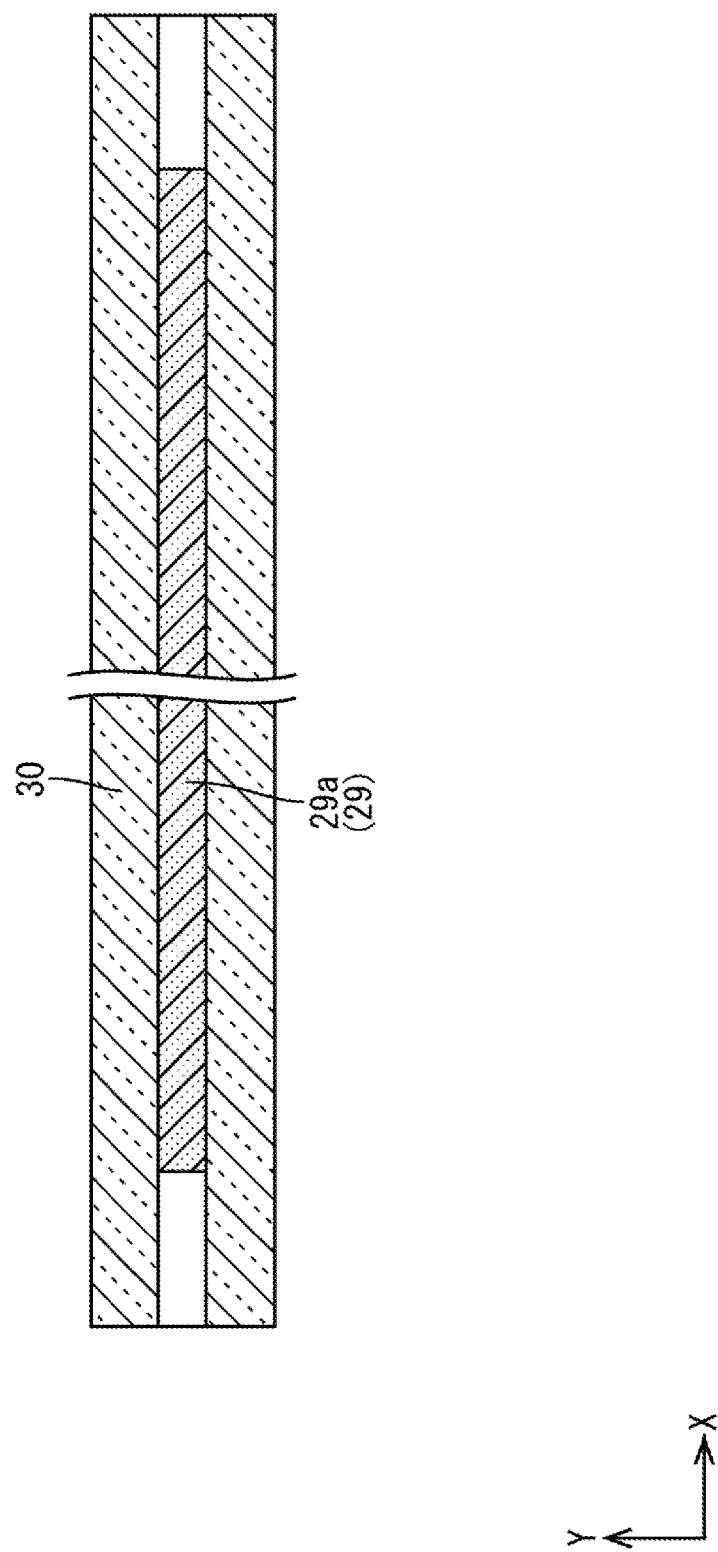
FIG. 12 is a sectional view of a state when a first phosphor solution injected into the container is hardened with light through a first phosphor solution injection step and first phosphor solution hardening step in the course of manufacturing the wavelength converter.

At the container producing step, the container 30 in a substantially hollow cylindrical shape is, as illustrated in FIG. 11, manufactured using the inorganic glass material in a state in which both end portions of the container 30 in the length direction thereof open. At the first phosphor solution injection step, the first phosphor solution containing a red phosphor and a green phosphor in a light curable resin material is injected into the container 30 through either one of the openings of the container 30, and is selectively arranged at a center portion of the container 30 in the length direction thereof as illustrated in FIG. 12. In this state, almost no first phosphor solution is present at both end portions of the container 30 in the length direction thereof. The first phosphor solution injected into the container 30 has relatively-smaller contents of the red phosphor and the green phosphor per unit volume as compared to those in the later-described second phosphor solution. At the first phosphor solution hardening step, the first phosphor solution injected into the container 30 is hardened by irradiation with ultraviolet light. In this manner, the first phosphor containing port on 29a is formed, and is fixed at the center portion of the container 30 in the length direction thereof.

Figure 13:
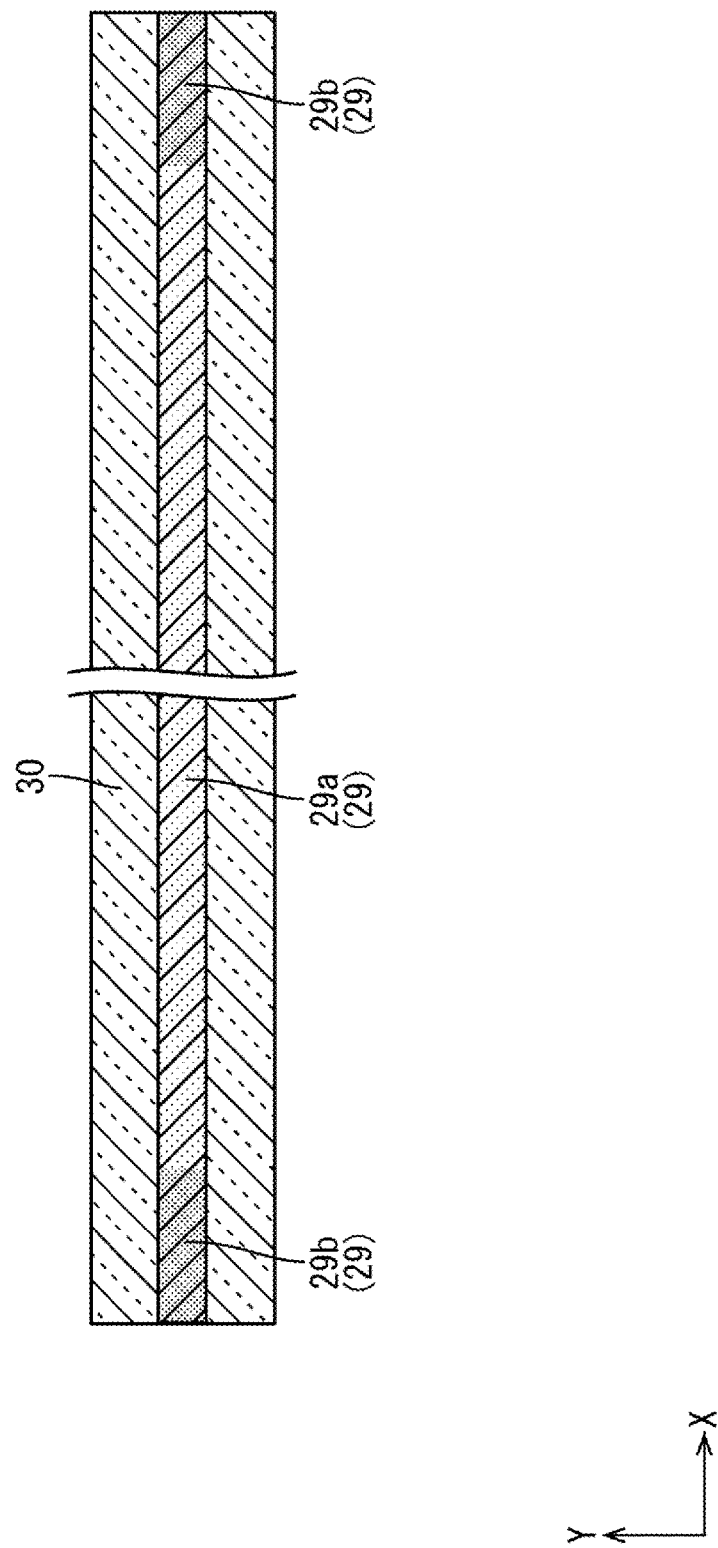
FIG. 13 is a sectional view of a state when a second phosphor solution injected into the container is hardened with light through a second phosphor solution injection step and a second phosphor solution hardening step in the course of manufacturing the wavelength converter.
Figure 14:
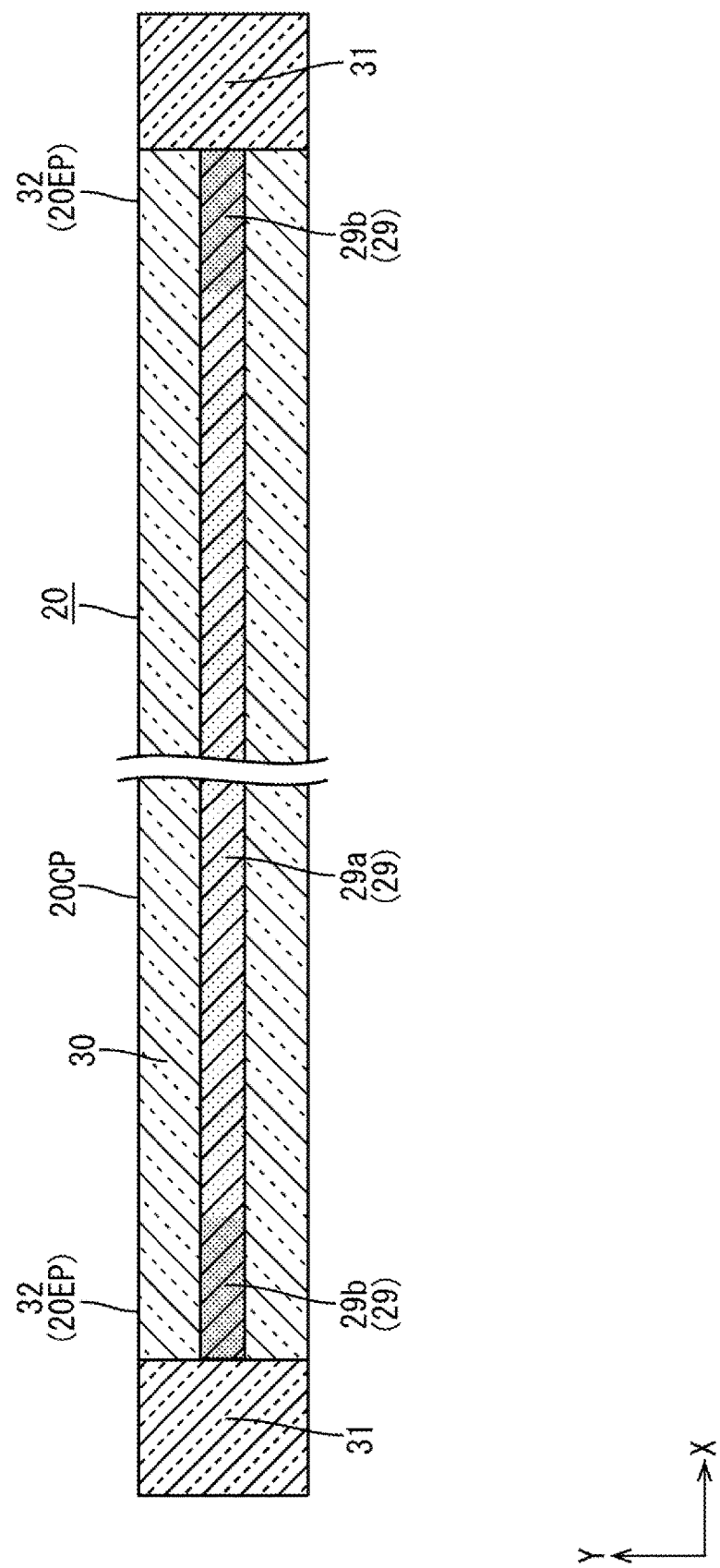
FIG. 14 is a sectional view or a state when openings of both end portions of the container are sealed through a sealing step in the course of manufacturing the wavelength converter.

At the second phosphor solution injection step, the second phosphor solution containing a red phosphor and a green phosphor in light curable resin material is injected into the container 30 through both openings of the container 30 as illustrated in FIG. 13. The second phosphor solution injected into the container 30 has relatively-greater contents of the red phosphor and the green phosphor per unit volume as compared to those in the later-described first phosphor solution. In this state, the first phosphor solution has been injected and hardened in advance at the center portion of the container 30 in the length direction thereof, and therefore, the first phosphor containing portion 29a has been formed. Thus, the second phosphor solution injected at the second phosphor solution injection step is, without being mixed with the first phosphor solution, arranged at each end portion of the container 30 in the length direction thereof. At the second phosphor solution hardening the second phosphor solution injected into the container 30 is hardened by irradiation with ultraviolet light. In this manner, the second phosphor containing portions 29b are formed, and are fixed at both end portions of the container 30 the length direction thereof. Thereafter, the sealing step is performed such that both sealing portions 31 are each formed to seal the openings of the end portions of the container 30 as illustrated in FIG. 14. Upon sealing, each sealing portion 31 made of the same inorganic glass material as that of the container 30 and both end portions of the container 30 are melted and joined together by heating. Thus, the container 30 is sealed with high sealability. In this manner, the wavelength converter 20 configured such that the phosphor containing portion 29 is sealed in the container 30 is manufactured. The wavelength converter 20 manufactured as described above is incorporated into the backlight unit 12 forming the liquid crystal display device 10.

Subsequently, features of the liquid crystal display device 10 will be described. When the liquid crystal display device 10 is powered ON, driving of the liquid crystal panel 11 is controlled by a panel control circuit of a not-shown control board. Moreover, drive power is supplied from an LED drive circuit of a not-shown LED drive circuit board to each LED 17 of the LED substrate 18, and in this manner, driving of each LED 17 is controlled. The light from each LED 17 is guided by the light guide plate 19 such that the liquid crystal panel 11 is irradiated with such light through the optical members 15. Thus, a predetermined image is displayed on the liquid crystal panel 11. Hereinafter, features of the backlight unit 12 will be described in detail.

When each LED 17 is turned on, the blue light (the primary light) emitted from the light emission surface 17a of each LED 17 is input to the light input surface 20a of the wavelength converter 20, and then, is wavelength-converted into the green light and the red light (the secondary light) by the green phosphor and the red phosphor contained in the phosphor containing portion 29 in the container 30 as illustrated in FIGS. 7 and 8. The substantially white illumination light is obtained from the wavelength-converted green and red light and the blue light from the LEDs 17. The green and red light wavelength-converted by the phosphor containing portion 29 and the blue light not wavelength-converted by the phosphor containing portion 29 are output from the light output surface 20b of the wavelength converter 20, and then, are input to the light entering end surface 19b of the light guide plate 19. The light input to the light entering end surface 19b is totally reflected by an interface between the light guide plate 19 and an external air layer, or is reflected by the reflection sheet 25 to propagate in the light guide plate 19 while being scattered and reflected by the light reflector of the light reflection pattern. This prompts output of the light from the light exiting plate surface 19a as light whose incident angle with respect to the light exiting plate surface 19a does not exceed a critical angle. The light output from, the light exiting plate surface 19a of the light guide plate 19 receives optical action in the course of transmitting through each optical member 15, and then, the liquid crystal panel 11 is irradiated with such light.

Features of the wavelength converter 20 will be described in detail. As illustrated in FIGS. 7 and 8, when the blue light (the primary light) emitted from the LEDs 17 is input to the light input surface 20a of the wavelength converter 20, part of the blue light is, by the green phosphor and the red phosphor dispersively mixed in the phosphor containing portion 29 charged into the container 30, utilized as the excitation light to emit the green light and the red light (the secondary light) from the green phosphor and the red phosphor. The wavelength-converted green and red light and the non-converted blue light are output from the light output surface 20b of the wavelength converter 20, and then, are input to the light entering end surface 19b of the light guide plate 19. In this state, the sealing portions 31 are each present at the edges of the wavelength converter 20 in the length direction thereof, and therefore, no green and red phosphors are arranged at such spots. With advancement of frame-size reduction of the liquid crystal display device 10 and the backlight unit 12, the position relationship in which the sealing portions 31 as the portions of the wavelength converter 20 provided with no green and red phosphors overlap with the LEDs 17 positioned at the ends of the LED substrate 18 in the direction (the X-axis direction) of arrangement of the LEDs 17 is easily brought. Due to such a position relationship, input of the light from the LEDs 17 to the end portions of the light entering end surface 19b of the light guide plate 19 in the length direction thereof without wavelength conversion of the light by the green and red phosphors has been concerned.

On this point, the wavelength converter 20 is, according to the present embodiment, configured such that the second phosphor containing portions 29b (the second phosphor solution) having higher concentrations of the contained green and red phosphors than those of the first phosphor containing port on 29a (the first phosphor solution) arranged at the center portion 20CP are each arranged at both end portions 20EP in the X-axis direction. Thus, even when the sealing portions 31 as the portions provided with no green and red phosphors are each present at the edges of the wavelength converter 20 in the length direction thereof, and the position relationship in which the sealing portions 31 each overlap with the LEDs 17 positioned at the ends in the arrangement direction is brought, the light from the LEDs 17 is efficiently wavelength-converted by the green and red phosphors contained in the second phosphor containing portions 29b. With this configuration, the situation where the light input to the end portions of the light entering end surface 19b of the light guide plate 19 in the length direction thereof is blue-tinged is less caused, and therefore, the color tone difference from the light input to the center portion of the light entering end surface 19b in the length direction thereof is less caused. Thus, color unevenness in the light output from the light exiting plate surface 19a is less caused even with advancement of frame-size reduction. Moreover, even in a case where the wavelength converter 20 is arranged with positional shift from the LEDs 17 in the length direction, occurrence of color unevenness is suitably reduced by the pair of great light emission portions 32.

As described above, the backlight unit (the lighting device) 12 of the present embodiment includes the LED (the light sources) 17; the light guide plate 19 having the light entering end surface 19b which forms at least part of the outer peripheral end surface and to which the light from the LEDs 17 is input, and the light exiting plate surface 19*a* which is either one of both plate surfaces and from which the light is output; the wavelength converter 20 extending along the length direction of the light entering end surface 19*b*, interposed among the LEDs 17 and the light entering end surface 19*b*, and having the phosphors for wavelength-converting the light from the LEDs 17, at least either one of the end portions 20EP of the wavelength converter 20 in the length direction thereof being formed as the great light emission portion 32 configured to emit a greater amount of wavelength-converted light per unit length in the length direction than that of the center portion 20 CP.

With this configuration, the light emitted from the LEDs 17 is wavelength-converted by the phosphors contained in the wavelength converter 20 interposed among the LEDs 17 and the light entering end surface 19*b*, and then, is input to the light entering end surface 19*b* of the light guide plate 19 to propagate in the light guide plate 19. Thereafter, the light is output from the light exiting plate surface 19*a* The wavelength converter 20 extends along the length direction of the light entering end surface 19*b*, but the region provided with no phosphors is formed at each edge of the wavelength converter 20 in the length direction thereof. With advancement of frame-size reduction of the backlight unit 12, the position relationship in which each region of the wavelength converter 20 provided with no phosphors overlaps with the LED 17 is easily brought. Due to such a relationship, input of the light from the LEDs 17 to the end portions of the light entering end surface 19*b* of the light guide plate 19 in the length direction thereof without wavelength conversion of the light by the phosphors has been concerned. In response, the wavelength converter 20 is configured such that at least either one of the end portions 20EP of the wavelength converter 20 in the length direction of the light entering end surface 19*b* is formed as the great light emission portion 32 configured to emit a greater amount of wavelength-converted light per unit length in the length direction of the light entering end surface 19*b* than that of the center portion 20CP. Thus, even in a case where the regions provided with no phosphors are each formed at the edges of the wavelength converter 20 in the length direction thereof, and in the position relationship in which such regions overlap with the LEDs 17, the light from the LEDs 17 is efficiently wavelength-converted by the great light emission portions 32. Thus, a difference between the color tone of the light input to the end portion of the entering end surface 19*b* of the light guide plate 19 in the length direction thereof and the color tone of the light input to the center portion of the light entering end surface 19*b* in the length direction thereof is less caused. Even with advancement of frame-size reduction, color unevenness in the light output from the light exiting plate surface 19*a* is less caused.

Moreover, the wavelength converter 20 is configured such that the great light emission portion 32 has higher concentrations of the contained phosphors than those of the center portion 20CP. With this configuration, the great light emission portion 32 has higher concentrations of the contained phosphors than those of the center portion 20CP, and therefore, the amount of light to be wavelength-converted is relatively increased. Thus, the light from the LEDs 17 to the great light emission portions 32 is efficiently wavelength-converted. Consequently, occurrence of color unevenness can be suitably reduced.

Further, the wavelength converter 20 has the uniform thickness. With this configuration, the distance of the wavelength converter 20 to the LEDs 17 and the light entering end surface 19*b* of the light guide plate 19 is held constant in the length direction. Thus, the efficiency of light input from the LEDs 17 to the wavelength converter 20 and the efficiency of light input from the wavelength converter 20 to the light entering end surface 19*b* f the light guide plate 19 are stabilized. Moreover, the cost for manufacturing the wavelength converter 20 is suitably reduced.

In addition, the wavelength converter 20 is configured such that both end portions 20EP in the length direction are each formed as the great light emission portions 32. With this configuration, even in a case where the region provided with no phosphors is formed at each edge of the wavelength converter 20 in the length direction thereof, both end portions 20EP are each formed as the great light emission portions 32, and therefore, occurrence of color unevenness is suitably reduced. Moreover, even in a case where the wavelength converter 20 is arranged with positional shift from the LEDs 17 in the length direction, occurrence of color unevenness is suitably reduced by the pair of great light emission portions 32.

Moreover, the LEDs 17 emit the blue light, and the wavelength converter 20 has, as the phosphors, the green phosphor configured to wavelength-convert the blue light into the green light and the red phosphor configured to wavelength-convert the blue light into the red light. With this configuration, the blue light emitted from the LEDs 17 is wavelength-converted into the green light and the red light by the green phosphor and the red phosphor contained in the wavelength converter 20. In this state, even when the region provided with no phosphors is formed at each edge of the wavelength converter 20 in the length direction thereof and the position relationship in which such a region and the LED 17 overlap with each other is brought, the blue light from the LEDs 17 is efficiently wavelength-converted into the green light and the red light by the great light emission portions 32, and therefore, the light input to the end portions of the light entering end surface 19*b* of the light guide plate 19 in the length direction thereof is less blue-tinged. Thus, occurrence of color unevenness is reduced.

Further, the wavelength converter 20 contains the quantum dot phosphors as the phosphors. With this configuration, the efficiency of wavelength conversion of the light by the wavelength converter 20 is enhanced, and the color purity of the wavelength-converted light is enhanced.

The method for manufacturing the wavelength converter 20 according to the present embodiment is the method for manufacturing the wavelength converter 20 interposed among the LEDs 17 and the light entering end surface 19*b* of the light guide plate 19 to which the light is input from the LEDs 17 and having the phosphors configured to wavelength-convert the light from the LEDs 17. The method includes the container producing step of producing the container 30 extending along the length direction of the light entering end surface 19*b* in a state in which at least either one of the end portions of the container 30 in the length direction thereof opens, the first phosphor solution injection step of injecting the first phosphor solution containing the phosphors in the light curable resin material into the container 30 through the opening to arrange the first phosphor solution in at least the center portion of the container 30 in the length direction thereof, the first phosphor solution hardening step of irradiating the first phosphor solution injected into the container 30 with the light for hardening the first phosphor solution, the second phosphor solution injection step of injecting the second phosphor solution having higher concentrations of the contained phosphors than those of the first phosphor solution into the container 30 through the opening to arrange the second phosphor solution in at least either one of the end portions of the container 30 in the length direction thereof, the second phosphor solution hardening step of irradiating the second phosphor solution injected into the container 30 with the light for hardening the second phosphor solution, and sealing the openings of the container 30.

First, at the first phosphor solution injection step, the first phosphor solution containing the phosphors in the light curable resin material is, through the opening, injected into the container 30 manufactured through the container producing step. At this step, the injected first phosphor solution is arranged in at least the center portion of the container 30 in the length direction thereof. In this state, the first phosphor solution hardening step is performed to harden the first phosphor solution with the light. Subsequently, at the second phosphor solution injection step, the second phosphor solution having higher concentrations of the contained phosphors than those of the first phosphor solution is injected into the container 30 through the opening. The first phosphor solution has been injected and hardened in advance in at least the center portion of the container 30 in the length direction thereof, and therefore, the second phosphor solution injected at the second phosphor solution injection step is, without being mixed with the first phosphor solution, arranged in at least either one of the end portions of the container 30 in the length direction thereof. In this state, the second phosphor solution hardening step is performed to harden the second phosphor solution with the light. Then, the openings of the container 30 are sealed at the sealing step.

The wavelength converter 20 manufactured as described above is interposed among the LEDs 17 and the light entering end surface 19b, and therefore, the light emitted from the LEDs 17 can be guided into the light entering end surface 19b after having been wavelength-converted by the phosphors. In this state, the region provided with no phosphors is formed at each edge of the wavelength converter 20 in the length direction thereof. With advancement of frame-size reduction of the back light unit 12, the position relationship in which the region of the wavelength converter 20 provided with no phosphors overlaps with the LED 17 is easily brought. Due to such a relationship, input of the light from the LEDs 17 to the end portions of the light entering end surface 19b of the light guide plate 19 in the length direction thereof without wavelength conversion of the light by the phosphors has been concerned. In response, the wavelength converter 20 is configured such that the second phosphor solution having higher concentrations of the contained phosphors than those of the first phosphor solution arranged at the center portion 20CP is arranged in at least either one of the end portions 20EP in the length direction of the light entering end surface 19b. Thus, even when the regions provided with no phosphors are each formed at the edges of the wavelength converter 20 in the length direction thereof, and the position relationship in which such regions overlap with the LEDs 17 is brought, the light from the LEDs 17 is efficiently wavelength-converted by the phosphors contained in the second phosphor solution. Thus, the difference between the color tone of the light input to the end portion of the light entering end surface 19b of the light guide plate 19 in the length direction thereof and the color tone of the light input to the center portion of the light entering end surface 19b in the length direction thereof is less caused. Even with advancement of frame-size reduction, color unevenness is less caused.

Second Embodiment

A second embodiment of the present invention will be described with reference to FIGS. 15 to 18. In the second embodiment, the structure of a wavelength converter 120 is changed. Note that overlapping description of structures, features, and advantageous effects similar to those of the above-described first embodiment will not be made.

Figure 15:
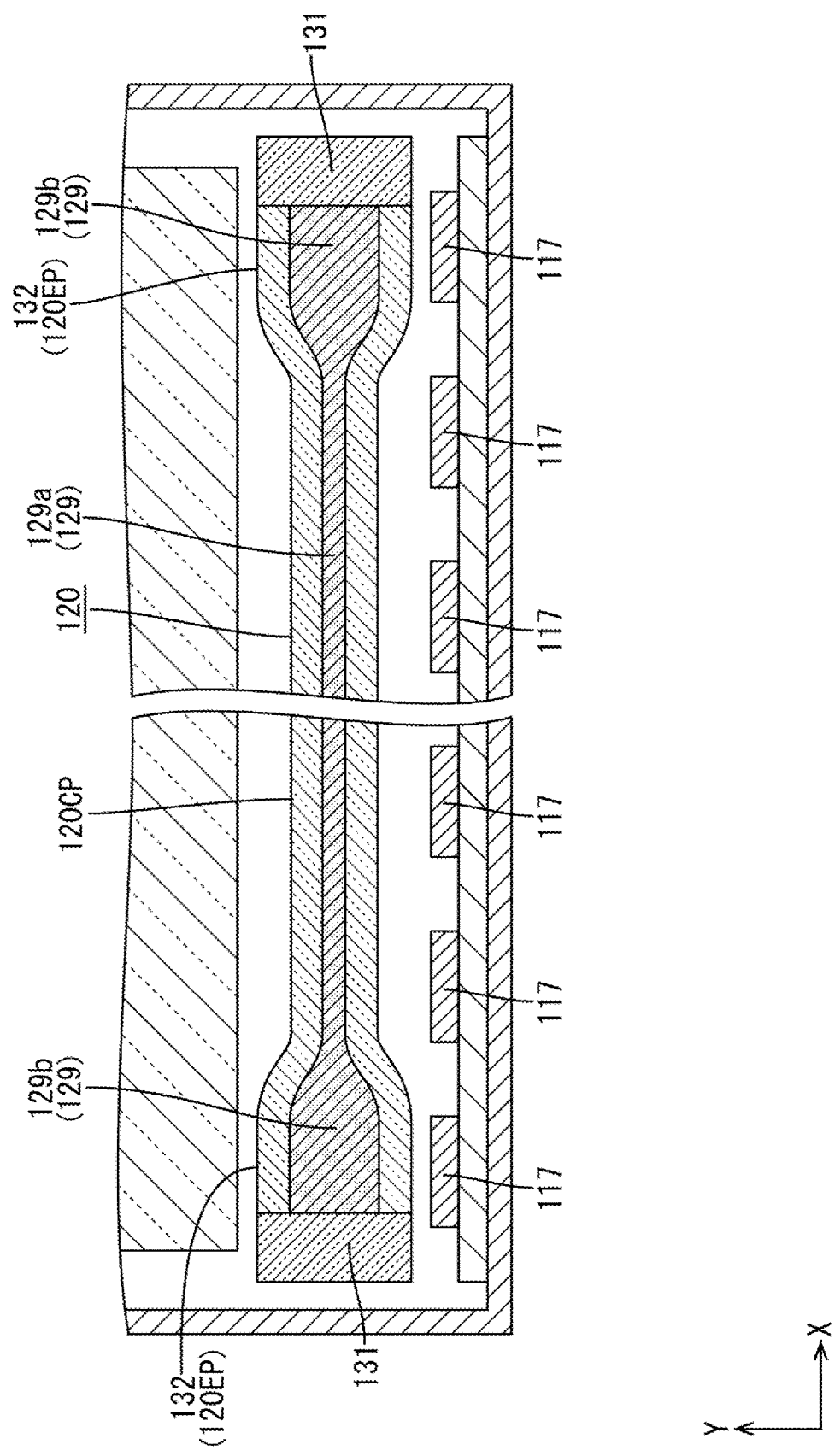
FIG. 15 is an enlarged horizontal sectional view of a backlight unit according to a second embodiment of the present invention.

As illustrated in FIG. 15, a wavelength converter 120 according to the present embodiment is configured such that great light emission portions 132 are thicker than a center portion 120CP. Specifically, a container 130 forming the wavelength converter 120 is configured such that the diameter dimension thereof is greater at both end portions than at a center portion, and therefore, an internal space of each end portion is larger than that of the center portion. Thus, a phosphor containing portion 129 charged into the container 130 is configured such that the volume thereof per unit length is greater at each end portion 120EP as the great light emission portion 132 than at the center portion 120CP. Moreover, in the present embodiment, the concentrations of contained phosphors in the phosphor containing portion 129 are set substantially uniformly across an entire area, and therefore, the content of the phosphors and the amount of light to be wavelength-converted per unit length in each second phosphor containing portion 129b are greater than those in a first phosphor containing portion 129a With this configuration, blue light from LEDs 117 to the great light emission portions 132 is efficiently wavelength-converted to suitably reduce occurrence of color unevenness.

Figure 16:
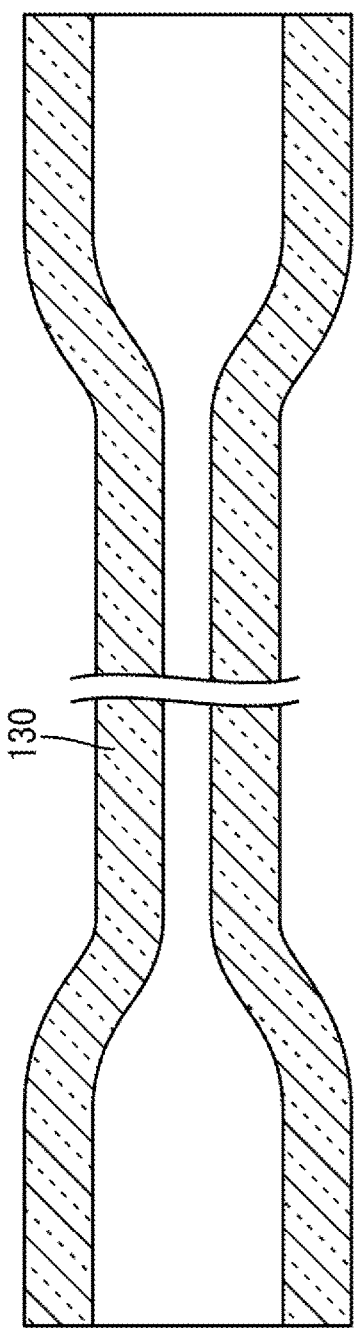
FIG. 16 is a sectional view of a container manufactured through a container producing step in the course of producing a wavelength converter.
Figure 17:
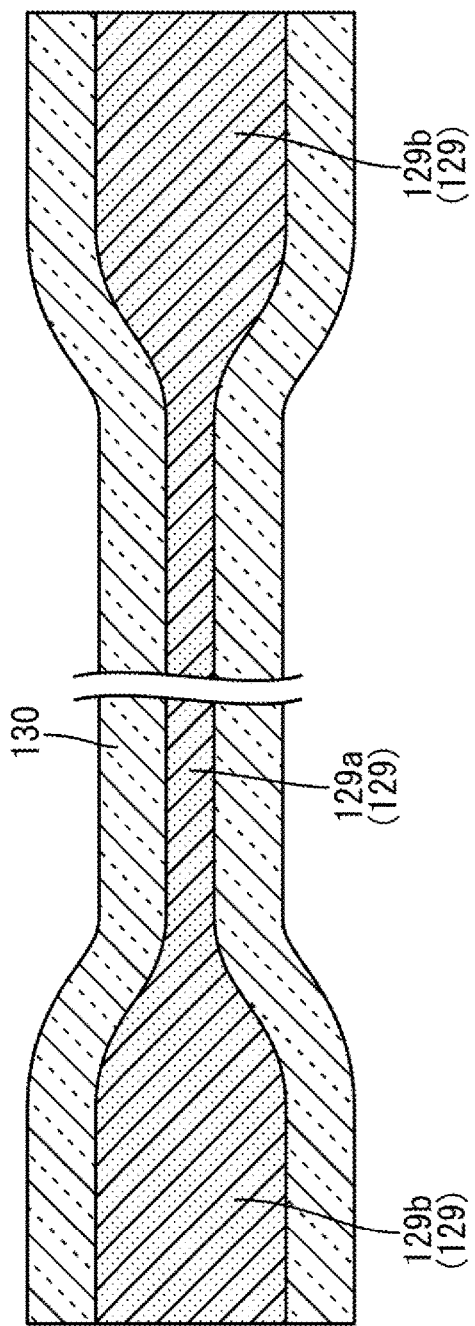
FIG. 17 is a sectional view of a state when a phosphor solution injected into the container is hardened with light through a phosphor solution injection step and a phosphor solution hardening step in the course of manufacturing the wavelength converter.
Figure 18:
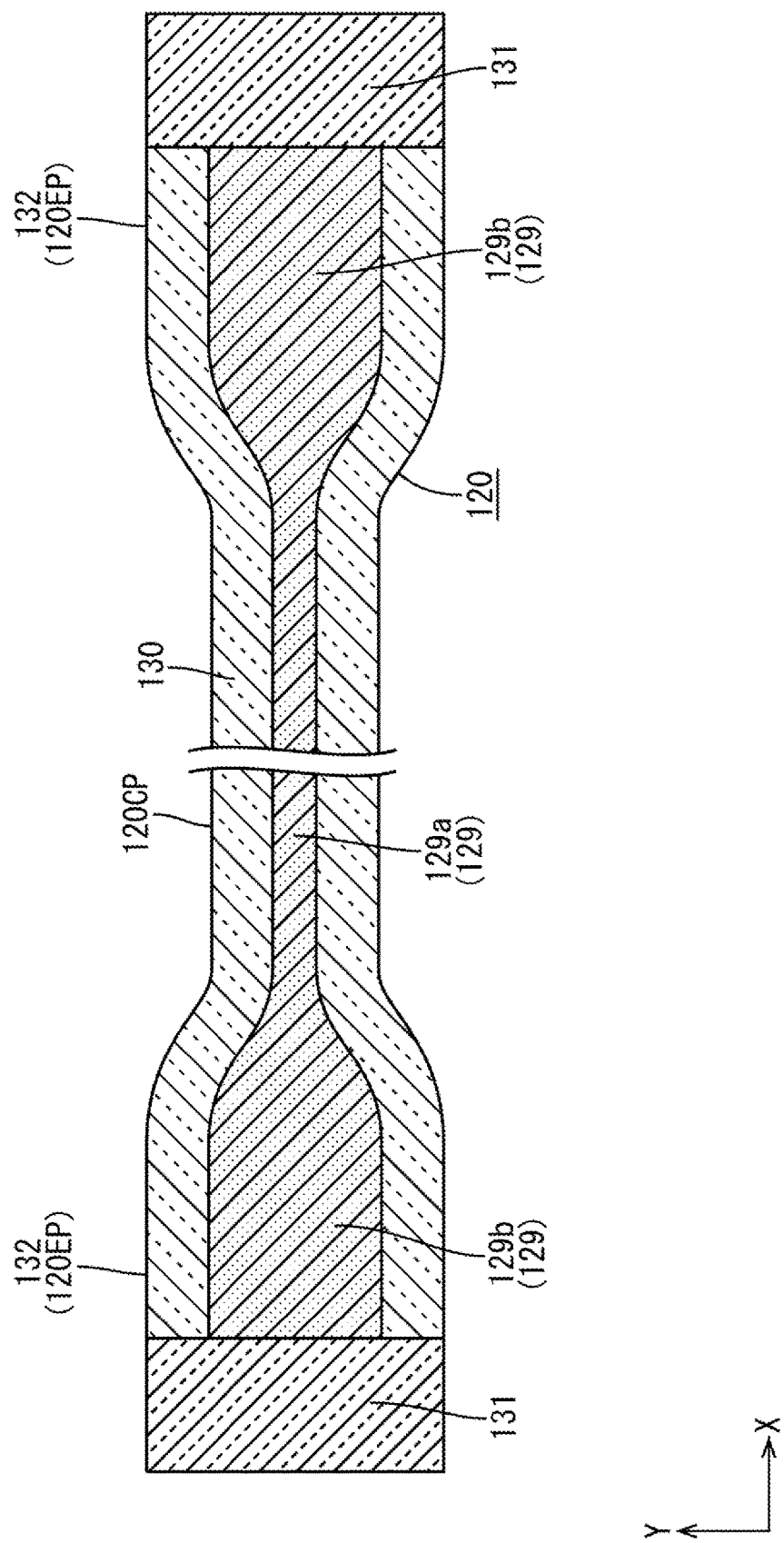
FIG. 18 is a sectional view of a state when openings of both end portions of the container are sealed through a sealing step in the course of manufacturing the wavelength converter.

The method for manufacturing the wavelength converter 120 with the above-described configuration includes a container producing step of producing the container 130, a phosphor solution injection step of injecting a phosphor solution into the container 130 through an opening, a phosphor solution hardening step of hardening the injected phosphor solution, and a sealing step of sealing openings of the container. At the container producing step, the container 130 configured such that both end portions are thicker than the center portion is manufactured as illustrated in FIG. 16. At the phosphor solution injection step, the phosphor solution containing a red phosphor and a green phosphor in a light curable resin material is injected into the container 130 through either one of the openings of the container 130. In this state, as illustrated in FIG. 17, the phosphor solution is injected across the substantially entire length of the container 130, and is arranged at the center portion and both end portions of the container 130. At the phosphor solution hardening step, the phosphor solution injected into the container 130 is irradiated with ultraviolet light. This prompts the phosphor solution to harden. At the sealing step, sealing portions 131 are each formed at both end portions in the container 130, thereby sealing both openings. As described above, according to the method for manufacturing the wavelength converter 120 in the present embodiment, each of the phosphor injection step and the phosphor hardening step is performed only once. Thus, the time required for manufacturing can be easily shortened, and only a single type of phosphor solution to be injected into the container 130 is used. Thus, the cost for manufacturing is reduced.

As described above, according to the present embodiment, the wavelength converter 120 is configured such that the great light emission portions 132 are thicker than the center portion 120CP. Since the great light emission portions 132 are thicker than the center portion 120CP as described above, the amount of light to be wavelength-converted is relatively increased. Thus, the light from the LEDs 117 to the great light emission portions 132 is efficiently wavelength-converted. With this configuration, occurrence of color unevenness can be suitably reduced.

Moreover, the wavelength converter 120 is configured such that the concentrations of the contained phosphors are uniformly set. With this configuration, the cost for manufacturing the wavelength converter 120 is suitably reduced.

Third Embodiment

A third embodiment of the present invention will be described with reference to FIGS. 19 to 24. In the third embodiment, the structure of a wavelength converter 220 is changed from that of the above-described first embodiment. Note that overlapping description of structures, features, and advantageous effects similar to those of the above-described first embodiment will not be made.

Figure 19:
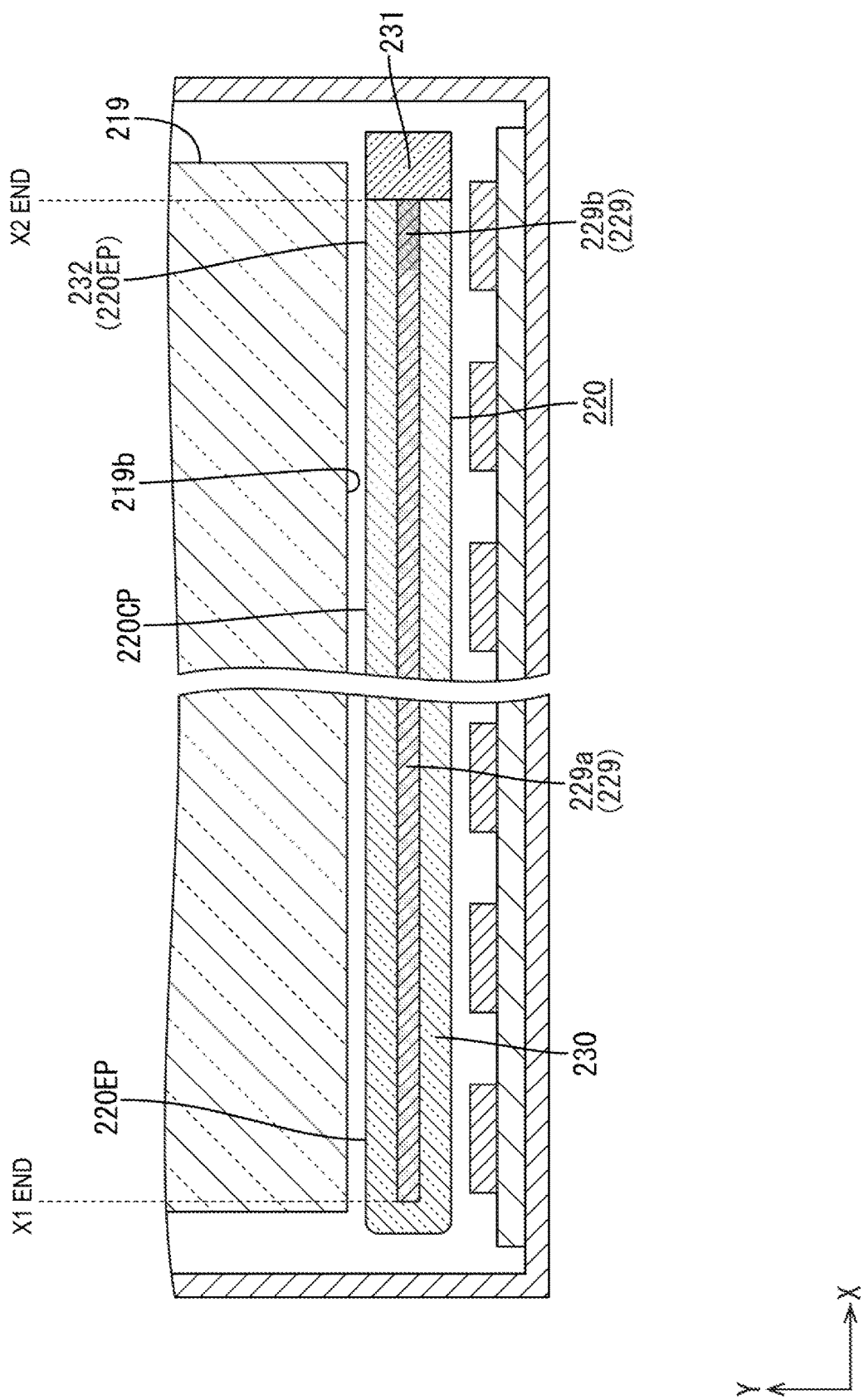
FIG. 19 is an enlarged horizontal sectional view of a backlight unit according to a third embodiment of the present invention.

As illustrated in FIG. 19, the wavelength converter 220 according to the present embodiment has a one-sided sealing structure such that a sealing portion 231 is provided only at one end portion 220EP and the end portion 220EP provided with the sealing portion 231 is formed as a great light emission portion 232. Specifically, at a stage before formation of a phosphor containing portion 229 in a manufacturing process, a container 230 forming the wavelength converter 220 is in a state in which one end portion 220EP opens to the outside and the other end portion 220EP is closed (see FIG. 21).

In the wavelength converter 220 with the above-described configuration, one end portion 220EP in the length direction of the wavelength converter 220 is sealed by the sealing portion 231 as illustrated in FIG. 19, and therefore, no phosphors are arranged at a portion corresponding to the dimension of the sealing portion 231 in the X-axis direction at an edge provided with the sealing portion 231. That is, in the wavelength converter 220 with the one-sided sealing structure, the size (the dimension in the X-axis direction) of the region provided with no phosphors at one edge provided with the sealing portion 231 is larger than that of the region provided with no phosphors at the other edge not provided with the sealing portion 231. Thus, the wavelength converter 220 of the present embodiment is configured such that one end portion 220EP with the relatively-large region provided with no phosphors is selectively formed as the great light emission portion 232. With this configuration, a color tone difference among light reaching a light entering end surface 219b of a light wide plate 219 through the end portion 220EP provided with the sealing portion 231 as the great light emission portion 232, light reaching the light entering end surface 219b through a center portion 220CP, and light reaching the light entering end surface 219b through the end portion 220EP not provided with the sealing portion 231 is less caused. Consequently, occurrence of color unevenness is more suitably reduced.

Figure 20:
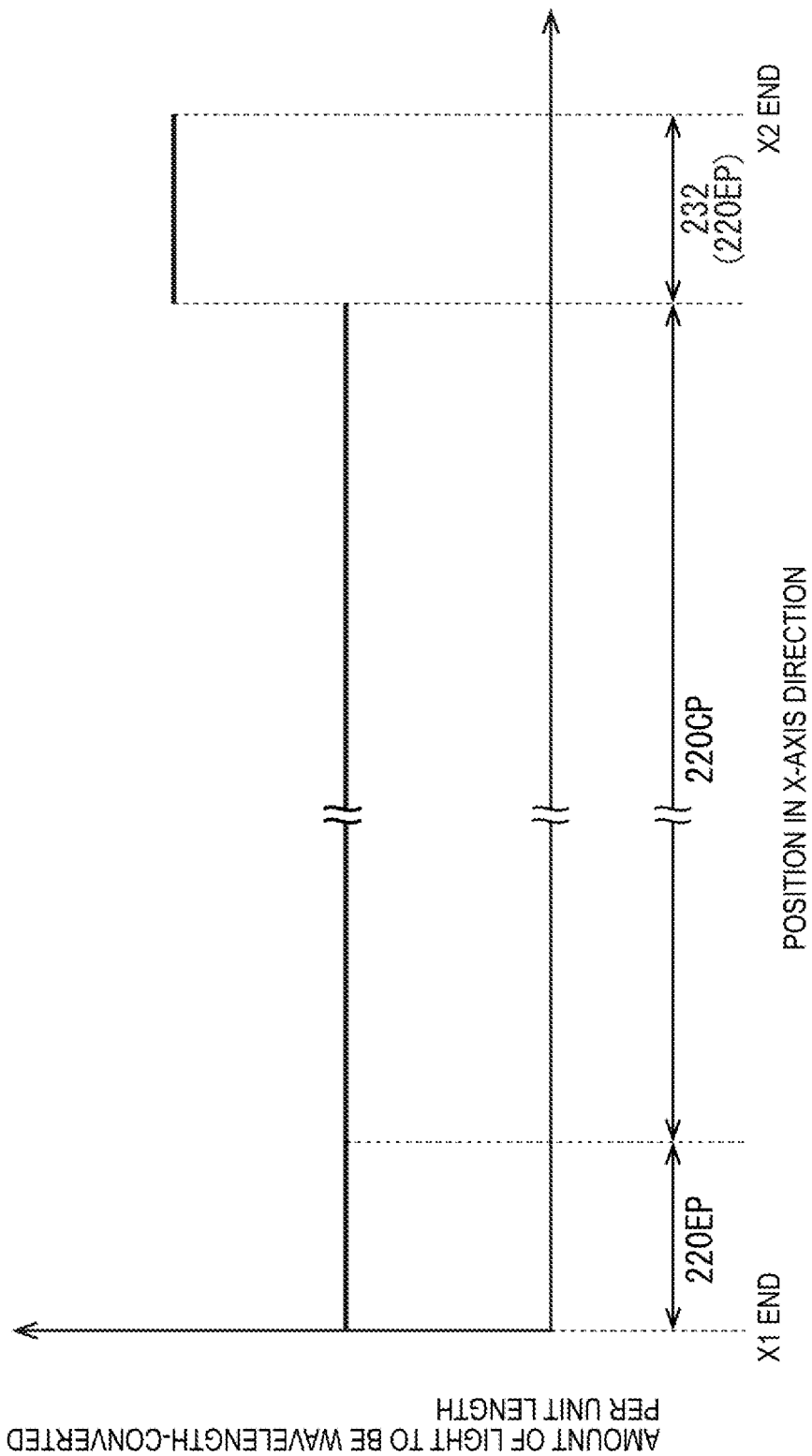
FIG. 20 is a graph of a change in the amount of light to be wavelength-converted per unit length from an X1 end to an X2 end of a wavelength converter.

As illustrated in FIG. 19, the phosphor containing portion 229 forming the wavelength converter 220 has a first phosphor containing portion 229a arranged at the center portion 220CP and the other end portion 220EP, and a second phosphor containing portion 229b arranged at one end portion 220EP as the great light emission portion 232 and having higher concentrations of contained phosphors (a red phosphor and a green phosphor) than those of the first phosphor containing portion 229a. That is, as illustrated in FIG. 20, the wavelength converter 220 is configured such that the content of the phosphors and the amount of light to be wavelength-converted per unit length in the X-axis direction are the same between the end portion 220EP not provided with the sealing portion 231 and the center portion 220CP. With this configuration, the second phosphor containing portion 229b is formed only at a single spot, and therefore, the cost for manufacturing the wavelength converter 220 is suitably reduced.

Figure 21:
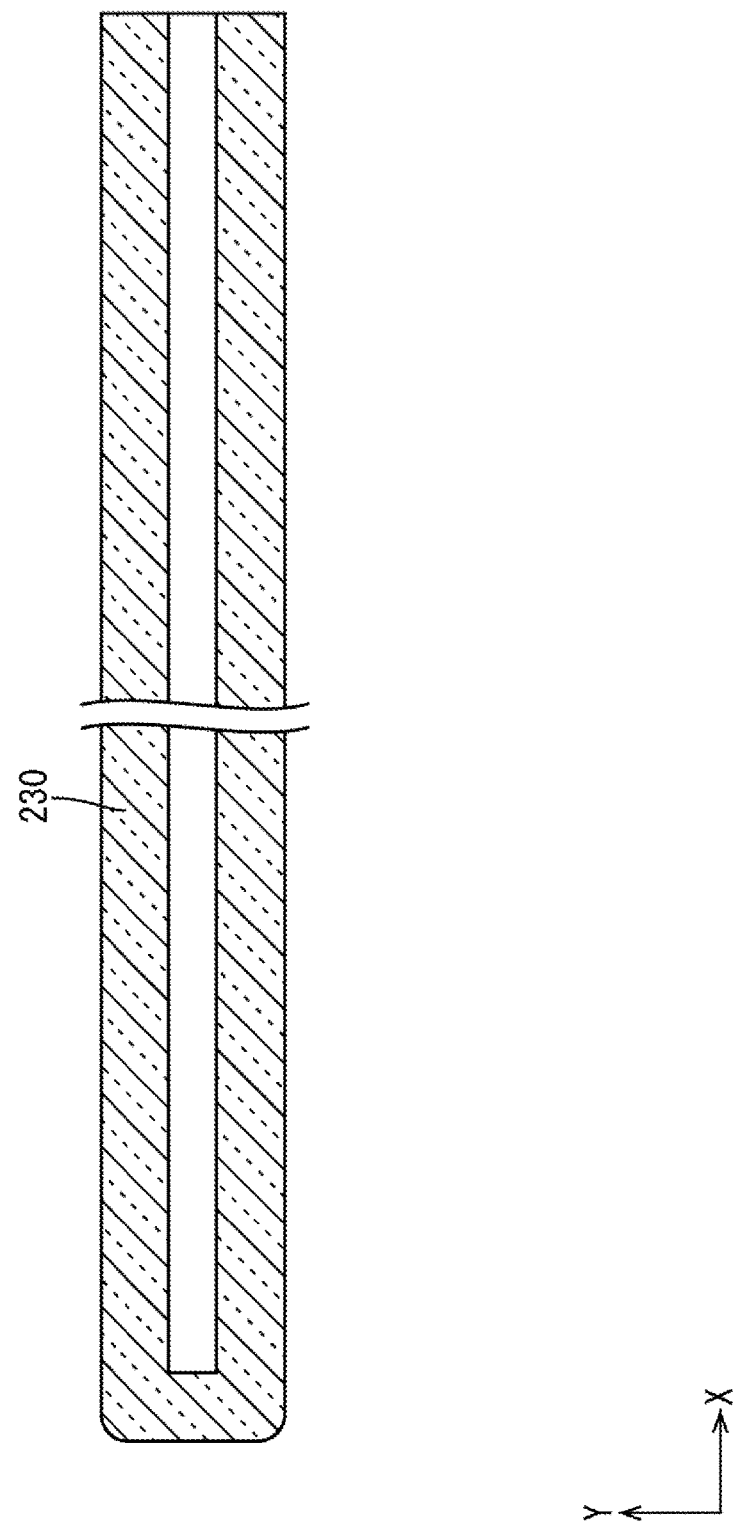
FIG. 21 is a sectional view of a container manufactured through a container producing step in the course of producing a wavelength converter.
Figure 22:
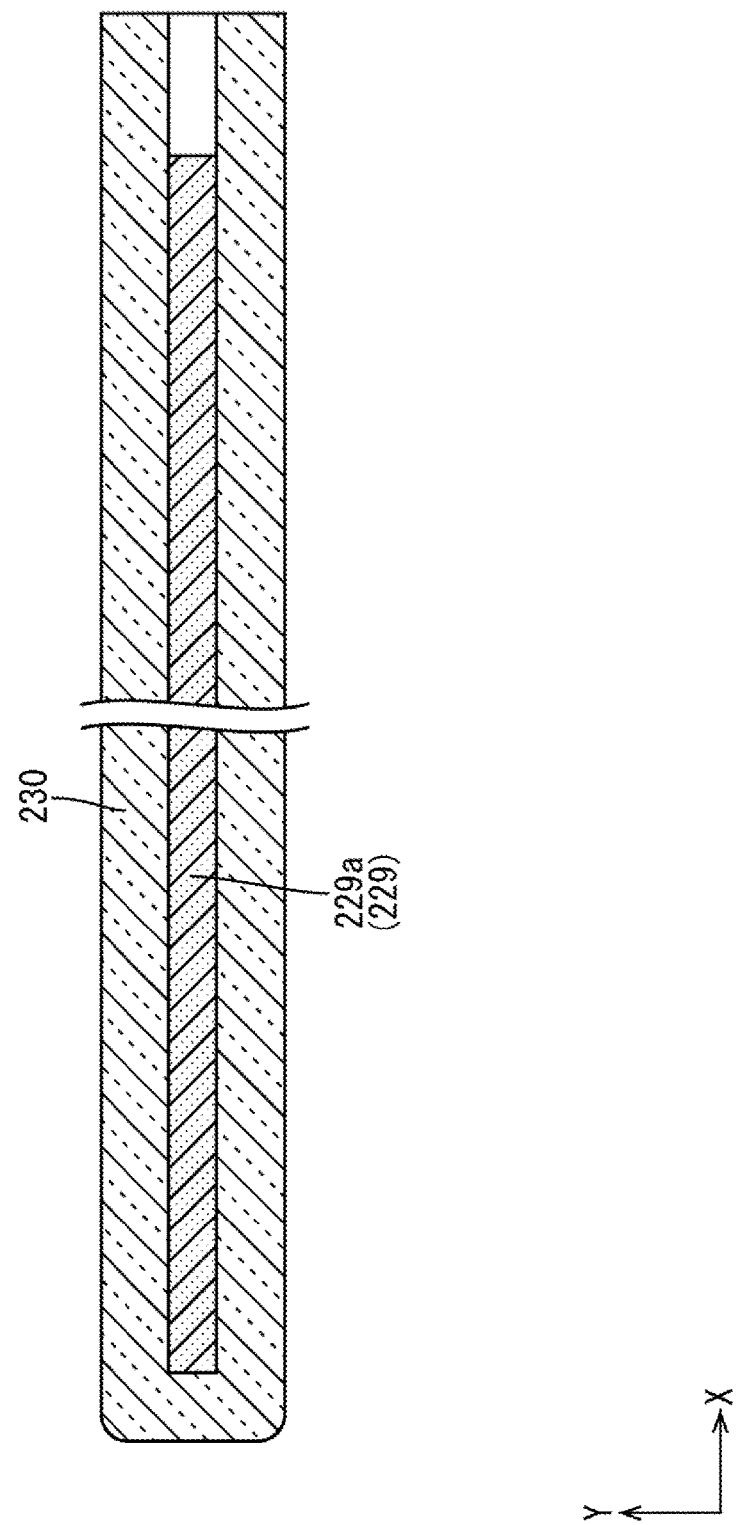
FIG. 22 is a sectional view of a state when a first phosphor solution injected into the container is hardened with light through a first phosphor solution injection step and a first phosphor solution hardening step in the course of manufacturing the wavelength converter.
Figure 23:
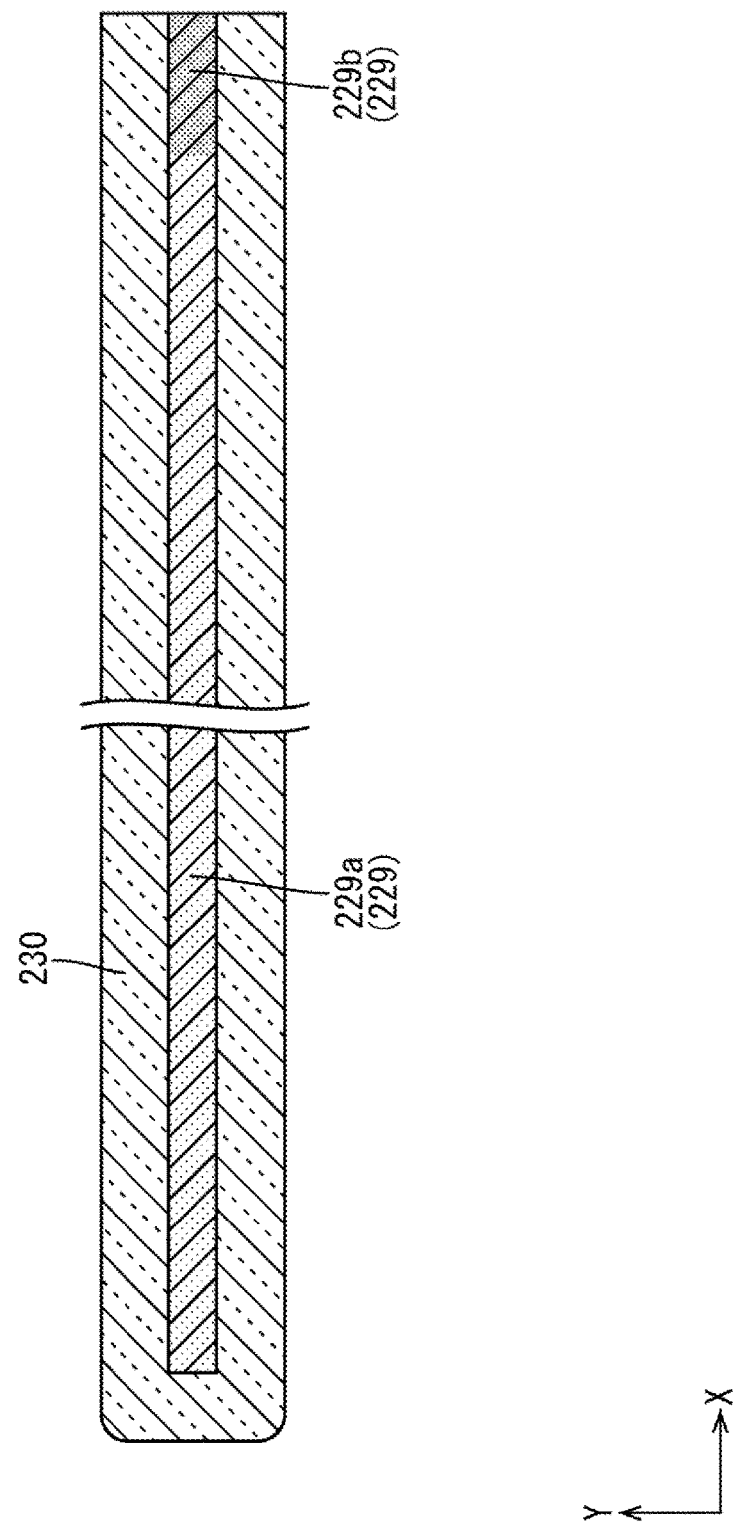
FIG. 23 is a sectional view of a state when a second phosphor solution injected into the container is hardened with light through a second phosphor solution injection step and a second phosphor solution hardening step in the course of manufacturing the wavelength converter.
Figure 24:
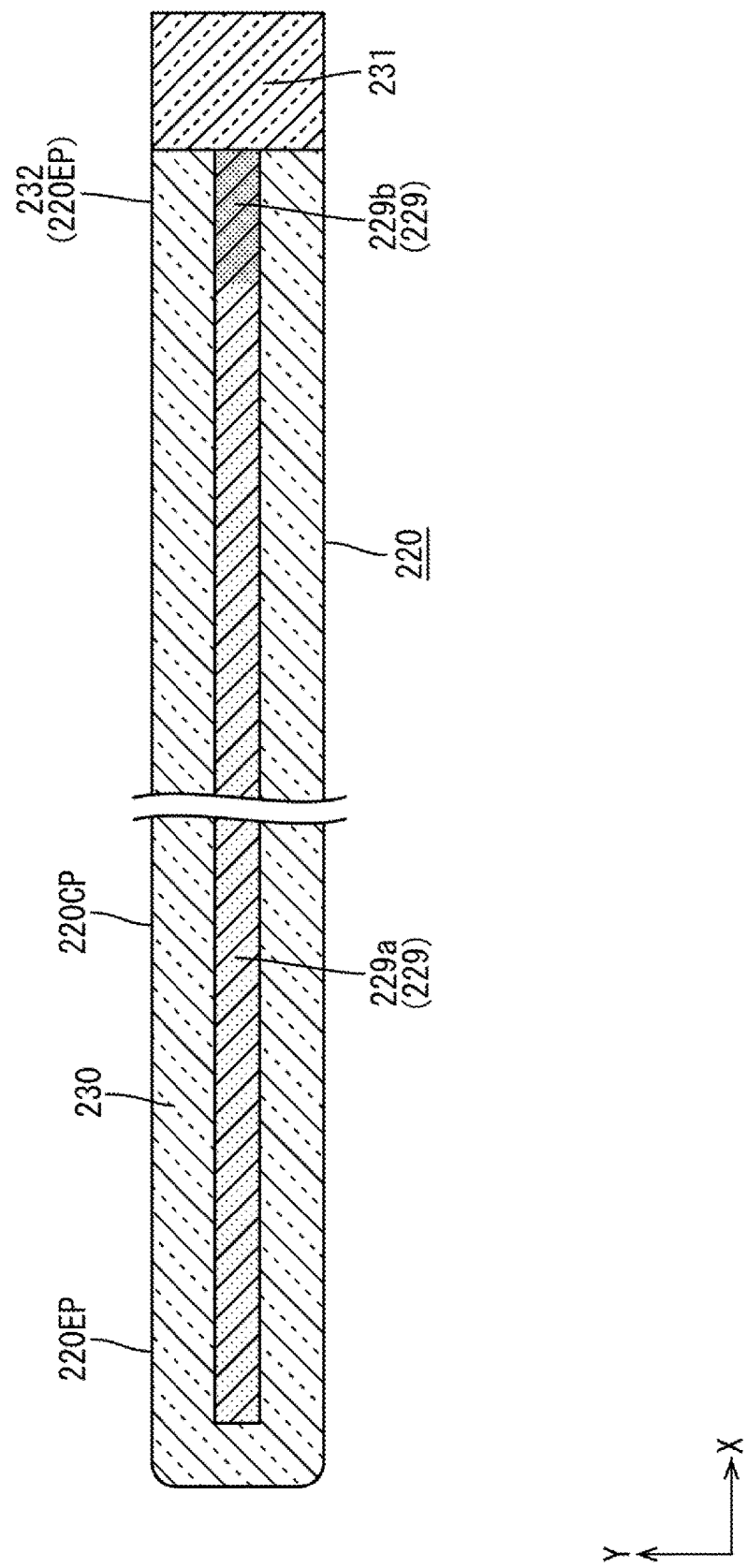
FIG. 24 is a sectional view of a state when an opening of one of both end portions of the container is sealed through a sealing step in the course of manufacturing the wavelength converter.

The method for manufacturing the wavelength converter 220 with the above-described configuration is performed as follows. At a container producing step, the cylindrical container 230 with a bottom is manufactured such that one end portion opens and the other end portion is closed as illustrated in FIG. 21. Subsequently, at a first phosphor solution injection step, a first phosphor solution is injected into the container 230 through an opening of one end portion thereof, and is selectively arranged at a center portion and the closed other end portion of the container 230 in the length direction thereof as illustrated in FIG. 22. In this state, almost no first phosphor solution is present at the opening of one end portion of the container 230. At a first phosphor solution hardening step, the first phosphor solution injected into the container 230 is hardened by irradiation with ultraviolet light, and in this manner, the first phosphor containing portion 229a is fixed at the center portion and the other end portion of the container 230 in the length direction thereof. As illustrated in FIG. 23, at a second phosphor solution injection step, a second phosphor solution is injected into the container 230 through the opening of one end portion thereof. In this state, the first phosphor solution has been injected and hardened in advance at the center portion and the other end portion of the container 230 in the length direction thereof, and therefore, the first phosphor containing portion 229a has been formed. Thus, the second phosphor solution injected at the second phosphor solution injection step is, without being mixed with the first phosphor solution, arranged at one end portion of the container 230 in the length direction thereof. At a second phosphor solution hardening step, the second phosphor solution injected into the container 230 is hardened by irradiation with ultraviolet light, and in this manner, the second phosphor containing portion 229b is fixed at one end portion of the container 230 in the length direction thereof. Thereafter, a sealing step is performed such that the opening of one end portion of the container 230 is sealed by the sealing portion 231 as illustrated in FIG. 24. As a result, the wavelength converter 220 configured such that the phosphor containing portion 229 is sealed in the container 230 is manufactured.

As described above, according to the present embodiment, the wavelength converter 220 is configured such that the sealing portion 231 is provided at one of both end portions 220EP in the length direction, and the end portion 220EP provided with the sealing portion 231 is formed as the great light emission portion 232. As described above, the sealing portion 231 is provided at one of both end portions 220EP of the wavelength converter 220 in the length direction thereof, and therefore, the area provided with no phosphors tends to be larger than the end portion 220EP not provided with the sealing portion 231. On this point, the end portion 220EP provided with the sealing portion 231 is formed as the great light emission portion 232, and therefore, a color tone difference among light reaching the light entering end surface 219b through such an end portion 220EP, light reaching the light entering end surface 219b through the center portion 220CP, and light reaching the light entering end surface 219b through the end portion 220EP not provided with the sealing portion 231 is less caused. Consequently, occurrence of color unevenness is more suitably reduced.

Moreover, the wavelength converter 220 is configured such that the amount of light to be wavelength-converted per unit length in the length direction is the same between the end portion 220EP not provided with the sealing portion 231 and the center portion 2200P. With this configuration, the cost for manufacturing the wavelength converter 220 is suitably reduced.

Fourth Embodiment

A fourth embodiment of the present invention will be described with reference to FIG. 25 or 26. In the fourth embodiment, the structure of a wavelength converter 320 is changed from that of the above-described third embodiment. Note that overlapping description of structures, features, and advantageous effects similar to those of the above-described third embodiment will not be made.

Figure 25:
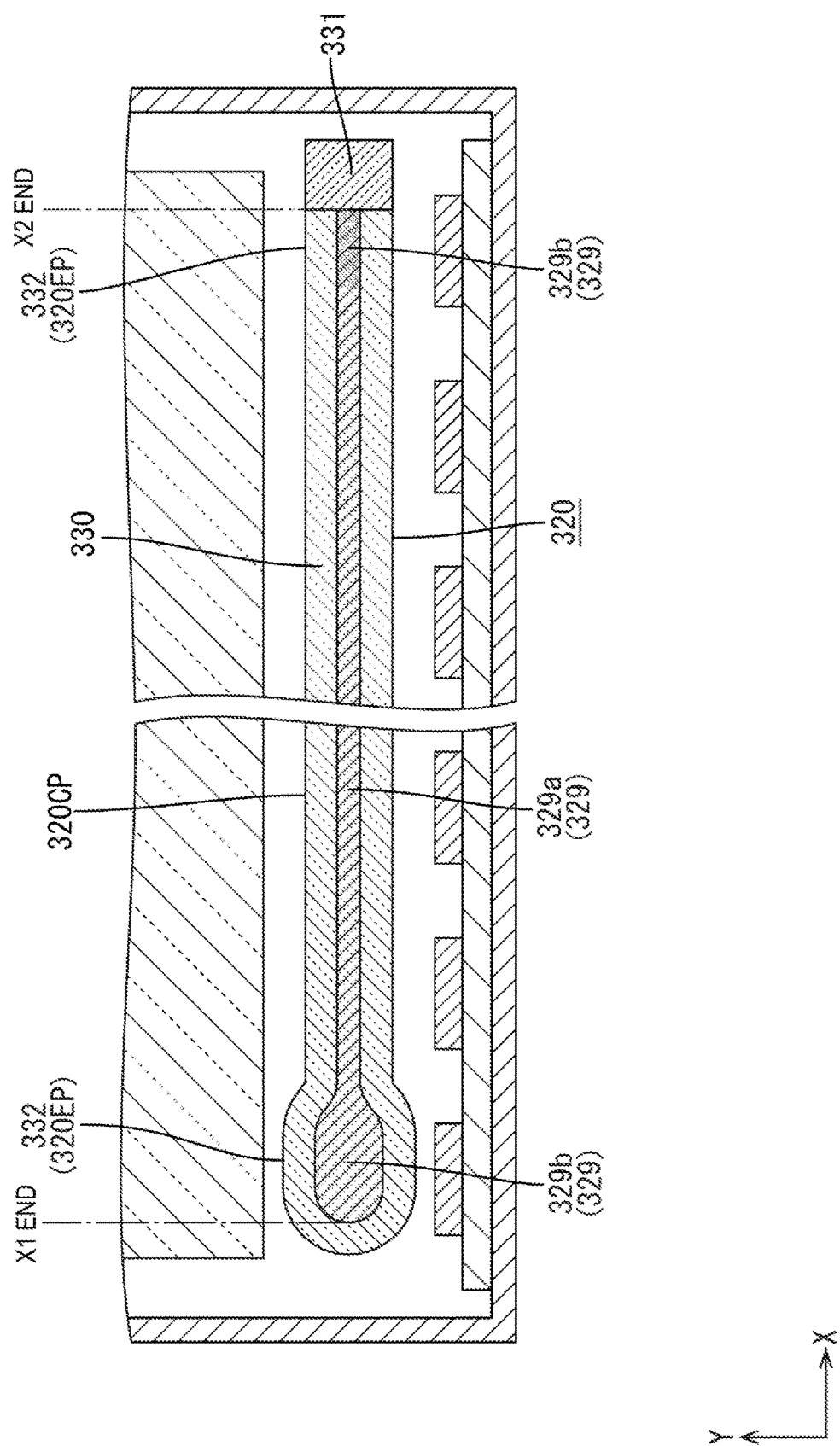
FIG. 25 is an enlarged horizontal sectional view of a backlight unit according to a fourth embodiment of the present invention.
Figure 26:
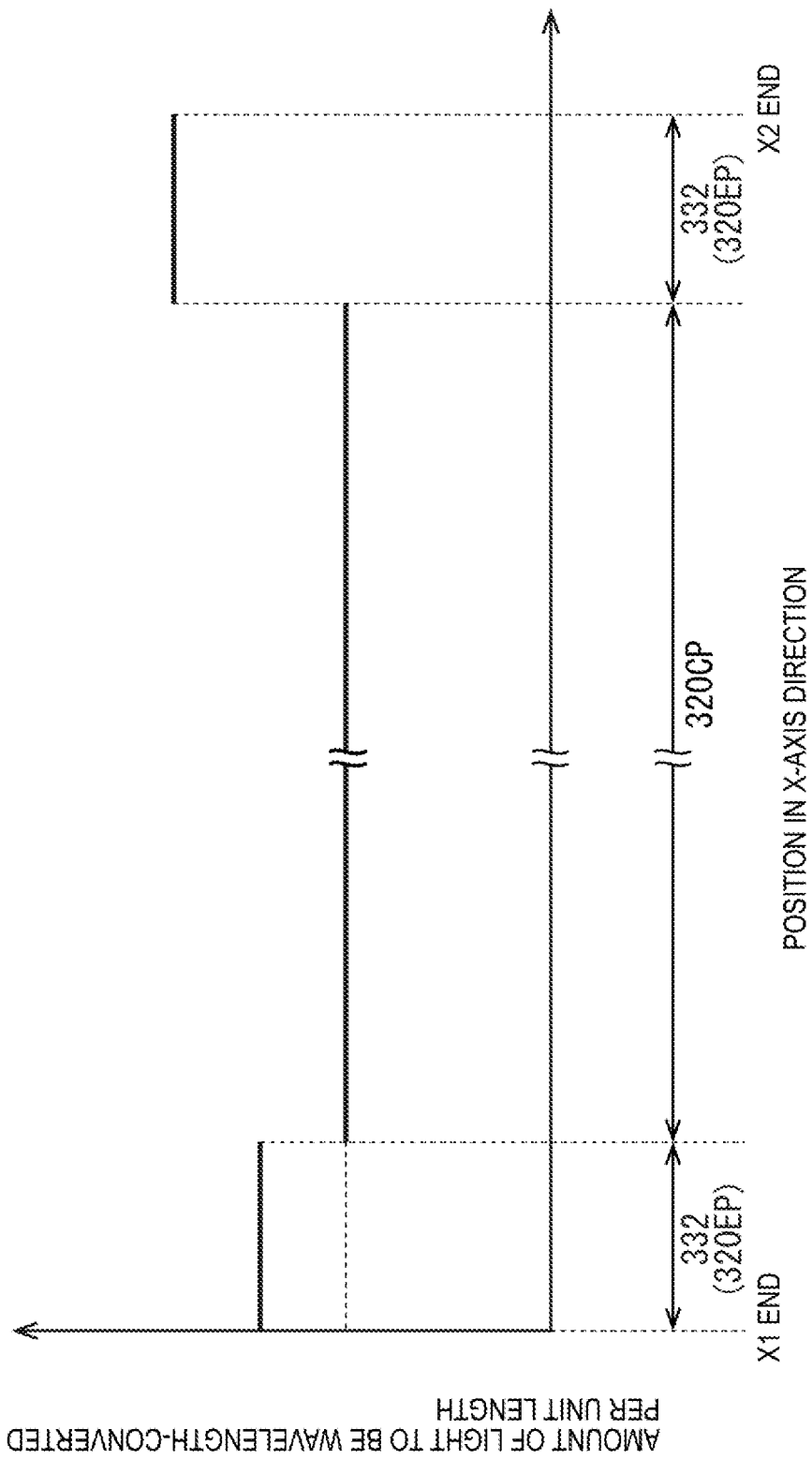
FIG. 26 is a graph of a change in the amount of light to be wavelength-converted per unit length from an X1 end to an X2 end of a wavelength converter.

As illustrated in FIG. 25, the wavelength converter 320 has a one-sided sealing structure such that the other end portion 320EP in the length direction of the wavelength converter 320, i.e., the end portion 320EP opposite to a sealing portion 331, is formed relatively thicker than a center portion 320CP and one end portion 320EP. Specifically, a container 330 forming the wavelength converter 320 is configured such that the other end portion has a greater diameter dimension than those of a center portion and one end portion, and therefore, an internal space of the other end portion is larger than those of the center portion and the one end portion. Thus, a phosphor containing portion 329 charged into the container 330 is configured such that a volume per unit length is greater at the other end portion 320EP than at the center portion 320CP and one end portion.

Moreover, in the present embodiment, the concentrations of contained phosphors in the phosphor containing portion 329 are set substantial y uniformly across the other end portion 320EP and the center portion 320CP. Thus, as illustrated in FIG. 26, a second phosphor containing portion 329b having relatively-greater contents of the phosphors and a relatively-greater amount of light to be wavelength-converted per unit length is arranged at the other end portion 320EP, whereas a first phosphor containing portion 329a having relatively-smaller contents of the phosphors and a relatively-smaller amount of light to be wavelength-converted per unit length is arranged at the center portion 320CP. That is, the other end portion 320EP is formed as a great light emission portion 332. In this embodiment, the other end portion 320EP has a bottom portion of the container 330 opposite to the sealing portion 331, and such a bottom portion forms a region provided with no phosphors. However, the second phosphor containing portion 329b having relatively-greater contents of the phosphors and a relatively-greater amount of light to be wavelength-converted per unit length is provided at the other end portion 320EP, and therefore, color unevenness is less caused at the other end portion 320EP. Further, in the present embodiment, the contents of the phosphors and the amount of light to be wavelength-converted per unit length are different between the second phosphor containing portions 329b of both end portions 320EP. The contents of the phosphors and the amount of light to be wavelength-converted at the second phosphor containing portion 329b of one end portion 320EP are greater than those at the second phosphor containing portion 329b of the other end portion 320EP. The other end port on 320EP has the bottom portion of the container 330, but such a region of the other end portion 320EP in the X-axis direction is narrower than that of the sealing portion 331. That is, one end portion 320EP and the other end portion 320EP are set such that the contents of the phosphors and the amount of light to be wavelength-converted per unit length are proportional to the size of the region provided with no phosphors, and therefore, a color tone difference between both end portions 320EP is less caused.

Fifth Embodiment

A fifth embodiment of the present invention will be described with reference to FIG. 27. In the fifth embodiment, the number of installed wavelength converters 420 is changed from that of the above-described first embodiment. Note that overlapping description of structures, features, and advantageous effects similar to those of the above-described first embodiment will not be made.

Figure 27:
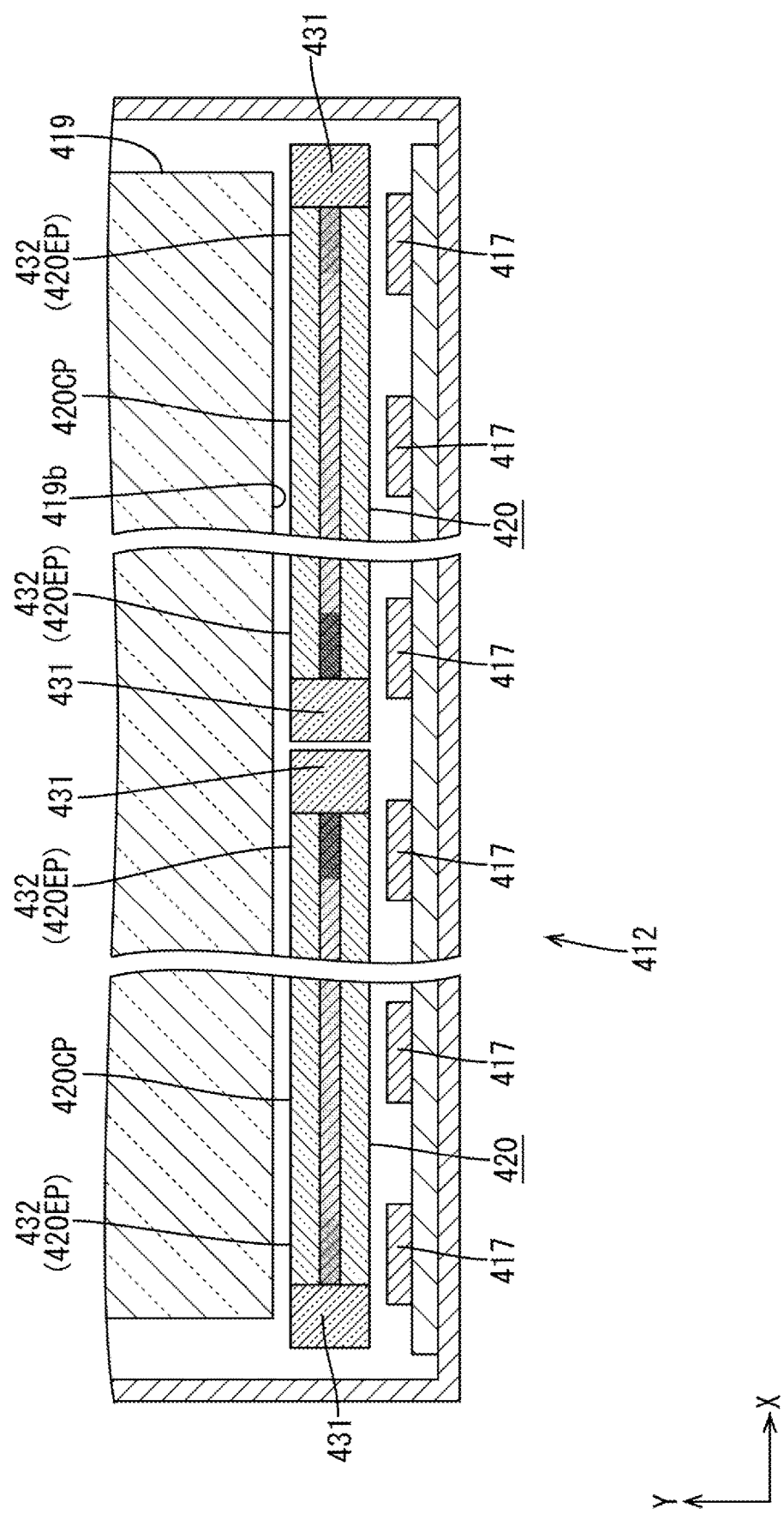
FIG. 27 is an enlarged horizontal sectional view of a backlight unit according to a fifth embodiment of the present invention.

As illustrated in FIG. 27, two wavelength converters 420 are, according to the present embodiment, arranged adjacent to each other along the length direction of a light entering end surface 419b of a light guide plate 419. The two wavelength converters 420 are arranged linearly along the X-axis direction at a space among LEDs 417 and the light guide plate 419 such that the axes thereof are substantially coincident with each other. Both non-adjacent end portions 420EP of the two wavelength converters 420 are each positioned on both outer sides (both ends) of a backlight unit 412 in the X-axis direction (the length direction of the light entering end surface 419b), whereas both adjacent end portions 420EP of the two wavelength converters 420 are positioned at the center of the backlight unit 412 in the X-axis direction. Such use of the two wavelength converters 420 as described above is suitable for a larger backlight unit 412.

Moreover, the two wavelength converters 420 arranged along the X-axis direction are configured such that both non-adjacent end portions 420EP are each formed as great light emission portions 432 and both adjacent end portions 420EP are also each formed as great light emission portions 432. With this configuration, light from the LEDs 417 is efficiently wavelength-converted by the pair of great light emission portions 432 even in a position relationship in which the region of the wavelength converter 420 provided with no phosphors overlaps with the LED 417 on each end side of the light entering end surface 419b of the light guide plate 419 in the length direction (the X-axis direction) thereof due to frame-size reduction of the backlight unit 412. Thus, color unevenness is less caused even with advancement of frame-size reduction. Moreover, even in a case where the two wavelength converters 420 are arranged with positional shift from the LEDs 417 in the length direction, both non-adjacent end portions 420EP are formed as the great light emission portions 432, and therefore, occurrence of color unevenness is suitably reduced.

Further, the contents of phosphors and the amount of light to be wavelength-converted per unit length in the X-axis direction are relatively greater at the pair of adjacent end portions 420EP of the two wavelength converters 420 arranged along the X-axis direction than at the pair of non-adjacent end portions 420EP of the two wavelength converters 420. Both adjacent end portions 420EP are arranged at the center in the length direction of the light entering end surface 419b of the light guide plate 419, and therefore, the region provided with no phosphors has a wide size corresponding to two sealing portion 431. However, the contents of the phosphors and the amount of light to be wavelength-converted per unit length are relatively increased as described above, and therefore, occurrence of color unevenness at the center the length direction of the light entering end surface 419b is suitably reduced.

As described above, according to the present embodiment, the multiple wavelength converters 420 are arranged along the length direction. Of the end portions 420EP in the length direction, at least both non-adjacent end portions 420EP are each formed as the great light emission portions 432. With advancement of frame-size reduction of the backlight unit 412, the position relationship in which the region of the wavelength converter 420 provided with no phosphors overlaps with the LED 417 is easily brought on each end side in the length direction of the light entering end surface 419b of the light guide plate 419. On this point, both non-adjacent end portions 420EP of the end portions 420EP of the multiple wavelength converters 420 in the length direction thereof are each formed as the great light emission portions 432. Thus, even in the position relationship in which the region of the wavelength converter 420 provided with no phosphors overlaps with the LED 417 on each end side in the length direct on of the light entering end surface 419b of the light guide plate 419, the light from the LEDs 417 is efficiently wavelength-converted by the pair of great light emission portions 432. Thus, color unevenness is less caused even with advancement of frame-size reduction.

Sixth Embodiment

A sixth embodiment of the present invention will be described with reference to FIG. 28. In the sixth embodiment, the number of installed wavelength converters 520 is, as in the fifth embodiment, changed from that of the above-described third embodiment. Note that overlapping description of structures, features, and advantageous effects similar to those of the above-described third and fifth embodiments will not be made.

Figure 28:
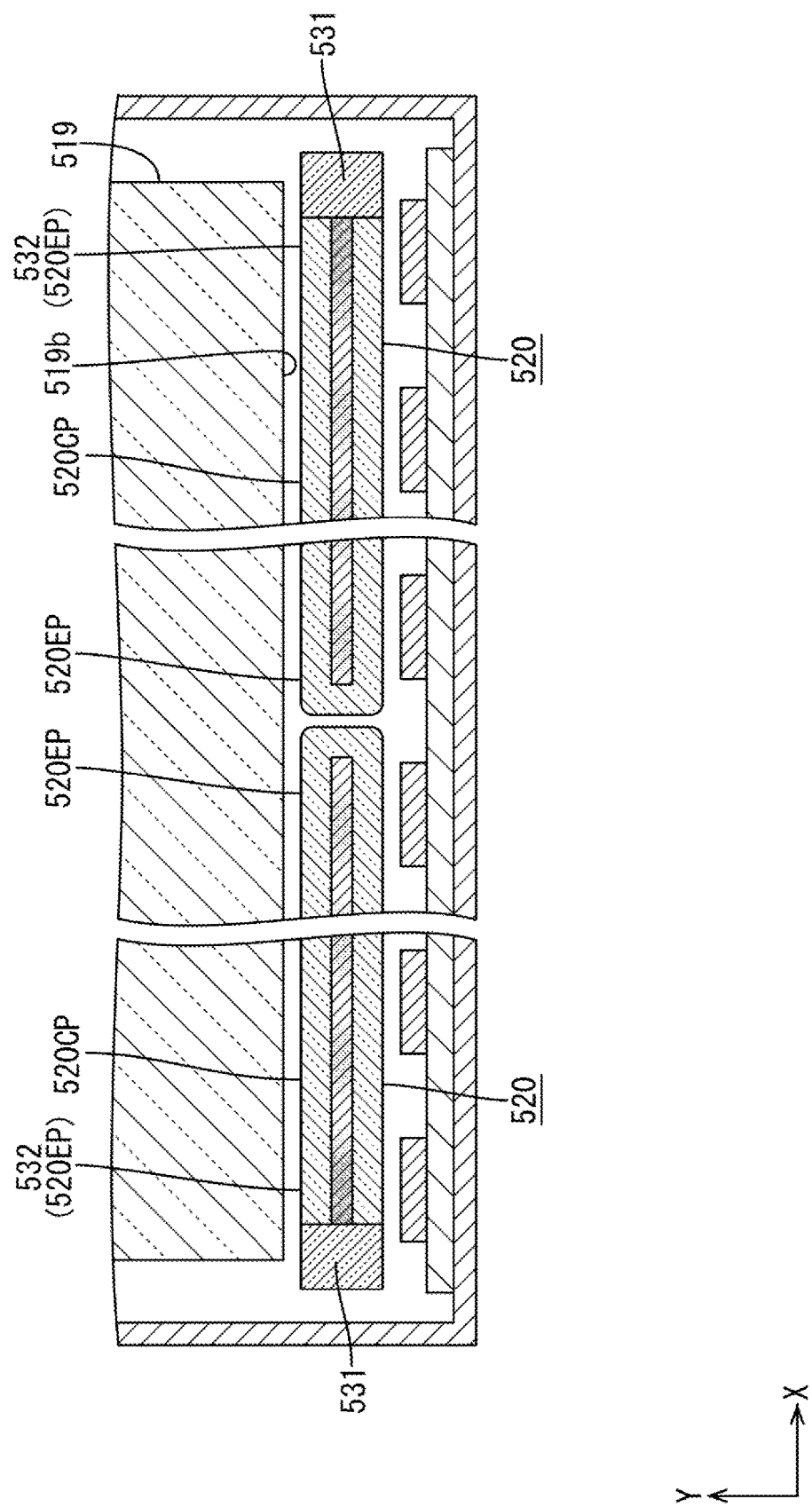
FIG. 28 is an enlarged horizontal sectional view of a backlight unit according to a sixth embodiment of the present invention.

As illustrated in FIG. 28, two wavelength converters 520 are, according to the present embodiment, arranged adjacent to each other along the length direction of a light entering end surface 519b of a light guide plate 519. Of the two wavelength converters 520, both non-adjacent end portions 520EP are each formed as great light emission portions 532, and both adjacent end portions 520EP are not formed as great light emission portions 532. That is, the contents of phosphors and the amount of light to be wavelength-converted per unit length in the X-axis direction are substantially equal between the pair of adjacent end portions 520EP and a center portion 520CP. As described above, the two wavelength converters 520 are arranged such that one end portions 520EP as the great light emission portions 532 provided with sealing portions 531 are each positioned on both outer sides (both ends) in the length direction (the X-axis direction) of the light entering end surface 519b of the light guide plate 519 and the other end portions 520EP not provided with the sealing portions 531 are positioned at the center in the length direction of the light entering end surface 519b.

Seventh Embodiment

A seventh embodiment of the present invention will be described with reference to FIG. 29. In the seventh embodiment, a formation area of each second phosphor containing portion 629b is changed from that of the above-described first embodiment. Note that overlapping description of structures, features, and advantageous effects similar to those of the above-described first embodiment will not be made.

Figure 29:
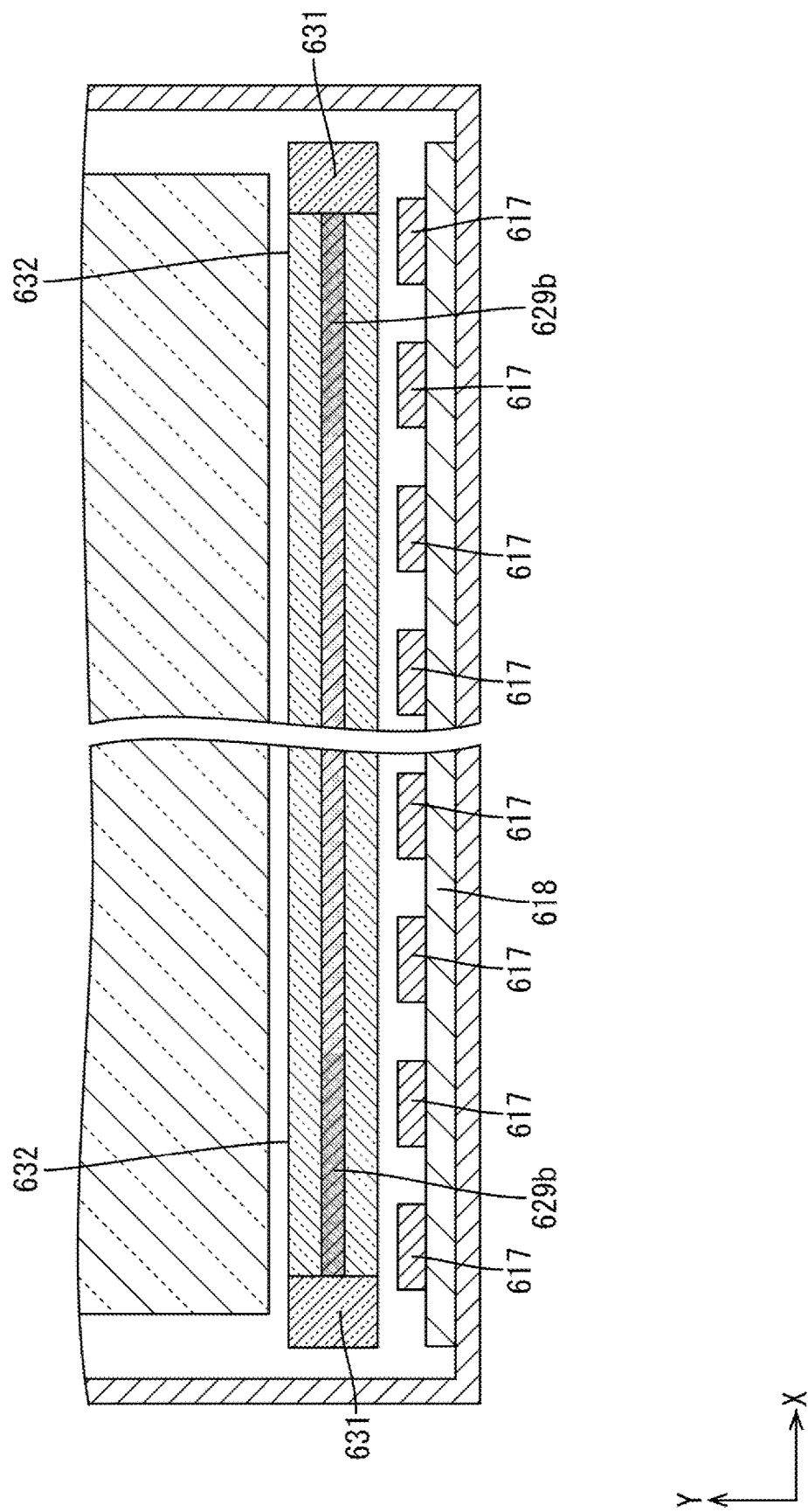
FIG. 29 is an enlarged horizontal sectional view of a backlight unit according to a seventh embodiment of the present invention.

As illustrated in FIG. 29, the second phosphor containing portions 629b provided at great light emission portions 632 according to the present embodiment are in a position relationship such that the second phosphor containing portions 629b overlap, in the X-axis direction, with not only some LEDs 617 positioned at ends of an LED substrate 618 in the X-axis direction but also most of adjacent LEDs 617. That is, the second phosphor containing portions 629b are in overlapping arrangement in the X-axis direction such that each second phosphor containing portion 629b extends over the multiple LEDs 617. The size of each LED 617 is more reduced as compared to that described above in the first embodiment, and therefore, the position relationship in which most of the LEDs 617 positioned at the ends of the LED substrate 618 in the X-axis direction overlap with sealing portions 631 in the X-axis direction is brought Thus, the second LED 617 from the end in the X-axis direction is also arranged to overlap with the second phosphor containing portion 629b in the X-axis direction. With this configuration, occurrence of color unevenness can be suitably reduced.

Eighth Embodiment

An eighth embodiment of the present invention will be described with reference to FIGS. 30 to 32. In the eighth embodiment, the structure for holding a wavelength converter 720 is added to the above-described first embodiment. Note that overlapping description of structures, features, and advantageous effects similar to those of the above-described first embodiment will not be made.

Figure 30:
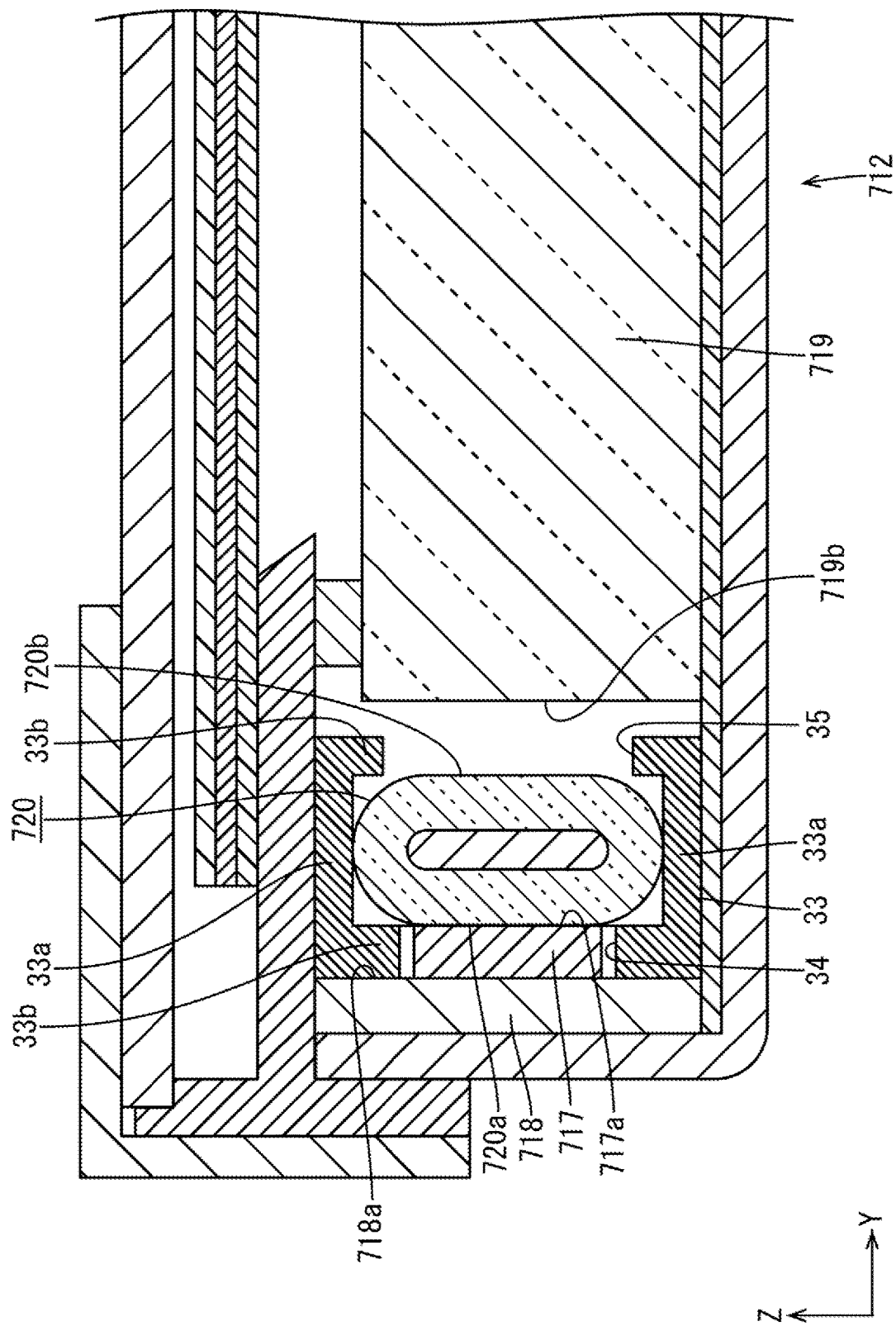
FIG. 30 is an enlarged sectional side view of a backlight unit according to an eighth embodiment of the present invention.
Figure 31:
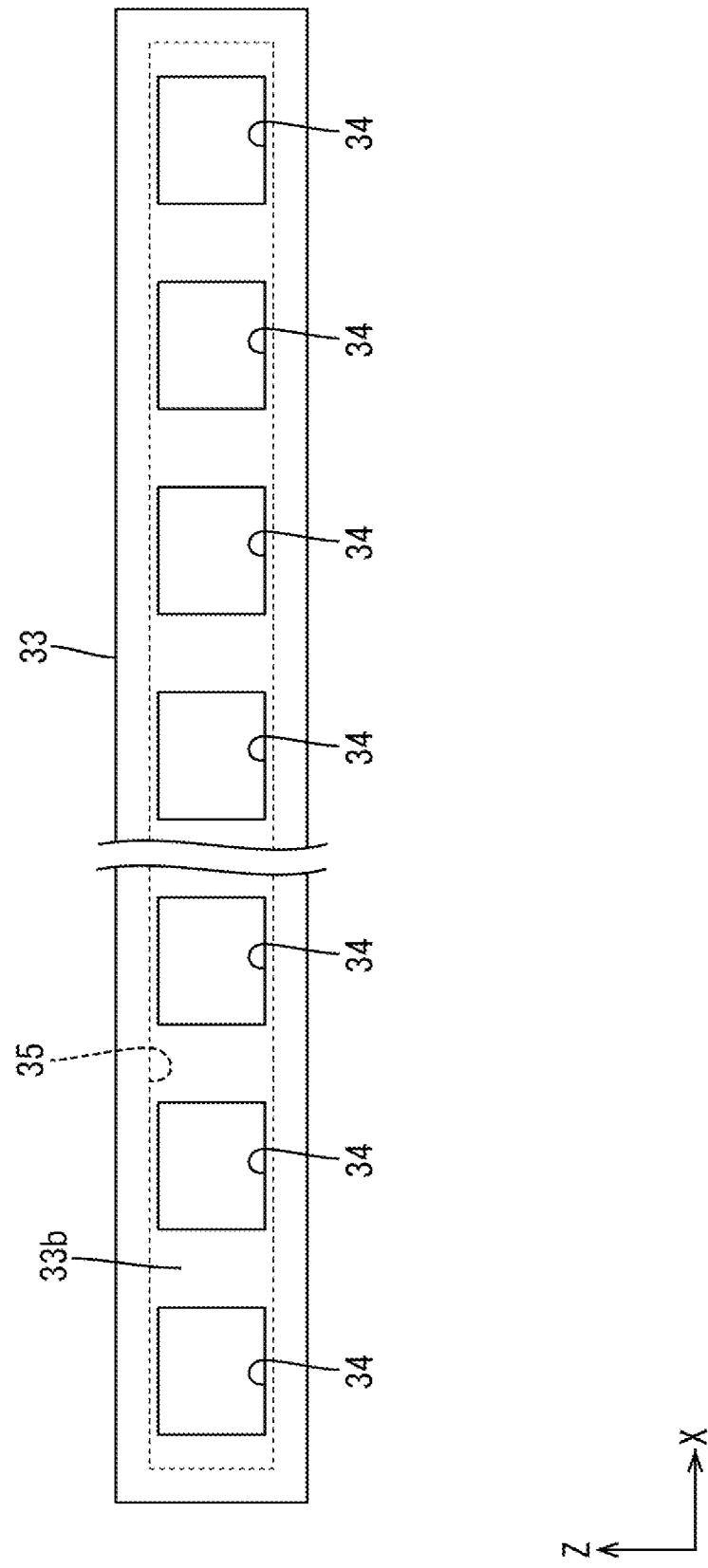
FIG. 31 is a front view of a holder.

As illustrated in FIG. 30, the wavelength converter 720 according to the present embodiment is held by a holder 33 at a position between an LED 717 and a light entering end surface 719b of a light guide plate 719 in a backlight unit 712. The holder 33 is made of synthetic resin exhibiting excellent light reflectivity and showing a white color, and is in a substantially cylindrical shape housing the wavelength converter 720 to surround the wavelength converter 720 across the substantially entire length thereof. The holder 33 has a pair of first wall portions 33a sandwiching the wavelength converter 720 in an upper-to-lower direction, i.e., in the Z-axis direction, as viewed in FIG. 30, and a pair of second wall portions 33b sandwiching the wavelength converter 720 in a right-to-left direction (a front-to-back direction), i.e., the Y-axis direction, as viewed in FIG. 30. The wavelength converter 720 is, across the substantially entire length thereof, surrounded and held by these wall portions 33a, 33b.

Of both second wall portions 33b forming the holder 33, the left (the LED substrate 718 side) second wall portion 33b as viewed in FIG. 30 is provided with LED housing openings 34 each housing the LEDs 717. The multiple LED housing openings 34 are provided as independent openings at the second wall portion 33b such that each LED 717 mounted on an LED substrate 718 is separately housed. The multiple (the same number as that of the LEDs 717) LED housing openings 34 are arranged along the X-axis direction at the second wall portion 33b, and the interval of array of the LED housing openings 34 is coincident with the interval of array of the LEDs 717 on the LED substrate 718. The second wall portion 33b provided with the LED housing openings 34 is, at an outer surface thereof, fixed in contact with a mounting surface 718a of the LED substrate 718. The LEDs 717 each housed in the LED housing openings 34 are held in a position relationship in which light emission surfaces 717a of the LEDs 717 substantially contact a light input surface 720a of the wavelength converter 720. With this configuration, light emitted from the light emission surfaces 717a of the LEDs 717 is more efficiently input to the light input surface 720a of the wavelength converter 720.

Figure 32:
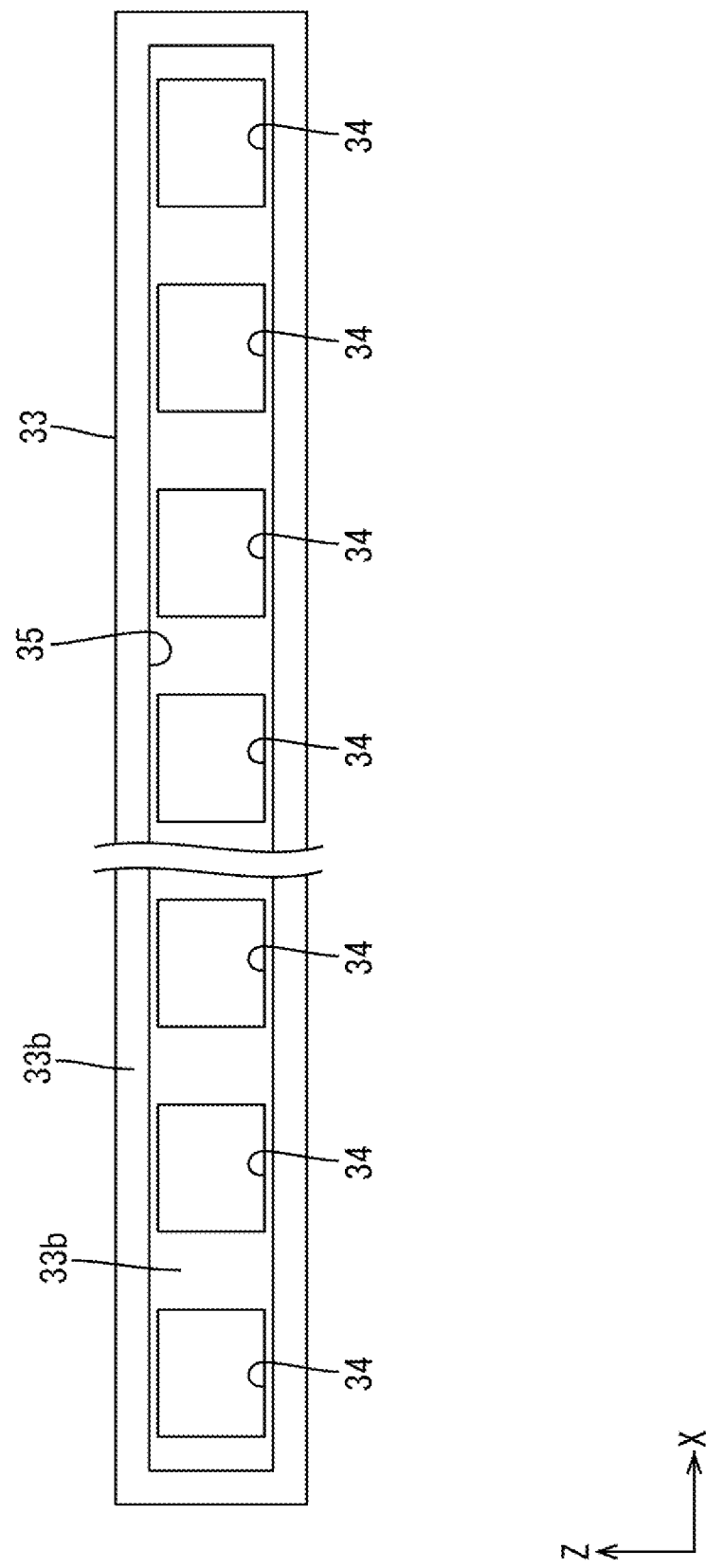
FIG. 32 is a back view of the holder.

Of both second wall portions 33b forming the holder 33, the right (the light guide plate 719 side) second wall portion 33b as viewed in FIG. 30 is, as illustrated in FIGS. 30 and 32, provided with a light transmission opening 35 for allowing passage of light from a light output surface 720b of the wavelength converter 720 and inputting the light to the light entering end surface 719b of the light guide plate 719. The light transmission opening 35 is, as an elongated opening extending along the X-axis direction, provided at the second wall portion 33b, and a formation area of the light transmission opening 35 is set to a size such that the light transmission opening 35 includes a formation area of all of the LED housing openings 34. With this configuration, the light having transmitted through the wavelength converter 720 from, each LED 717 can be efficiently input to the light entering end surface 719b of the light guide plate 719. The second wall portion 33b provided with the light transmission opening 35 is arranged such that an outer surface thereof faces the light entering end surface 719b of the light guide plate 719 with a predetermined clearance in the Y-axis direction. Thus, in a case where the temperature of environment in the backlight unit 712 is increased and the light guide plate 719 is thermally expanded accordingly, the thermally-expanded light guide plate 719 comes into contact with the second wall portion 33b provided with the light transmission opening 35 before coming into contact with the wavelength converter 720. That is, displacement of the thermally-expanded light guide plate 719 can be restricted by the second wall portion 33b provided with the light transmission opening 35, and therefore, direct action of stress from the light guide plate 719 on the wavelength converter 720 and the LEDs 717 can be prevented.

Ninth Embodiment

A ninth embodiment of the present invention will be described with reference to FIG. 33. In the ninth embodiment, the number of installed LED substrates 818 and the number of installed wavelength converters 820 are changed from those of the above-described first embodiment. Note that overlapping description of structures, features, and advantageous effects similar to those of the above-described first embodiment will not be made.

Figure 33:
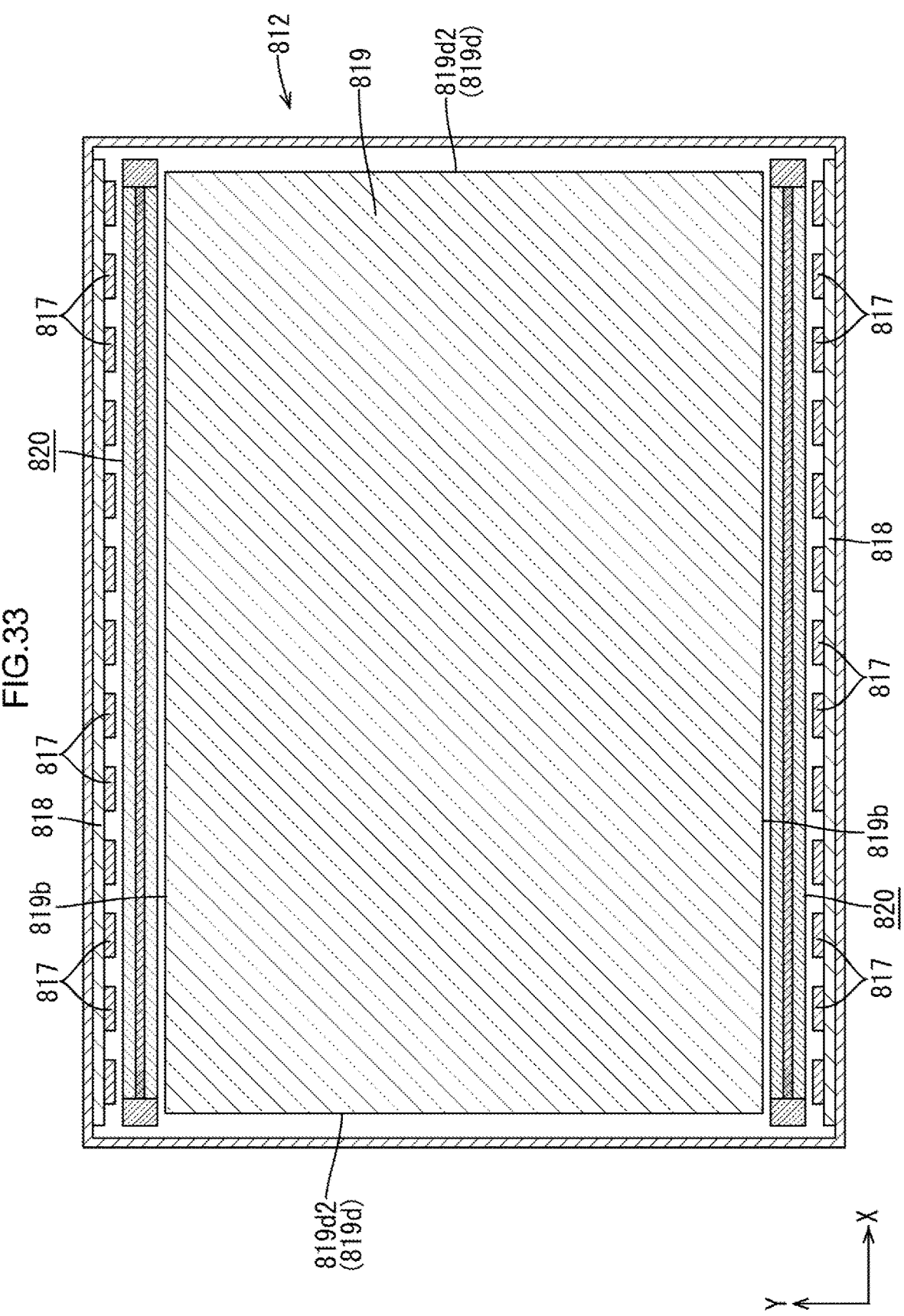
FIG. 33 is a horizontal sectional view of a backlight unit according to a ninth embodiment of the present invention.

As illustrated in FIG. 33, a backlight unit 812 according to the present embodiment is configured such that LEDs 817 and the LED substrates 818 are arranged at both long-side end portions. Specifically, both LED substrates 818 are arranged such that the LEDs 817 mounted on the LED substrates 818 face both long-side end surfaces of an outer peripheral end surface of a light guide plate 819. Thus, in the present embodiment, the long-side end surfaces of the outer peripheral end surface of the light guide plate 819 are each formed as light entering end surfaces 819b to which light from the LEDs 817 is input. On the other hand, the remaining short-side end surfaces are each formed as non-light-input end surfaces 819d. Thus, the non-light-input end surfaces 819d according to the present embodiment do not include the non-light-input opposite end surface 19d1 (see FIG. 3) as in the above-described first embodiment, but include only a pair of non-light-input-side end surfaces 819d2 adjacent to the light entering end surfaces 819b. As described above, the backlight unit 812 according to the present embodiment is of a both-sided light input type such that the light guide plate 819 is sandwiched from both sides in the short-side direction (the Y-axis direction) of the light guide plate 619 by the pair of LED substrates 818 and the LEDs 817 mounted on the LED substrates 818.

Moreover, the pair of wavelength converters 820 is interposed among the LED substrates 818 and the light entering end surfaces 819b. With this configuration, the light emitted from each LED 817 of the LED substrates 818 is wavelength-converted by each wavelength converter 820, and then, is input to each light entering end surface 819b of the light guide plate 819.

Tenth Embodiment

A tenth embodiment of the present invention will be described with reference to FIG. 34. In the tenth embodiment, the number of installed LED substrates 918 and the number of installed wavelength converters 920 are changed from those of the above-described ninth embodiment. Note that overlapping description of structures, features, and advantageous effects similar to those of the above-described ninth embodiment will not be made.

Figure 34:
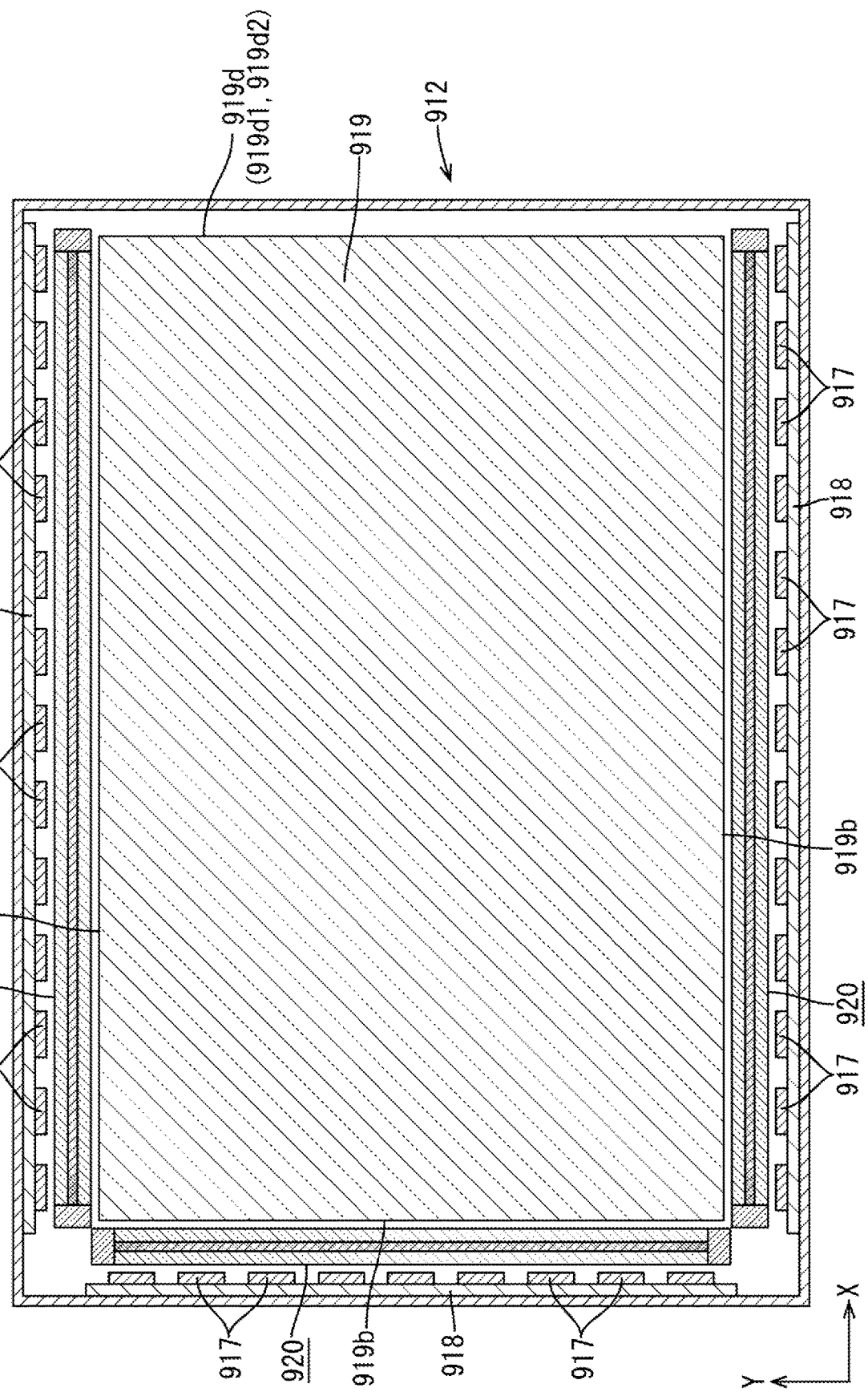
FIG. 34 is a horizontal sectional view of a backlight unit according to a tenth embodiment of the present invention.

As illustrated in FIG. 34, a backlight unit 912 according to the present embodiment is configured such that LEDs 917 and the LED substrates 918 are arranged at both long-side end portions and one (the left as viewed in FIG. 34) short-side end portion. Specifically, each LED substrate 918 is arranged such that the LEDs 917 mounted on such an LED substrate 918 face a co responding one of both long-side end surfaces and one of the short-side end surfaces of an outer peripheral end surface of a light guide plate 819. Thus, in the present embodiment, each of both long-side end surfaces and one of the short-side end surfaces of the outer peripheral end surface of the light guide plate 919 is formed as a light entering end surface 919b to which light from the LEDs 917 is input. On the other hand, the remaining other short-side end surface is formed as a non-light-input end surface 919d. Thus, the non-light-input end surface 919d according to the present embodiment serves as a non-light-input opposite end surface 919d1 for the short-side light entering end surface 919b, and serves as a non-light-input-side end surface 919d2 for the pair of long-side light entering end surfaces 919b. As described above, the backlight unit 912 according to the present embodiment is of a three-sided light input type such that the light is input to the light guide plate 919 from the three LED substrates 918 arranged along three sides of the light guide plate 919 and each LED 917 mounted on the LED substrates 918.

Moreover, three wavelength converters 920 are interposed among the LED substrates 918 and the light entering end surfaces 919b. With this configuration, the light emitted from each LED 917 of the LED substrates 918 is wavelength-converted by the wavelength converters 920, and then, is input to the light entering end surfaces 919b of the guide plate 919.

Eleventh Embodiment

An eleventh embodiment of the present invention will be described with reference to FIG. 35. In the eleventh embodiment, the number of installed LED substrates 1018 and the number of installed wavelength converters 1020 are changed from those of the above-described ninth embodiment. Note that overlapping description of structures, features, and advantageous effects similar to those of the above-described ninth embodiment will not be made.

Figure 35:
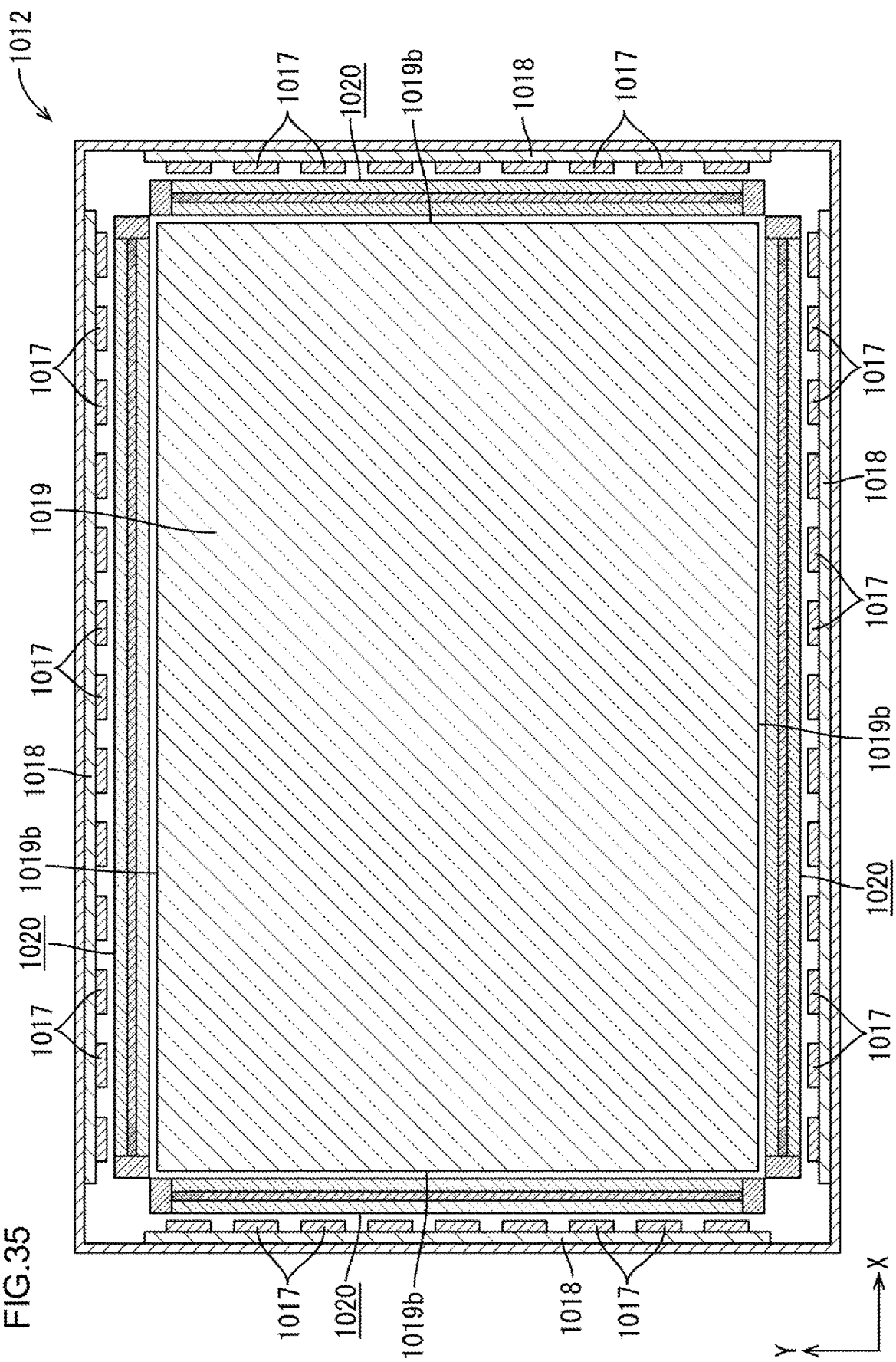
FIG. 35 is a horizontal sectional view of a backlight unit according to an eleventh embodiment of the present invention.

As illustrated in FIG. 35, a backlight unit 1012 according to the present embodiment is configured such that LEDs 1017 and the LED substrates 1018 are arranged at both long-side end portions and both short-side end portions, i.e., are formed across the entire circumference of an outer peripheral end portion. Specifically, the LED substrates 1018 are arranged such that the LEDs 1017 mounted on the LED substrates 1018 face a light guide plate 1019 across the entire circumference of an outer peripheral end surface thereof. Thus, in the present embodiment, it is configured such that the entire circumference of the outer peripheral end surface of the light guide plate 1019 is formed as light entering end surfaces 1019b to which light from the LEDs 1017 is input and no non-light-input end surface is formed at the outer peripheral end surface of the light guide plate 1019. As described above, the backlight unit 1012 according to the present embodiment is of a four-sided light input type such that the light is input to the light guide late 1019 from the four LED substrates 1018 arranged along the four sides of the light guide plate 1019 and the LEDs 1017 mounted on the LED substrates 1018.

Moreover, four wavelength converters 1020 are interposed among the LED substrates 1018 and the light entering end surfaces 109b. With this configuration, the light emitted from each LED 1017 of the LED substrates 1018 is wavelength-converted by the wavelength converters 1020, and then, is input to the light entering end surfaces 1019b of the light guide plate 1019.

Twelfth Embodiment

Figure 36:
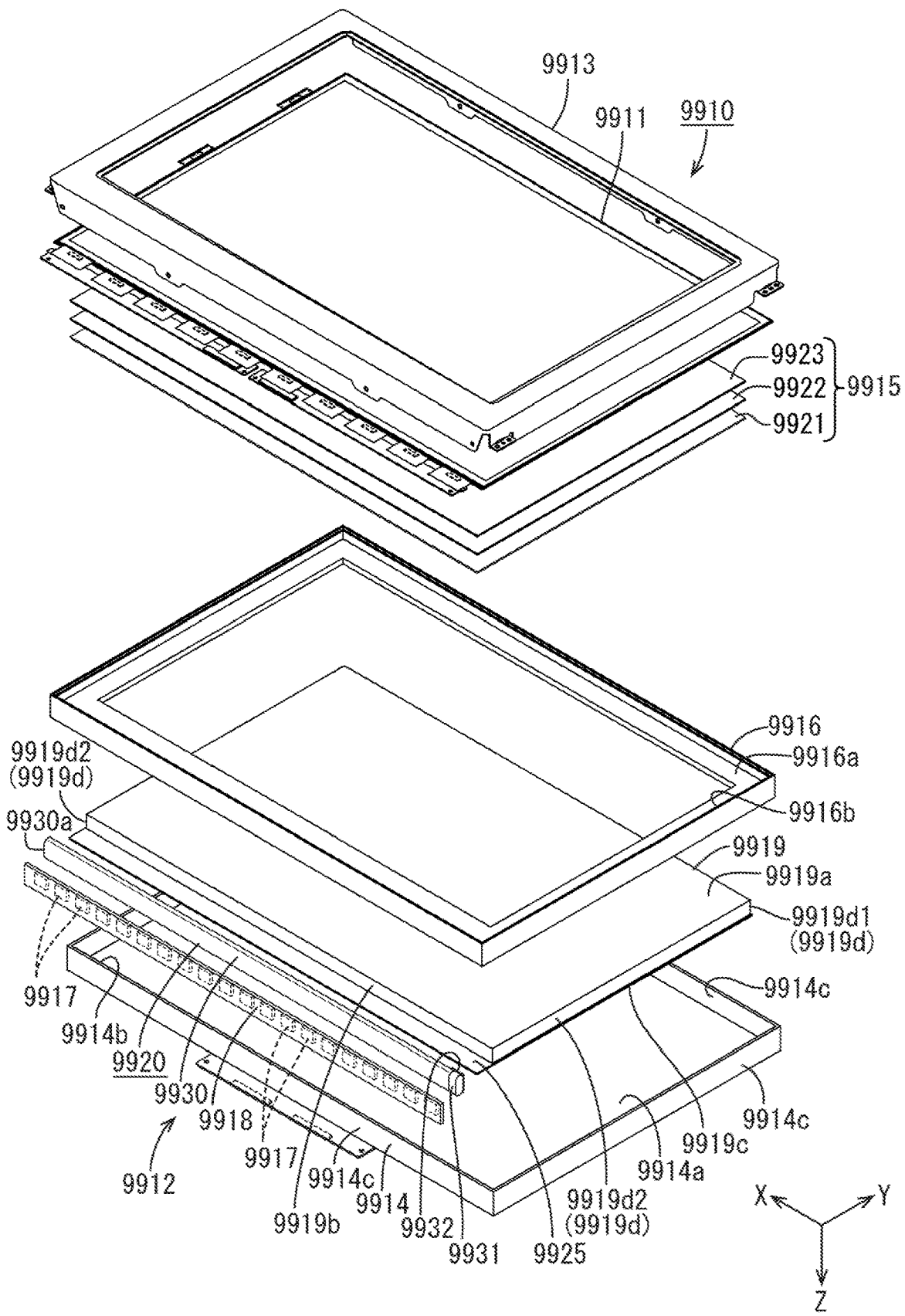
FIG. 36 is an exploded perspective view of an outline configuration of a liquid crystal display device provided at a television device according to a twelfth embodiment.
Figure 37:
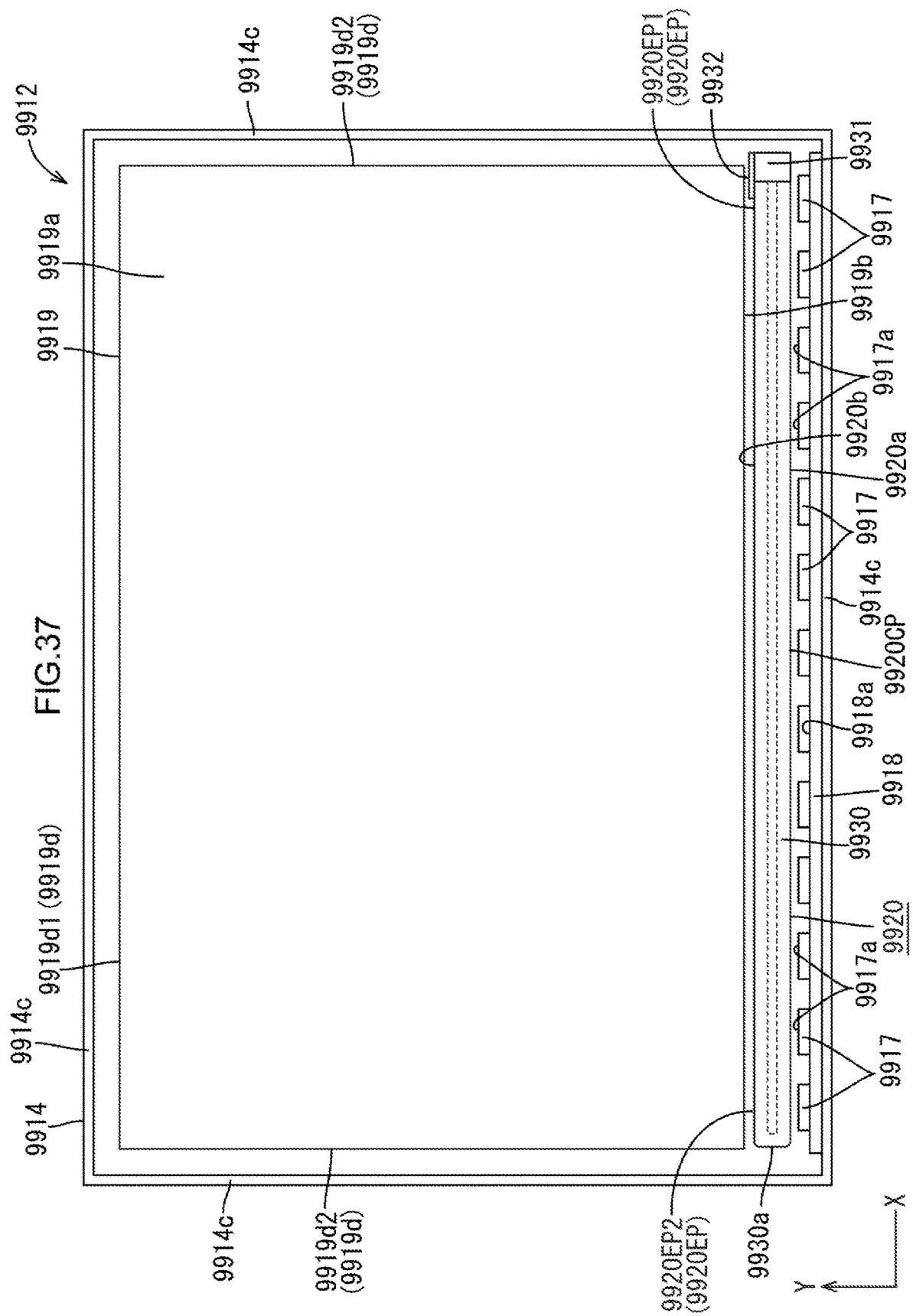
FIG. 37 is a plan view of a chassis, an LED substrate, and a light guide plate forming a backlight unit provided at the liquid crystal display device.

A twelfth embodiment of the present invention will be described with reference to FIGS. 36 to 41. In the present embodiment, a backlight unit 9912 and a liquid crystal display device 9910 and a television device using the backlight unit 9912 will be described by way of example as in the first embodiment. Note that the configurations of the television device and the liquid crystal display device 9910 are similar to those of the first embodiment, and therefore, description thereof will not be repeated. The backlight unit 9912 has a configuration substantially similar to that of the first embodiment, but is different from that of one first embodiment in the configuration of a wavelength converter as illustrated in FIGS. 36 and 37. Thus, other components of the backlight unit 9912 than the wavelength converter are similar to those of the first embodiment, and therefore, description thereof will not be repeated.

As illustrated in FIG. 36, the backlight unit 9912 in the twelfth embodiment includes a main wavelength converter (a main wavelength conversion tube) 9920 interposed among LEDs 9917 and a light guide plate 9919 to wavelength-convert light from the LEDs 9917. The LEDs 9917 are of a so-called top-emitting type such that the LEDs 9917 are surface-mounted on an LED substrate 9918 and light emission surfaces 9917a of the LEDs 9917 face a side opposite to the LED substrate 9918. These LEDs 9917 are blue LEDs configured to emit monochromatic blue light. The blue light emitted from the LEDs 9917 is partially wavelength-converted into green light and red light by the main wavelength converter 9920 specifically described later, and the output light of the backlight unit 9912 shows a substantially white color by additive color mixing of the wavelength-converted green and red light (secondary light) and the blue tight (primary light) of the LEDs 9917.

Figure 38:
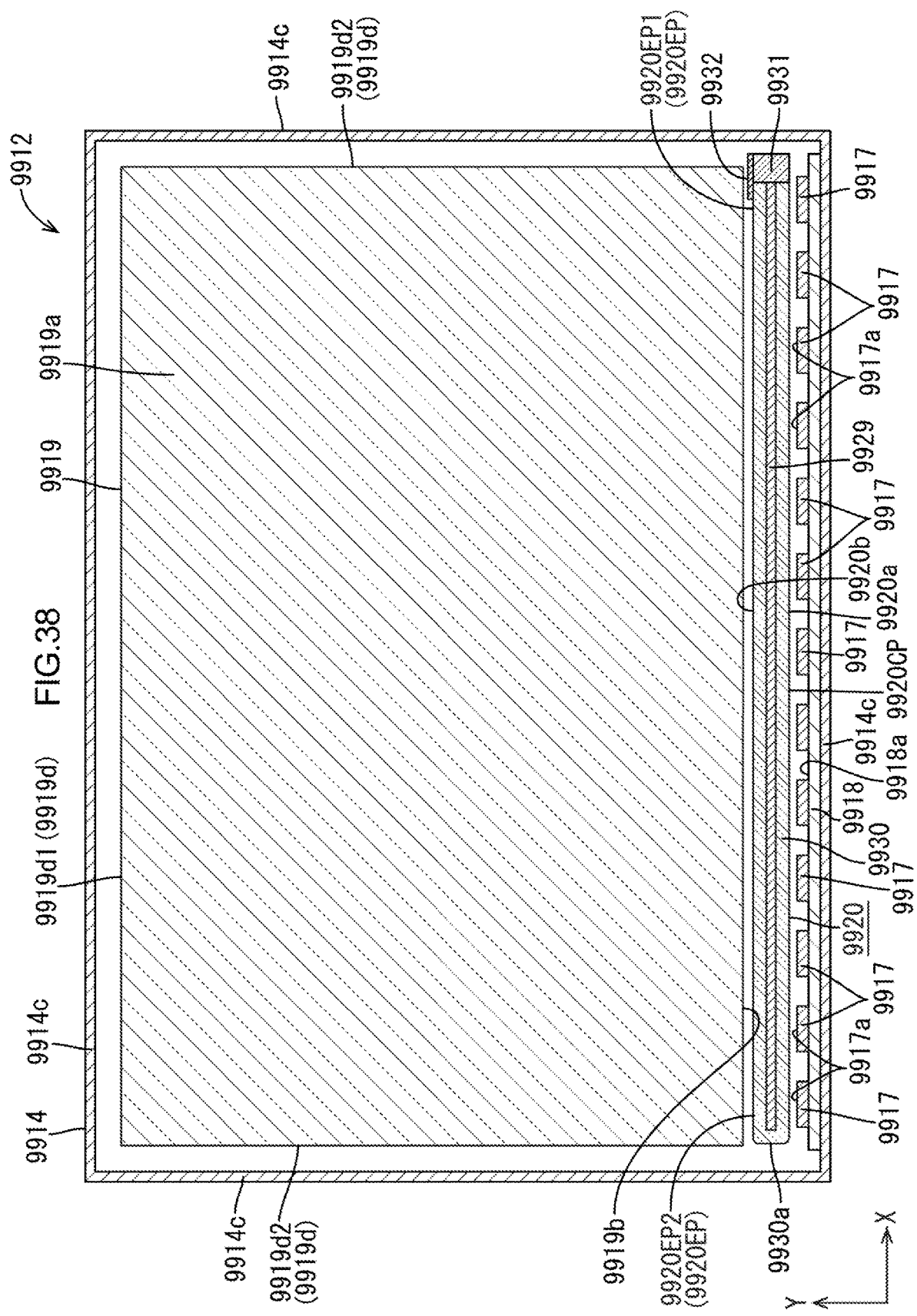
FIG. 38 is a sectional view corresponding to FIG. 8 of the first embodiment.
Figure 39:
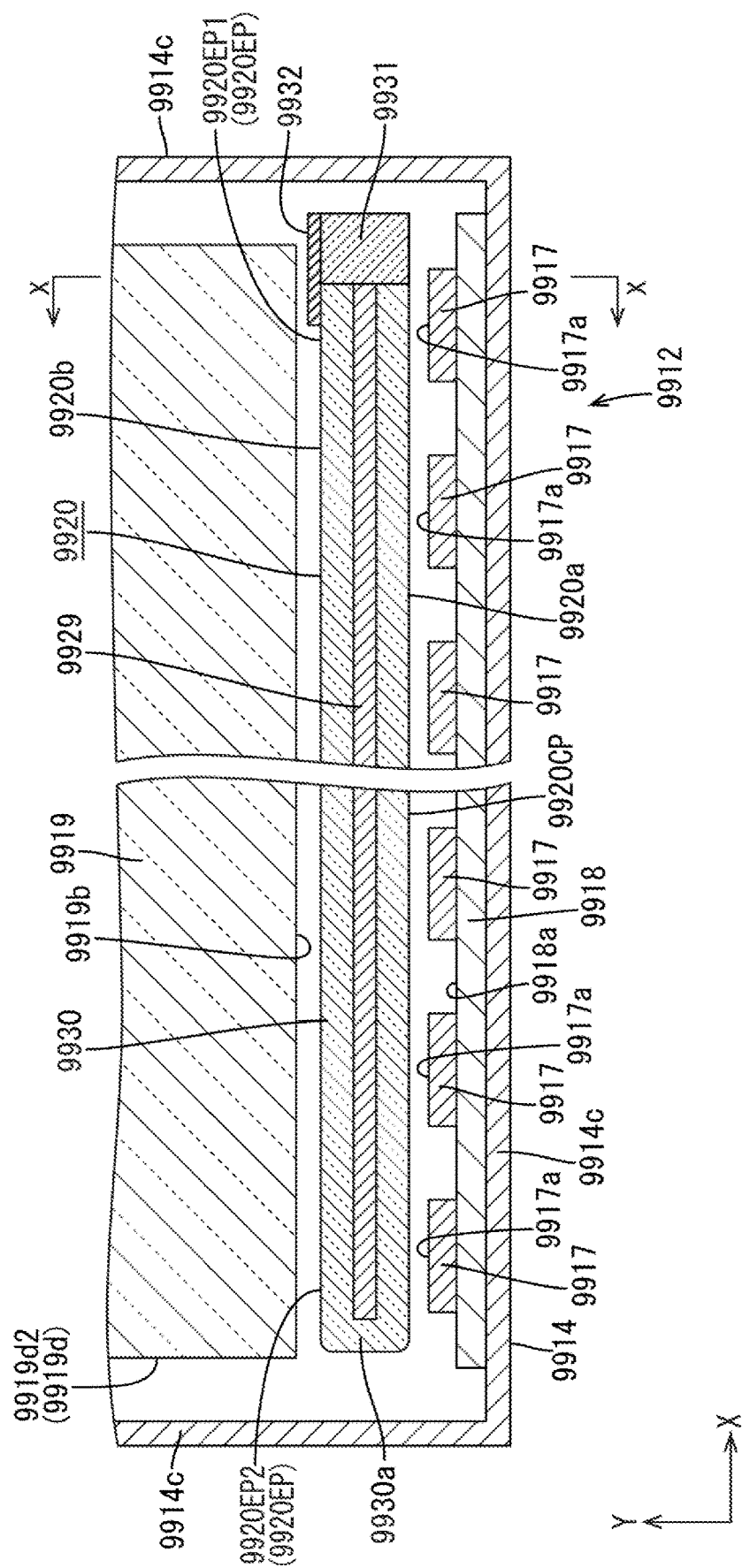
FIG. 39 is an enlarged view of FIG. 38.
Figure 40:
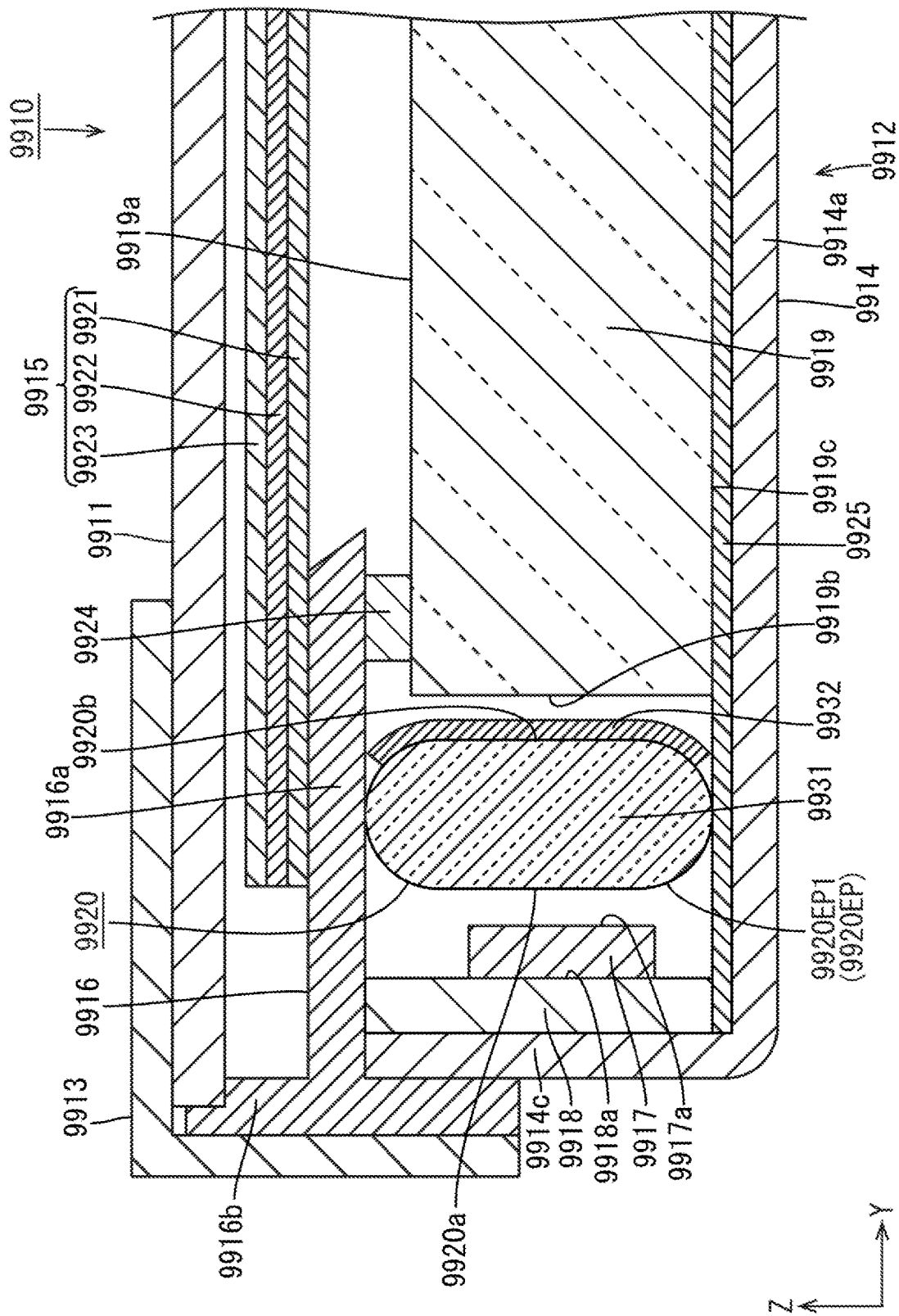
FIG. 40 is a sectional view of FIG. 39 along an x-x line.

As illustrated in FIGS. 38 to 40, the main wavelength converter 9920 has phosphors (wavelength conversion substances) configured to wavelength-convert the light (the primary light) emitted from the LEDs 9917 into the light (the secondary light) with other wavelengths, and is interposed among the LEDs 9917 and a light entering end surface 9919b of the light guide plate 9919. The main wavelength converter 9920 is held in the above-described posture by a not-shown holding unit. The main wavelength converter 9920 extends along the length direction (the X-axis direction) of the light entering end surface 9919b of the light guide plate 9919, and is arranged to face the light entering end surface 9919b across the substantially entire length thereof while facing all of the LEDs 9917 mounted on the LED substrate 9918. The main wavelength converter 9920 is configured such that section along the direction perpendicular to the length direction (the extension direction, the X-axis direction) of the main wavelength converter 9920 in a substantially vertically-elongated oval shape, the length dimension (the dimension in the X-axis direction) thereof is greater than the long-side dimension (the length dimension of the light entering end surface 9919b) of the light guide plate 9919, and the height dimension (a dimension in the Z-axis direction) thereof is greater than the thickness dimension (the width dimension of the light entering end surface 9919b) of the light guide plate 9919. The main wavelength converter 9920 has substantially flat outer surfaces along the X-axis direction and the Z-axis direction. The outer surface of the main wavelength converter 9920 facing the light emission surface 9917a of each LED 9917 is formed as a light input surface 9920a parallel with the light emission surface 9917a such that the light from the light emission surface 9917a is input to the light input surface 9920a. On the other hand, the outer surface of the main wavelength converter 9920 facing the light entering end surface 9919b of the light guide plate 9919 is formed as a light output surface 9920b parallel with the light entering end surface 9919b such that the light is output from the light output surface 9920b to the light entering end surface 9919b. The main wavelength converter 9920 is arranged such that an inner end position thereof is outside an inner end position of a frame-shaped portion 9916a of a frame 9916 in the width direction (the Y-axis direction) of the main wavelength converter 9920. That the main wavelength converter 9920 is arranged such that the entire area thereof overlaps with the frame-shaped portion 9916a of the frame 9916 as viewed in the plane, and therefore, e.g., a situation where a user of the liquid crystal display device 9910 directly views the main wavelength converter 9920 from the front side s less caused. According to such a configuration, the light emitted from the LEDs 9917 is wavelength-converted in the course of transmitting through the main wavelength converter 9920 interposed among the LEDs 9917 and the light entering end surface 9919b of the light guide plate 9919, and then, is input to the light entering end surface 9919b to propagate in the light guide plate 9919. Thereafter, the light is output from the light exiting plate surface 9919a The main wavelength converter 9920 is interposed among the LEDs 9917 and the light entering end surface 9919b of the light guide plate 9919, and therefore, is preferable because a manufacturing cost is reduced with a less usage of the phosphors as compared to a case where a wavelength converter is formed in a sheet shape and is arranged to overlap with a light exiting plate surface 9919a or an opposite plate surface 9919c of a light guide plate 9919.

The main wavelength converter 9920 has a phosphor containing portion 9929 containing the phosphors (the wavelength conversion substances) for wavelength-converting the light from the LEDs 9917, a container (a capillary) 9930 extending along the X-axis direction as the length direction of the light entering end surface 9919b to house the phosphor containing portion 9929, and a sealing portion 9931 configured to seal an end portion of the container 9930 in the X-axis direction. In the phosphor containing portion 9929, a red phosphor configured to emit red light (a visible light beam in a specific wavelength region belonging to a red color) by means of the monochromatic blue light from the LEDs 9917 as excitation light and a green phosphor configured to emit green light (a visible light beam in a specific wavelength region belonging to a green light) by means of the monochromatic blue light from the LEDs 9917 as the excitation light are dispersively mixed. With this configuration, the main wavelength converter 9920 wavelength-converts the right (the blue light, the primary light) emitted from the LEDs 9917 into the secondary light (the green light and the red light) showing a color tone (a yellow color) as a complementary color for the color tone (the blue color) of the light emitted from the LEDs 9917. The phosphor containing portion 9929 is formed in such a manner that a phosphor solution obtained by dispersively mixing of the red phosphor and the green phosphor in a ultraviolet curable resin material in a liquid form is injected into the container 9930, and then, hardened by irradiation with ultraviolet light, for example.

The phosphor containing portion 9929 is sealed in an internal space of the container 9930, and has surfaces along the X-axis direction and the Z-axis direction. A formation area of the phosphor containing portion 9929 is set such that the phosphor containing portion 9929 overlaps with a large portion of a mounting area of the LEDs 9917 on the LED substrate 9918 in the X-axis direction and overlaps with the entire area of the light emission surfaces 9917a of the LEDs 9917 in the Z-axis direction. The thickness dimension (the dimension in the Y-axis direction) of the phosphor containing portion 9929 is smaller than the thickness dimension of the later-described container 9930, and is specifically about 0.5 mm. Both of the front and back surfaces of the phosphor containing portion 9929 along the X-axis direction and the Z-axis direction are formed as flat surfaces, and are parallel with the light emission surfaces 9917a of the LEDs 9917 and the light entering end surface 9919b of the light guide plate 9919.

The container 9930 is made of a substantially transparent inorganic glass material (e.g., alkali-free glass or quartz glass) exhibiting excellent light transmission, and the index of refraction of the container 9930 is about 1.5, for example. The container 9930 surrounds the phosphor containing portion 9929 across the entire length thereof, and is in a substantially cylindrical shape having bottom and extending along the X-axis direction. Moreover, the section of the container 9930 perpendicular to the length direction (the extension direction) thereof is in a substantially vertically-elongated oval shape. Both outer surfaces of the container 9930 along the length direction thereof are formed as the light input surface 9920a and the light output surface 9920b described above. The thickness dimension of the container 9930 is greater than that of the above-described phosphor containing portion 9929, and is specifically about 1 mm. The container 9930 is, at one end portion thereof in the length direction, sealed by the sealing portion 9931. That is, the main wavelength converter 9920 has a one-sided sealing structure such that the main wavelength converter 9920 is sealed only on one side by the sealing portion 31. In the course of producing the container 9930, one end portion of the container 9930 opens to the outside, and the other end portion of the container 9930 is closed by a bottom portion 9930a before the phosphor containing portion 9929 is formed. The opening is sealed by the sealing portion 9931 after the phosphor containing portion 9929 has been formed. The sealing portion 9931 is made of the same inorganic glass material as that of the container 9930, and therefore, the end portion of the container 9930 can be sealed with high sealability. The dimension of the sealing portion 9931 in the X-axis direction is greater than the thickness dimension of the bottom portion 9930a of the container 9930, and is substantially equal to or smaller than the dimension of the LED 9917 in the X-axis direction. Specifically, the dimension of the sealing portion 9931 in the X-axis direction is about 5 mm, for example.

Of both end portions 9920EP of the main wavelength converter 9920 with the above-described configuration (the one-sided sealing structure) in the length direction, one end portion 9920EP is provided with the sealing portion 9931, and the other end portions 9920EP is not provided with the sealing portion 9931. Hereinafter, the former will be referred to as a "sealing portion equipped end portion 9920EP1," and the latter will be referred to as a "sealing portion non-equipped end portion (a bottom portion equipped end portion) 9920EP2. As illustrated in FIG. 38, the sealing portion equipped end portion 9920EP1 (the sealing portion 31) of the main wavelength converter 9920 protrudes, in the X-axis direction, outward from one (the right as viewed in FIG. 38) of non-light-input-side end surfaces 9919d2 of the light guide plate 9919, and therefore, is in a position relationship in which the sealing portion equipped end portion 9920EP1 overlaps with one of the non-light-input-side end surfaces 9919d2 in the X-axis direction. On the other hand, the sealing portion non-equipped end portion 9920EP2 (the bottom portion 9930a of the container 9930) is recessed inward of the other (the left as viewed in FIG. 38) non-light-input-side end surface 9919d2 of the light guide plate 9919 in the X-axis direction, and therefore, is in a position relationship in which the sealing portion non-equipped end portion 9920EP2 does not overlap with the other non-light-input-side end surfaces 9919d2 in the X-axis direction. The sealing portion equipped end portion 9920EP1 of the main wavelength converter 9920 has the sealing portion 9931, whereas the sealing portion non-equipped end portion 9920EP2 does not have the sealing portion 9931 but the bottom portion 9930a of the container 9930. Thus, the region not provided with the phosphor containing portion 9929 (the phosphors) is present to no small extent at each edge of the main wavelength converter 9920 in the length direction thereof. Specifically, at the edge of the sealing portion equipped end portion 9920EP1, the region not provided with the phosphor containing portion 9929 is present to have a size corresponding to the dimension of the sealing portion 9931 in the X-axis direction, and is larger than the equivalent region (corresponding to the thickness dimension of the bottom portion 9930a) of the sealing portion non-equipped and portion 9920EP2. With advancement of frame-size reduction of the liquid crystal display device 9910 and the backlight unit 9912, a position relationship in which the region of the wavelength converter 9920 not provided with the phosphor containing portion 9929 overlaps with the LED 9917 in the X-axis direction is easily brought. Due to such a relationship, the blue light from the LEDs 9917 is, without being wavelength-converted by the phosphors of the phosphor containing portion 9929, input to the end portion of the light entering end surface 9919b of the light guide plate 9919 in the length direction thereof, and the light emitted from the end portion of the light guide plate 9919 in the X-axis direction is blue-tinged. A situation leading to such color unevenness has been concerned. Specifically, the region not provided with the phosphor containing portion 9929 is wide at the edge of the sealing portion equipped end portion 9920EP1, and therefore, the position relationship in which such a region overlaps with the LED 9917 in the X-axis direction is easily brought. Thus, occurrence of color unevenness has been concerned.

For this reason, in the backlight unit 9912 according to the present embodiment, a secondary wavelength converter (a secondary wavelength conversion sheet) 9932 configured to wavelength-convert the light from the LED 9917 is provided at the end portion 9920EP of the main wavelength converter 9920 in the length direction thereof. According to such a configuration, the region not provided with the phosphor containing portion 9929 is formed at the edge of the main wavelength converter 9920 in the length direction thereof as described above Thus, even when the light having transmitted through the end portion 9920EP of the main wavelength converter 9920 in the length direction thereof contains, due to the position relationship in which the above-described region overlaps with the LED 9917 in the length direction, the light not wavelength-converted by the phosphors of the phosphor containing portion 9929, the non-wavelength-converted light having transmitted through the end portion 9920EP can be wavelength-converted by the secondary wavelength converter 9932 provided at the end portion 9920EP of the main wavelength converter 9920 in the length direction thereof. With this configuration, a difference between the color tone of light input to an end portion of the light entering end surface 9919b of the light guide plate 9919 in the length direction thereof and the color tone of light input to a center portion of the light entering end surface 9919b in the length direction thereof is less caused. Even with advancement of frame-size reduction, color unevenness is less caused in the light emitted from, the light exiting plate surface 9919a.

Figure 41:
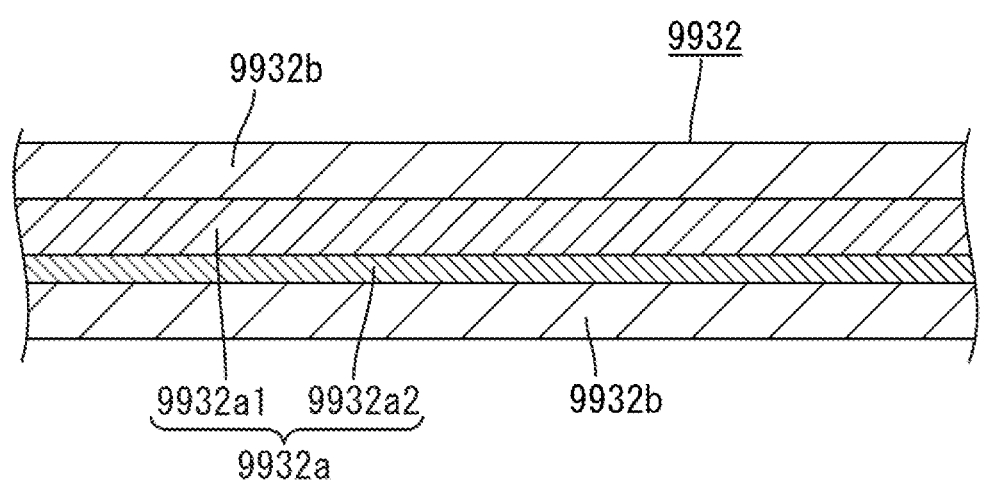
FIG. 41 is a sectional view of a secondary wavelength converter.

The secondary wavelength converter 9932 will be described in detail. As illustrated in FIG. 41, the secondary wavelength converter 9932 includes a wavelength conversion layer (a phosphor film) 9932a containing phosphors (wavelength conversion substances) for wavelength-converting the non-wavelength-converted blue light, and a pair of protection layers (protection films) 9932b sandwiching the wavelength conversion layer 9932a in a front-to-back direction to protect the wavelength conversion layer 9932a. The secondary wavelength converter 9932 is entirely formed in a sheet shape. In the wavelength conversion layer 9932a, a red phosphor configured to emit red light (a visible light beam in a specific wavelength region belonging to a red color) by means of the non-wavelength-converted monochromatic blue light from the LEDs 9917 as excitation light and a green phosphor configured to emit green light (a visible light beam in a specific wavelength region belonging to a green light) by means of the non-wavelength-converted monochromatic blue light from the LEDs 9917 as the excitation light are dispersively mixed. With this configuration, the secondary wavelength converter 9932 wavelength-converts the non-wavelength-converted blue light (the primary light) into secondary light (the green light and the red light) showing a color tone (a yellow color) as a complementary color for the color tone (the blue color) of the non-wavelength-converted blue light. The wavelength conversion layer 9932a is formed in such a manner that a phosphor layer 9932a2 in which the red phosphor and the green phosphor are dispersively mixed is applied to a substantially transparent film-shaped base material (a phosphor carrier) 9932a1 made of synthetic resin. Any of the red phosphor and the green phosphor dispersively mixed in the phosphor layer 9932a2 is a quantum dot phosphor. Each quantum dot phosphor contained in the phosphor layer 9932a2 is preferably a material identical or similar to each quantum dot phosphor contained in the phosphor containing portion 9929 of the main wavelength converter 9920. Thus, optical properties (e.g., a main emission wavelength) of the green light and the red light wavelength-converted by the second wavelength converter 32 are identical or similar to those of the green light and the red light wavelength-converted by the main wavelength converter 9920. The protection layers 9932b are made of substantially transparent synthetic resin, and are in a film shape. The protection layers 9932b exhibit excellent moisture proof properties, etc.

As illustrated in FIG. 39, the secondary wavelength converter 9932 is attached to the sealing portion equipped end portion 9920EP1, which is provided with the sealing portion 9931, of both end portions 9920EP of the main wavelength converter 9920. That is, the secondary wavelength converter 9932 is not arranged at the sealing portion non-equipped end portion 9920SP2 of both end portions 9920EP, and is selective arranged only at the sealing portion equipped end portion 9920EP1. According to such a configuration, even when the light having transmitted through the sealing portion equipped end portion 9920EP1 contains much blue light not wavelength-converted by the phosphors due to a larger area, which is not provided with the phosphor containing portion 9929, of the sealing portion equipped end portion 9920EP1 of the main wavelength converter 9920 than the sealing portion non-equipped end portion 9920EP2, such light can be wavelength-converted into the green light and the red by the secondary wavelength converter 9932. Thus, occurrence of color unevenness can be more suitably reduced. In addition, the secondary wavelength converter 9932 is not arranged at the sealing portion non-equipped end portion 9920EP2 of both end portions 9920EP, and therefore, the cost for installation of the secondary wavelength converter 9932 is suitably reduced.

As illustrated in FIGS. 39 and 40, the secondary wavelength converter 9932 is arranged to overlap with the surface closer to the light guide plate 9919, i.e., the light output surface 9920b, among outer surfaces of the sealing portion equipped end portion 9920EP1 of the main wavelength converter 9920. The light output surface 9920b of the main wavelength converter 9920 faces the light entering end surface 9919b of the light guide plate 9919, and is parallel with the light entering end surface 9919b. Thus, the light emitted from the light output surface 9920b is directly input to the light entering end surface 9919b. The secondary wavelength converter 9932 is provided on the light output surface 9920b to overlap with the light guide plate 9919, and therefore, the non-wavelength-converted blue light contained in the light output from the sealing portion equipped end portion 9920EP1 can be input to the light entering end surface 9919b of the light guide plate 9919 after having been wavelength-converted into the green light and the red light by the secondary wavelength converter 9932. Moreover, the secondary wavelength converter 9932 is arranged to cover the substantially entire area of the light output surface 9920b of the sealing portion equipped end portion 9920EP1 in the Z-axis direction.

As illustrated in FIG. 39, the secondary wavelength converter 9932 is, at the sealing portion equipped end portion 9920EP1 of the main wavelength converter 9920, arranged not only in the area where the secondary wavelength converter 9932 does not overlap with the phosphor containing portion 9929 in the X-axis direction, but also in the area where the secondary wavelength converter 9932 overlaps with part of the phosphor containing portion 9929 in the X-axis direction. Specifically, the sealing portion equipped end portion 9920EP1 is configured such that the sealing portion 9931 at the edge in the X-axis direction is formed as the region not provided with the phosphor containing portion 9929 and a center portion with respect to such an edge in the X-axis direction is formed as the region provided with the phosphor containing portion 9929. On the other hand, a formation area of the secondary wavelength converter 9932 in the X-axis direction is larger than that of the sealing portion 9931, and the secondary wavelength converter 9932 is arranged to overlap with the entire area of the sealing portion 9931 in she X-axis direction. Thus, the secondary wavelength converter 9932 is arranged to overlap with part (an end portion closer to the sealing portion 9931) of the region provided with the phosphor containing portion 9929 at the sealing portion equipped end portion 9920EP1. With this configuration, the non-wavelength-converted blue light contained in the light having transmitted through the sealing portion equipped end portion 9920EP1 of the main wavelength converter 9920 can be further efficiently wavelength-converted by the secondary wavelength converter 9932. Moreover, the secondary wavelength converter 9932 also in a position relationship such that the secondary wavelength converter 9932 also overlaps, in the X-axis direction, with some (an end-side light source positioned on the most extreme end side in the direction of arrangement) of the LEDs 9917 facing the sealing portion equipped end portion 9920EP1.

The present embodiment has the above-described structure, and features thereof will be subsequently described. When the liquid crystal display device 9910 is powered ON, driving of a liquid crystal panel 9911 is controlled by a panel control circuit of a not-shown control board. Moreover, drive power is supplied from, a not-shown LED drive board to each LED 9917 of the LED substrate 9918, and in this manner, driving of each LED 9917 is controlled. The light from each LED 9917 is guided by the light guide plate 9919 such that the liquid crystal panel 9911 is irradiated with such light through optical members 9915. Thus, a predetermined image is displayed on the liquid crystal panel 9911. Hereinafter, features of the backlight unit 9912 will be described in detail.

When each LED 9917 is turned on, the blue light (the primary light) emitted from the light emission surface 9917a of each LED 9917 is input to the light input surface 9920a of the main wavelength converter 9920, and then, is wavelength-converted into the green light and the red light (the secondary light) by the green phosphor and the red phosphor contained in the phosphor containing portion 9929 in the container 9930. The substantially white illumination light is obtained from the wavelength-converted green and red light and the blue light of the LEDs 9917. The green and red light wavelength-converted by the phosphor containing portion 9929 and the blue light not wavelength-converted by the phosphor containing portion 9929 are output from the light output surface 9920b of the main wavelength converter 9920, and then, are input to the light entering end surface 9919b of the light guide plate 9919. The light input to the light entering end surface 9919b is totally reflected by an interface between the light guide plate 9919 and an external air layer, or is reflected by a reflection sheet 9925 to propagate in the light guide plate 9919 while being scattered and reflected by a light reflector of a light reflection pattern. This prompts emission of the light from the light exiting plate surface 9919a as light whose incident angle with respect to the light exiting plate surface 9919a does not exceed a critical angle. The light output from the light exiting plate surface 9919a of the light guide plate 9919 receives optical action in the course of transmitting through each optical member 9915, and then, the liquid crystal panel 9911 is irradiated with such light.

Features of the main wavelength converter 9920 will be described in detail. When the blue light (the primary light) emitted from the LEDs 9917 is input to the light input surface 9920a of the main wavelength converter 9920, part of the blue light is, by the green phosphor and the red phosphor dispersively mixed in the phosphor containing portion 9929 charged into the container 9930, utilized as the excitation light to emit the green light and the red light (the secondary light) from the green phosphor and the red phosphor. The wavelength-converted green and red light and the non-converted blue light are output from the light output surface 9920b of the main wavelength converter 9920, and then, are input to the light entering end surface 9919b of the light guide late 9919. In this state, the sealing portion 9931 and the bottom portion 9930a of the container 9930 are each present at the edges of both end portions 9920EP of the main wavelength converter 9920 in the length direction thereof, and therefore, no green and red phosphors of the phosphor containing portion 9929 are arranged at such spots. With advancement of frame-size reduction of the liquid crystal display device 9910 and the backlight unit 9912, the sealing portion 9931 and the bottom portion 9930a as portions of the main wavelength converter 9920 provided with no green and red phosphors are easily brought into the position relationship in which the sealing portion 9931 and the bottom portion 9930a overlap with the LEDs 9917 (the end-side light sources) positioned at the ends of the LED substrate 9918 in the direction (the X-axis direction) of arrangement of the LEDs 9917. Due to such a position relationship, input of the light from the LEDs 9917 to the end portion of the light entering end surface 9919b of the light guide plate 9919 in the length direction thereof without wavelength conversion of the light by the green and red phosphors has been concerned. Specifically, the dimension of the sealing portion 9931 of the sealing portion equipped end portion 9920EP1 in the X-axis direction is greater than that of the bottom portion 9930a of the container 9930 at the sealing portion non-equipped end portion 9920EP2, and therefore, the position relationship in which the sealing portion 9931 overlaps, in the X-axis direction, with the LED 9917 positioned at the end is easily brought. Due to such a relationship, the following situation has been concerned: the blue light from the LED 9917 positioned at the end is, without being wavelength-converted by the green phosphor and the red phosphor, input to the end portion of the light entering end surface 9919b of the light guide plate 9919 facing the sealing portion equipped end portion 9920EP1 in the length direction, and the blue-tinged light is output from part of the light exiting plate surface 9919a.

On this point, according to the present embodiment, the secondary wavelength converter 9932 configured to wavelength-convert the light from the LED 9917 is provided at the end portion 9920EP of the main wavelength converter 9920 in the X-axis direction. Thus, even when the light having transmitted through the end portion 9920EP of the main wavelength converter 9920 in the length direction contains the light not wavelength-converted by the phosphors of the phosphor containing portion 9929 as described above, such non-wavelength-converted blue light can be output to the light entering end surface 9919b of the light guide plate 9919 after having been wavelength-converted into the green light and the red light with a predetermined conversion efficiency by the phosphors of the secondary wavelength converter 9932 provided to overlap with the light output surface 9920*b* at the end portion 9920EP. In addition, the secondary wavelength converter 9932 is selectively arranged only at the sealing portion equipped end portion 9920EP1 of both end portions 9920EP of the main wavelength converter 9920. Thus, even when the light having transmitted through the sealing portion equipped end portion 9920EP1 contains much blue light not wavelength-converted by the phosphors due to a larger area, which is not provided with the phosphor containing portion 9929, of the sealing portion equipped end portion 9920EP1 of the main wavelength converter 9920 than the sealing portion non-equipped end portion 9920EP2, such light can be wavelength-converted into the green light and the red light with the predetermined conversion efficiency by the secondary wavelength converter 9932. Further, at the sealing portion equipped end portion 9920EP1, the secondary wavelength converter 9932 is arranged to overlap, in the X-axis direction, with not only the sealing portion 9931 as the region not provided with the phosphor containing portion 9929, but also the region provided with the phosphor containing portion 9929. Thus, in addition to the light output straight along the Y-axis direction from the sealing portion 9931, the light output diagonally toward the center with respect to the Y-axis direction from the sealing portion 9931 is transmitted through the secondary wavelength converter 9932. With this configuration, even when the light having transmitted through the sealing portion equipped end portion 9920EP1 contains the non-wavelength-converted blue light, such light can be efficiently wavelength-converted into the green light and the red light by the secondary wavelength converter 9932. As described above, the difference between the color tone of light input to the end portion of the light entering end surface 9919*b* of the light guide plate 9919 in the length direction and the color tone of light input to the center portion of the light entering end surface 9919*b* in the length direction is less caused. Even with advancement of frame-size reduction, color unevenness is less caused in the light output from the light exiting plate surface 9919*a*.

As described above, the backlight unit (a lighting device) 9912 of the present embodiment includes the LEDs (the light sources) 9917; the light guide plate 9919 having the light entering end surface 9919*b* which forms at least part of the outer peripheral end surface and to which the light from the LEDs 9917 is input, and the light exiting plate surface 9919*a* which forms any of both plate surfaces and from which the light is output; the main wavelength converter 9920 extending along the length direction of the light entering end surface 9919*b*, interposed among the LEDs 9917 and the light entering end surface 9919*b*, and having the phosphors configured to wavelength-convert the light from the LEDs 9917; and the secondary wavelength converter 9932 provided in at least the end portion 9920EP of the main wavelength converter 9920 in the length direction to wavelength-convert the light from the LED 9917.

With this configuration, the light emitted from the LEDs 9917 is wavelength-converted by the phosphors of the main wavelength converter 9920 interposed among the LEDs 9917 and the light entering end surface 9919*b*, and then, is input to the light entering end surface 9919*b* of the light guide plate 9919 to propagate in the light guide plate 9919. Thereafter, the light is output from the light exiting plate surface 9919*a* The main wavelength converter 9920 extends along the length direction of the light entering end surface 9919*b*, but the region provided with no phosphors is formed at the edge in the length direction. With advancement of frame-size reduction of the backlight unit 9912, the position relationship in which the region of the main wavelength converter 9920 provided with no phosphors overlaps with the LED 9917 is easily brought. Due to such a relationship, input of the light from the LEDs 9917 to the end portion of the light entering end surface 9919*b* of the light guide plate 9919 in the length direction thereof without wavelength conversion of the light by the phosphors has been concerned. In response, the secondary wavelength converter 32 configured to wavelength-convert the light from the LED 9917 is provided in at least the end port on 9920EP of the main wavelength converter 9920 in the length direction. Thus, even when the region provided with no phosphors is formed at the edge of the main wavelength converter 9920 in the length direction and the position relationship in which such a region overlaps with the LED 9917 in the length direction is brought, the non-wavelength-converted light contained in the light having transmitted through the end portion 9920EP of the main wavelength converter 9920 in the length direction thereof can be wavelength-converted by the secondary wavelength converter 9932. With this configuration, the difference between the color tone of light input to the end portion of the light entering end surface 9919*b* of the light guide plate 9919 in the length direction thereof and the color tone of light input to the center portion of the light entering end surface 9919*b* in the length direction thereof is less caused. Even with advancement of frame-size reduction, color unevenness is less caused in the light output from the light exiting plate surface 9919*a*.

Moreover, the secondary wavelength converter 9932 is arranged to overlap with at least the light output surface 9920*b* of the outer surfaces of the end portion 9920EP on a light guide plate 9919 side. With this configuration, the non-wavelength-converted light contained in the light output from the end portion 9920EP of the main wavelength converter 9920 in the length direction can be wavelength-converted by the secondary wavelength converter 9932. Moreover, the secondary wavelength converter 9932 is arranged in at least the area where the secondary wavelength converter 9932 does not overlap with the phosphors in the length direction at the end portion 9920EP. With this configuration, the non-wavelength-converted light contained in the light having transmitted through the end portion 9920EP of the main wavelength converter 9920 in the length direction thereof can be efficiently wavelength-converted by the secondary wavelength converter 9932. Further, the secondary wavelength converter 9932 is arranged in at least part of the area where the secondary wavelength converter 9932 overlaps with the phosphors in the length direction at the end portion 9920EP. With this configuration, the non-wavelength-converted light contained in the light having transmitted through the end portion 9920EP of the main wavelength converter 9920 in the length direction thereof can be further efficiently wavelength-converted by the secondary wavelength converter 9932.

In addition, the main wavelength converter 9920 is configured such that one of both end portions 9920EP in the length direction is formed as the sealing portion equipped end portion 9920EP1 provided with the sealing portion 9931 and the other end portion 9920EP is formed as the sealing portion non-equipped end portion 9920EP2 not provided with the sealing portion 9931. The secondary wavelength converter 9932 is provided in at least the sealing portion equipped end portion 9920EP1. As described above, one of both end portions 9920EP of the main wavelength converter 9920 in the length direction thereof is formed as the sealing portion equipped end portion 9920EP1 provided with the sealing portion 9931. Thus, the area provided with no phosphors tends to be larger than the sealing portion non-equipped end portion 9920EP2 not provided with the sealing portion 9931. On this point, the secondary wavelength converter 9932 is provided in at least the sealing portion equipped end portion 9920EP1, and therefore, much non-wavelength-converted light contained in the light having transmitted through the sealing portion equipped end portion 9920EP1 can be wavelength-converted by the secondary wavelength converter 9932. With this configuration, occurrence of color unevenness can be more suitably reduced.

Moreover, the secondary wavelength converter 9932 is selectively provided at the sealing portion equipped end portion 9920EP1 of both end portions 9920EP of the main wavelength converter 9920. With this configuration, the secondary wavelength converter 9932 is not arranged at the sealing portion non-equipped end portion 9920EP2 of the main wavelength converter 9920, and therefore, the cost for installation of the secondary wavelength converter 9932 is suitably reduced.

Thirteenth Embodiment

A thirteenth embodiment of the present invention will be described with reference to FIG. 42. In the thirteenth embodiment, the number of installed secondary wavelength converters 99132 is changed. Note that overlapping description of structures, features, and advantageous effects similar to those of the above-described twelfth embodiment will not be made.

Figure 42:
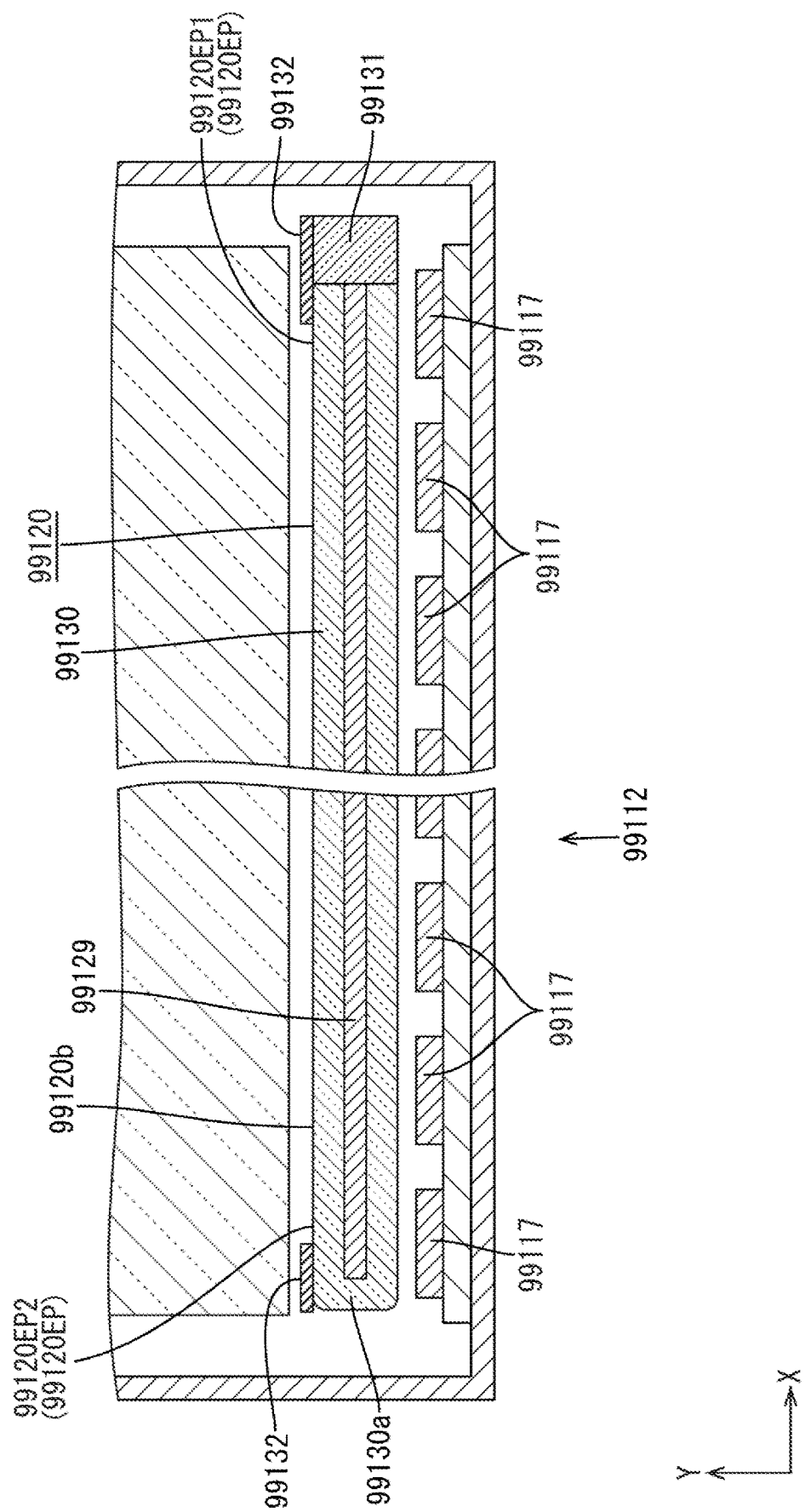
FIG. 42 is an enlarged horizontal sectional view of a backlight unit according to a thirteenth embodiment of the present invention.

Of multiple LEDs 99117 according to the present embodiment, an LED (an end-side light source) 99117 positioned at an end of a main wavelength converter 99120 close to an arrangement side of a sealing portion non-equipped end portion. 99120EP2 is, as illustrated n FIG. 42, arranged to partially overlap, in the X-axis direction, with a bottom portion 99130a of a container 99130 as a region, which is not provided with a phosphor containing portion 99129, of the sealing portion non-equipped end portion 99120EP2 of the main wavelength converter 99120. Such an arrangement configuration can be employed in a case where frame-size reduction of a backlight unit 99112 more advances than that described in the above-described twelfth embodiment. In such an arrangement configuration, the secondary wavelength converters 99132 are provided at not only a sealing portion equipped end portion 991205P1 of the main wavelength converter 99120 but also the sealing portion non-equipped end portion 99120EP2 not provided with a sealing portion 99131. That is, the secondary wavelength converters 99132 are provided in a pair for a pair of end portions 99120EP of the main wavelength converter 99120. The secondary wavelength converter 99132 provided at the sealing portion non-equipped end portion 99120EP2 has a configuration substantially similar to that of the secondary wavelength converter 99132 (the secondary wavelength converter 9932 described above in the twelfth embodiment) provided at the sealing portion equipped end portion 99120EP1, and is arranged to overlap, in the X-axis direction, with not only the bottom portion 99130a of the container 99130 as the region not provided with the phosphor containing portion 99129 but also the region provided with the phosphor containing portion 99129 at the sealing portion non-equipped end portion 99120EP2 Moreover, the secondary wavelength converter 99132 is provided to overlap with tight output surface 99120b at the sealing portion non-equipped end portion 99120EP2.

In a position relationship in which the bottom portion 99130a of the container 99130 as the region, which is provided with the phosphor containing portion 99129, the sealing portion non-equipped end portion 99120EP2 of the main wavelength converter 99120 overlaps with the LED 99117 positioned at the end in the X-axis direction, light having, transmitted through the sealing portion non-equipped end portion 99120EP2 of the main wavelength converter 99120 in the X-axis direction might include blue light not wavelength-convey ted by phosphors. Even in such a case, the non-wavelength-converted blue light having transmitted through the sealing portion non-equipped end portion 99120EP2 is wavelength-converted into green light and red light with a predetermined conversion efficiency by the secondary wavelength converter 99132 provided to overlap with the light output surface 99120b of the sealing portion non-equipped end portion 99120EP2. Thus, occurrence of color unevenness is more suitably reduced. Note that both secondary wavelength converters 99132 can be differentiated from each other in the contents of the phosphors and the concentrations of the contained phosphors. In this case, the contents of the phosphors are preferably greater in the secondary wavelength converter 99132 provided at the sealing portion equipped end portion 99120EP1 than in the secondary wavelength converter 99132 provided at the sealing portion non-equipped end portion 99120EP2, and in this manner, the concentrations of the contained phosphors become higher in the secondary wavelength converter 99132 provided at the sealing portion equipped end portion 99120EP1 than in the secondary wavelength converter 99132 provided at the sealing portion non-equipped end portion 99120EP2.

As described above, according to the present embodiment, the secondary wavelength converters 99132 are each provided at the sealing portion equipped end portion 99120EP1 and the sealing portion non-equipped end portion 99120EP2. With this configuration, even when the region provided with no phosphors is formed at the edge of the sealing portion non-equipped end portion 99120EP2 of the main wavelength converter 99120, and the position relationship in which such a region overlaps with the LED 99117 in the length direction of the main wavelength converter 99120 is brought, the non-wavelength-converted light contained in the light having transmitted through the sealing portion non-equipped end portion 99120EP2 of the main wavelength converter 99120 can be wavelength-converted by the secondary wavelength converter 99132. Thus, occurrence of color unevenness is more suitably reduced.

Fourteenth Embodiment

A fourteenth embodiment of the present invention will be described with reference to FIG. 43. In the fourteenth embodiment, the number of installed main wavelength converters 99220 is changed from that of the above-described twelfth embodiment. Note that overlapping description of structures, features, and advantageous effects similar to those of the above-described twelfth embodiment will not be made.

Figure 43:
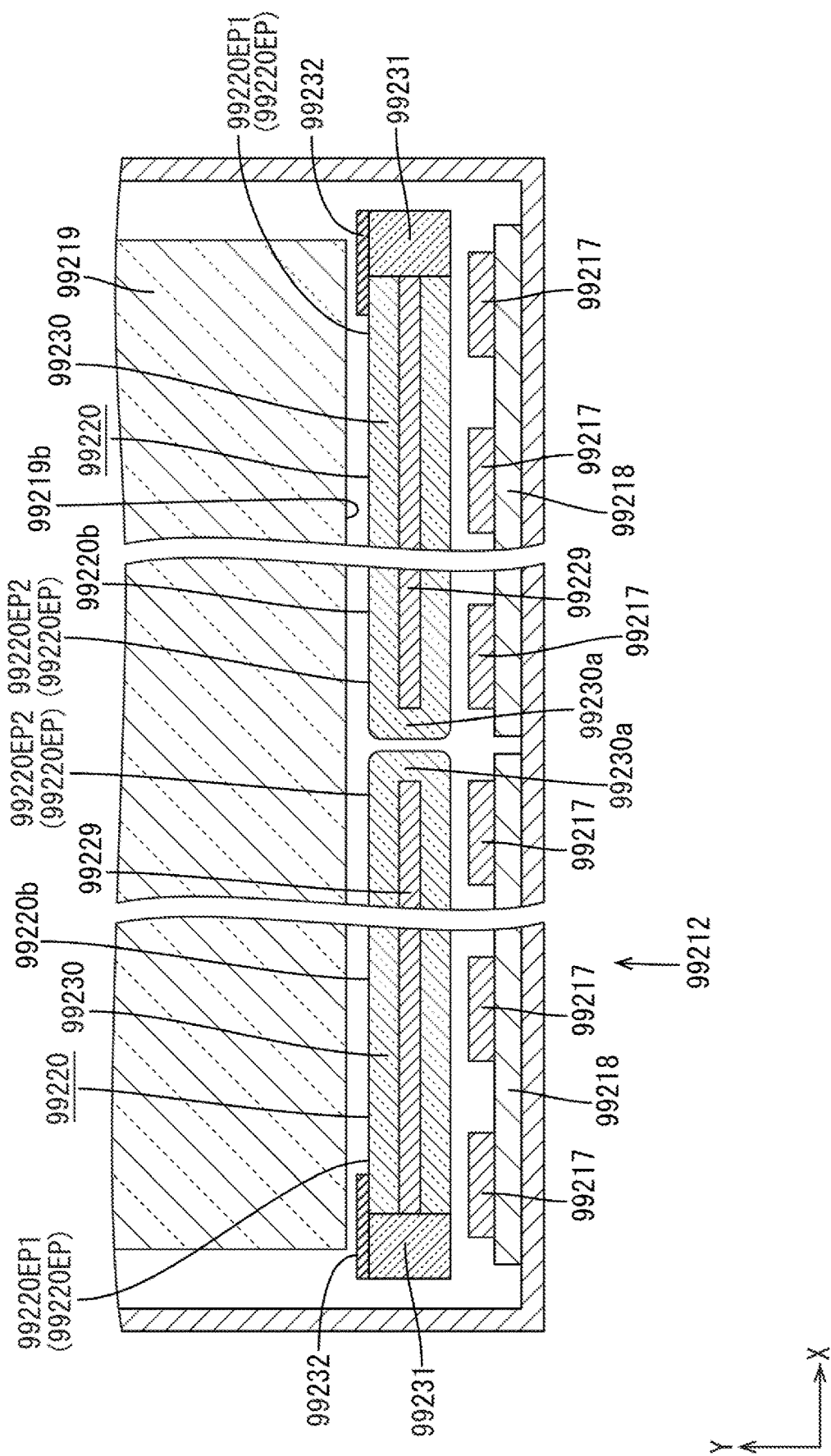
FIG. 43 is an enlarged horizontal sectional view of a backlight unit according to a fourteenth embodiment of the present invention.

As illustrated in FIG. 43, two main wavelength converters 99220 are, according to the present embodiment, arranged adjacent to each other along the length direction of a light entering end surface 99219b of a light guide plate 99219. The two main wavelength converters 99220 are arranged linearly along the X-axis direction at a space among LEDs 99217 and the light guide plate 99219 such that the axes thereof are substantially coincident with each other. Such use of the two main wavelength converters 99220 as described above is suitable for a larger backlight unit 99212. Both non-adjacent end portions 99220EP of the two main wavelength converters 99220 are each formed as sealing portion equipped end portions 99220EP1, and are each positioned on both outer sides (both ends) of the backlight unit 99212 in the X-axis direction (the length direction of the light entering end surface 99219*b*). On the other hand, both adjacent end portions 99220EP of the two main wavelength converters 99220 are each formed as sealing portion non-equipped end portions 99220EP2, and are positioned at the center of the backlight unit 99212 in the X-axis direction. A sealing portion 99231 at each sealing portion equipped end portion 99220EP1 of the two main wavelength converters 99220 is arranged to partially overlap, in the X-axis direction, with an LED (an end-side light source) 99217 positioned at each end of the backlight unit 99212. On the other hand, a bottom portion 99230*a* of a container 99230 at each sealing portion non-equipped end portion 99220EP2 of the two main wavelength converters 99220 is arranged not to overlap, in the X-axis direction, with each LED (a center light source) 99217 positioned at the center of the backlight unit 99212. As in the main wavelength converters 99220, two LED substrates 99218 are arranged adjacent to each other along the length direction of the light entering end surface 99219*b*. The length dimension of each LED substrate 99218 is substantially the same as that of a corresponding one of the main wavelength converters 99220, and is arranged to separately face a corresponding one of the main wavelength converters 99220. Thus, light emitted from the multiple LEDs 99217 mounted on each LED substrate 99218 is input to a corresponding one of the main wavelength converters 99220 facing the each LED substrate 99218.

Moreover, secondary wavelength converters 99232 are, for the light guide plate 99219, each provided at the sealing portion equipped end portions 99220EP1 as both non-adjacent end portions 99220EP of the two main wavelength converters 99220. That is, as in the above-described thirteenth embodiment, the secondary wavelength converters 99232 are provided in a pair at both end portions 99220EP of the main wavelength converters 99220 positioned at both ends of the backlight unit 99212 in the X-axis direction. The pair of secondary wavelength converters 99232 has a configuration similar to those described above in the twelfth and thirteenth embodiments. In the present embodiment, both secondary wavelength converters 99232 are preferably formed of the same member, and the contents of phosphors and the concentrations of the contained phosphors are preferably equal between the secondary wavelength converters 99232. According to such a configuration, even when a position relationship in which the sealing portion 99231 as the region of the main wavelength converter 99220 not provided with a phosphor containing portion. 99229 overlaps, on each end side of the light entering end surface 99219*b* of the light guide plate 99219 in the length direction thereof, with each of the LEDs (a pair of end-side light sources) 99217 positioned at both ends is brought due to frame-size reduction of the backlight unit 99212, the non-wavelength-converted blue light input to the light entering end surface 99219*b* of the light guide plate 99219 through each sealing portion 99231 is wavelength-converted into green light and red light with a predetermined conversion efficiency by the secondary wavelength converter 99232 provided to overlap with a light output surface 99220*b* of each sealing portion equipped end portion 99220EP1. Thus, color unevenness is less caused even with advancement of frame-size reduction.

Fifteenth Embodiment

A fifteenth embodiment of the present invention will be described with reference to FIG. 44. In the fifteenth embodiment, a center secondary wavelength converter 9933 is added to the configuration described above in the fourteenth embodiment. Note that overlapping description of structures, features, and advantageous effects similar to those of the above-described fourteenth embodiment will not be made.

Figure 44:
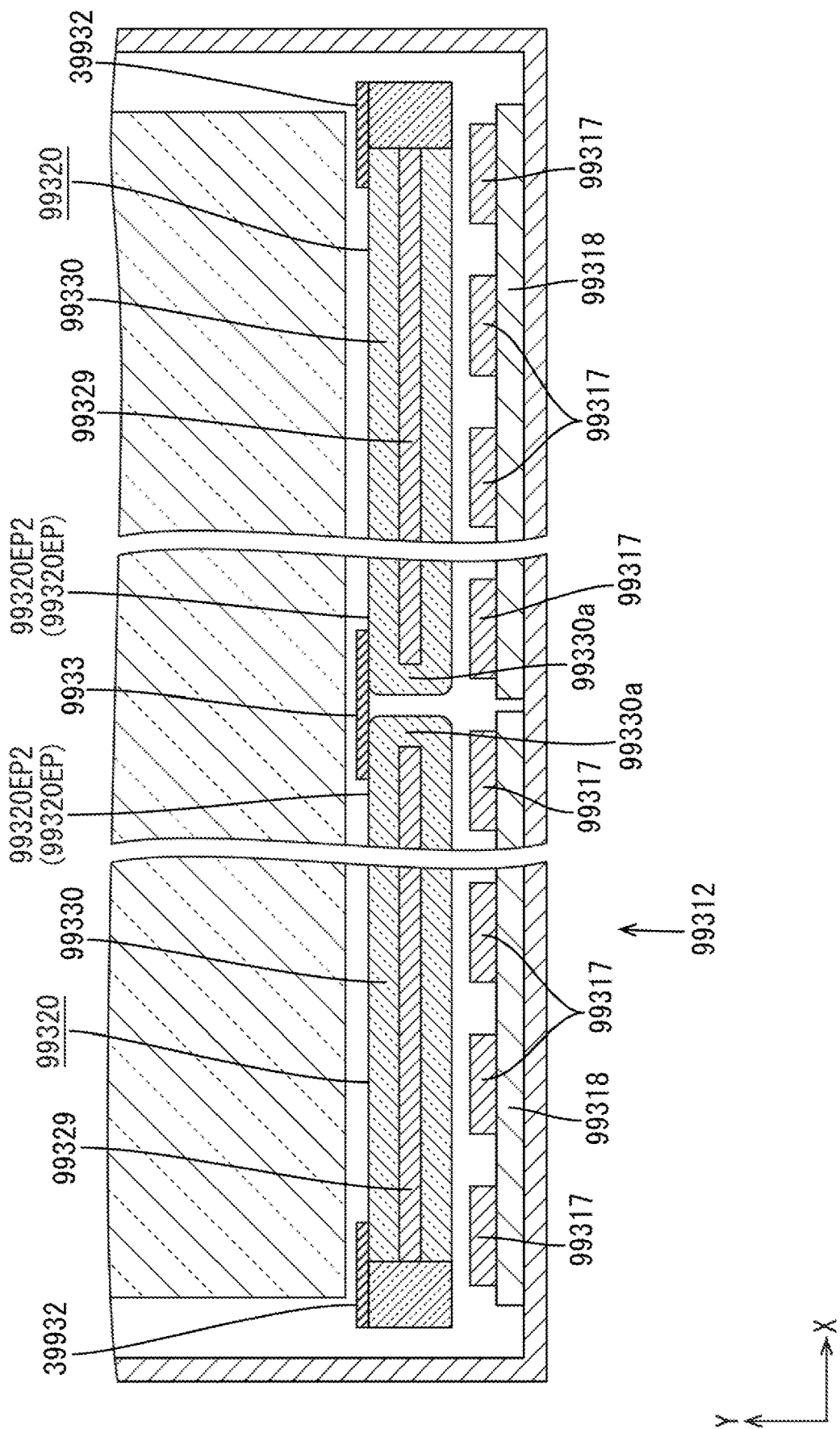
FIG. 44 is an enlarged horizontal sectional view of a backlight unit according to a fifteenth embodiment of the present invention.

Of multiple LEDs 99317 according to the present embodiment, two LEDs (center light sources) 99317 positioned at the center in the direction (the X-axis direction) of arrangement of the LEDs 99317 face, as illustrated in FIG. 44, sealing portion non-equipped end portions 99320EP2 as a pair of adjacent end portions 99320EP of two main wavelength converters 99320 arranged along the X-axis direction. These two LEDs 99317 positioned at the center are arranged to overlap, in the X-axis direction, with bottom portions 99330*a* of containers 99330 as regions, which are not provided with a phosphor containing portion 99329, of the sealing portion non-equipped end portions 99320EP2 of the two main wavelength converters 99320. The two LEDs 99317 facing the sealing portion non-equipped end portions 99320EP2 are each arranged at adjacent end portions of two LED substrates 99318.

In such an arrangement configuration, the center secondary wavelength converter 9933 is provided to extend over the adjacent sealing portion non-equipped end portions 99320EP2 of the two main wavelength converters 99320. The center secondary wavelength converter 9933 is arranged at a center position in the X-axis direction with respect to a pair of secondary wavelength converters 99332 positioned at both ends of a backlight unit 99312 in the X-axis direction, and such a configuration is similar to that of the pair of secondary wavelength converters 99332. That is, the center secondary wavelength converter 9933 has a green phosphor and a red phosphor configured to emit green light and red light by means of blue light as excitation light, and any of these green and red phosphors is a quantum dot phosphor.

Specifically, a formation area of the center secondary wavelength converter 9933 in the X-axis direction overlaps, in the X-axis direction, with an area extending from the sealing portion non-equipped end portion 99320EP2 of one of the main wavelength converters 99320 to the sealing portion non-equipped end portion 99320EP2 of the other main wavelength converter 99320. The dimension of the center secondary wavelength converter 9933 in the X-axis direction is about a size corresponding to the sum of the dimension of each sealing portion non-equipped end portion 99320EP2 in the X-axis direction and a clearance between the adjacent sealing portion non-equipped end portions 99320EP2. With such a configuration, even when light having transmitted through each sealing portion non-equipped end portions 99320EP2 of the two main wavelength converters 99320 or light having transmitted between the adjacent sealing portion non-equipped end portions 99320EP2 includes non-wavelength-converted blue light, such blue light is wavelength-converted into green light and red light by the center secondary wavelength converter 9933, and therefore, occurrence of color unevenness can be suitably reduced.

As described above, according to the present embodiment, the multiple main wavelength converters 99320 are arranged in a length direction, and the center secondary wavelength converter 99333 is arranged to extend over the adjacent end portions 99320EP of the multiple main wavelength converters 99320. With this configuration, the non-wavelength-converted light contained in the light having transmitted through the adjacent end portions 99320EP of the multiple main wavelength converters 99320 or the light having passed between the adjacent end portions 99320EP of the multiple main wavelength converters 99320 can be wavelength-converted by the center secondary wavelength converter 99333.

Sixteenth Embodiment

Figure 45:
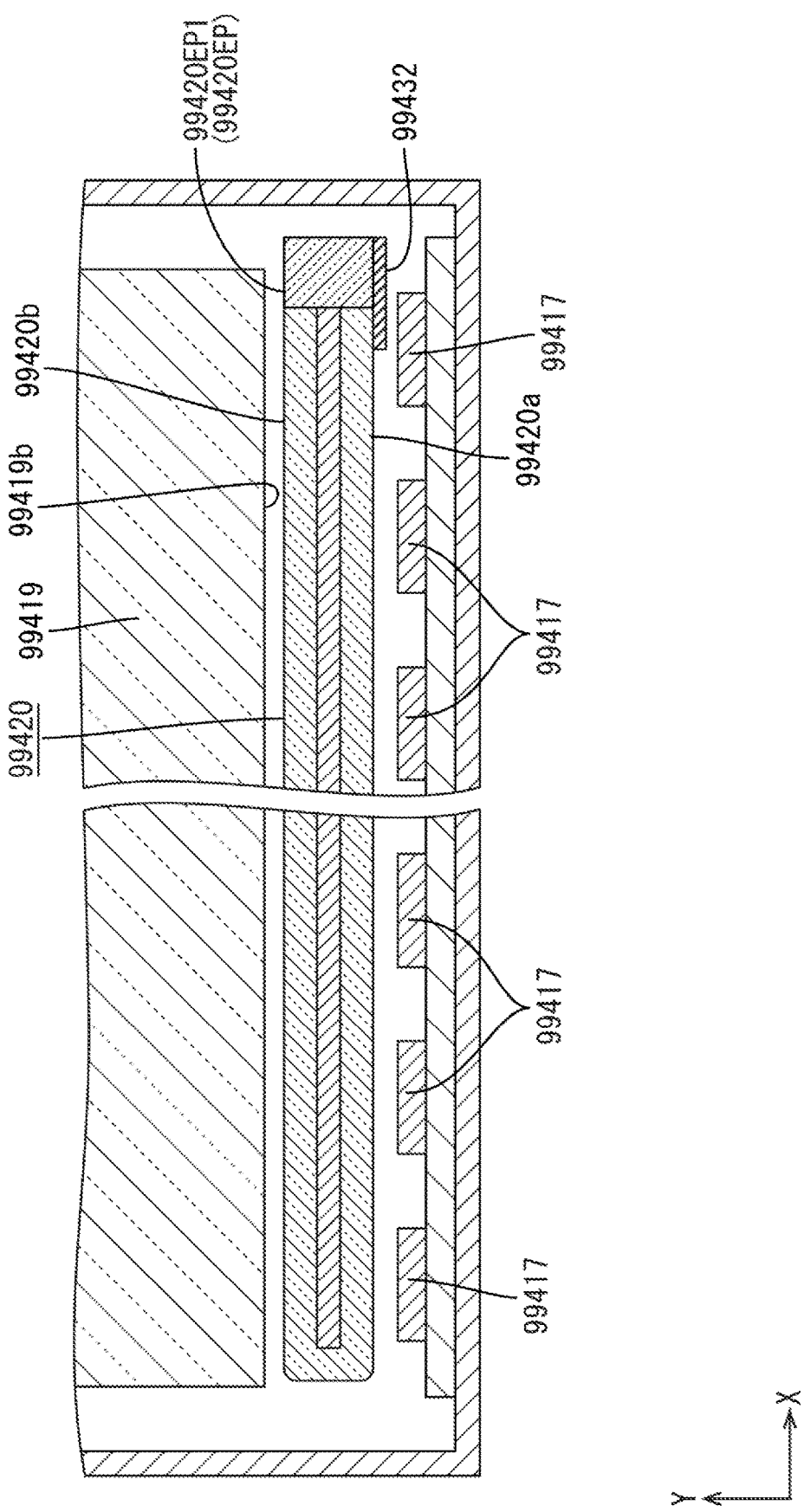
FIG. 45 is an enlarged horizontal sectional view of a backlight unit according to a sixteenth embodiment of the present invention.

A sixteenth embodiment of the present invention will be described with reference to FIG. 45. In the sixteenth embodiment, arrangement of a secondary wavelength converter 99432 is changed from that described above in the twelfth embodiment. Note that overlapping description of structures, features, and advantageous effects similar to those of the above-described twelfth embodiment will not be made. The secondary wavelength converter 99432 according to the present embodiment is, as illustrated in FIG. 45, arranged to overlap with a light input surface 99420a as a surface, which is close to LEDs 99417, of an outer surface of a sealing portion equipped end portion 99420EP1 as an end portion 99420EP of a main wavelength converter 99420. That is, the secondary wavelength converter 99432 is, at the outer surfaces of the sealing portion equipped end portion 99420EP1, placed on the light input surface 99420a opposite to a light output surface 99420b on which the secondary wavelength converter 9932 is placed in the above-described twelfth embodiment. According to such a configuration, when blue light output from the LED 99417 positioned at an end in the X-axis direction is input to the sealing portion equipped end portion 99420EP1 of the main wavelength converter 99420, the blue light is wavelength-converted into green light and red light by the secondary wavelength converter 99432. The light (including the wavelength-converted green and red light and the non-wavelength-converted blue light) having transmitted through the secondary wavelength converter 99432 is output from the light output surface 99420b through the sealing portion equipped end portion 99420EP1, and then, is input to a light entering end surface 99419b of a light guide plate 99419.

Seventeenth Embodiment

Figure 46:
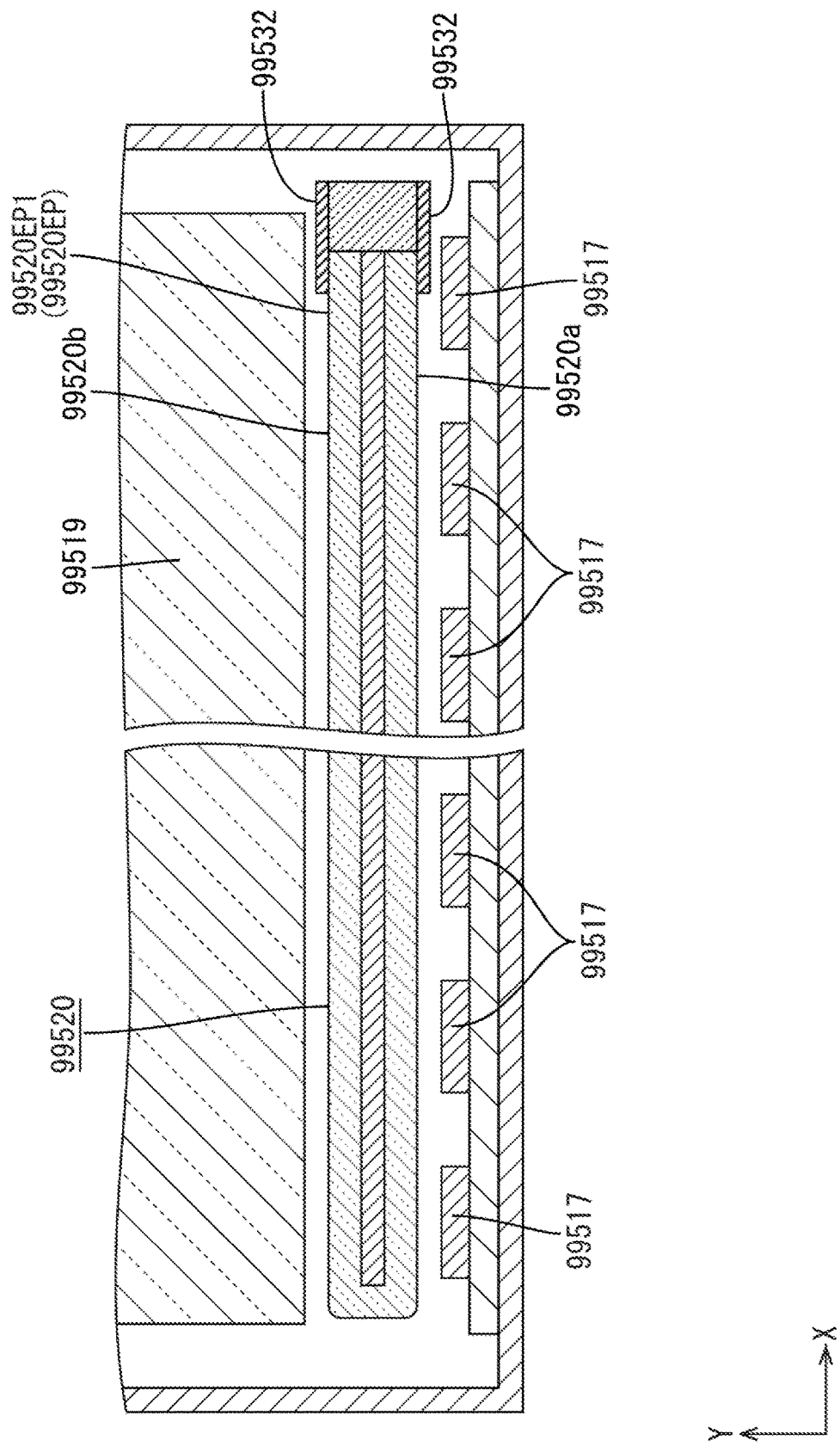
FIG. 46 is an enlarged horizontal sectional view of a backlight unit according to a seventeenth embodiment of the present invention.

A seventeenth embodiment of the present invention will be described with reference to FIG. 46. In the seventeenth embodiment, the number of installed secondary wavelength converters 99532 is changed from those described above in the twelfth and sixteenth embodiments. Note that overlapping description of structures, features, and advantageous effects similar to those of the above-described twelfth and sixteenth embodiments will not be made. The secondary wavelength converters 99532 according to the present embodiment are, at an outer surface of a sealing portion equipped end portion 99520EP1 as an end portion 99520EP of a main wavelength converter 99520, arranged to overlap with not only a light output surface 99520b as a surface close to a light guide plate 99519 but also a nab input surface 99520a as a surface close to LEDs 99517, as illustrated in FIG. 46. That is, the secondary wavelength converters 99532 are placed in a pair on the light output surface 99520b and the light input surface 99520a to sandwich the sealing portion equipped end portion 99520EP1 in an upper-to-lower direction, i.e., the Y-axis direction. According to such a configuration, when blue light output from the LED 99517 positioned at an end in the X-axis direction is input to the sealing portion equipped end portion 99520EP1 of the main wavelength converter 99520, the blue light is wavelength-converted into green light and red light by the secondary wavelength converter 99532 arranged on the light input surface 99520a. Further, when the non-wavelength-converted blue light contained in the light having transmitted through the sealing portion equipped end portion 99520EP1 is output, such blue light is wavelength-converted into green light and red light by the secondary wavelength converter 99532 arranged on the light output surface 99520b. With this configuration, the non-wavelength-converted light having transmitted through the sealing portion equipped end portion 99520EP1 can be more efficiently wavelength-converted.

Eighteenth Embodiment

Figure 47:
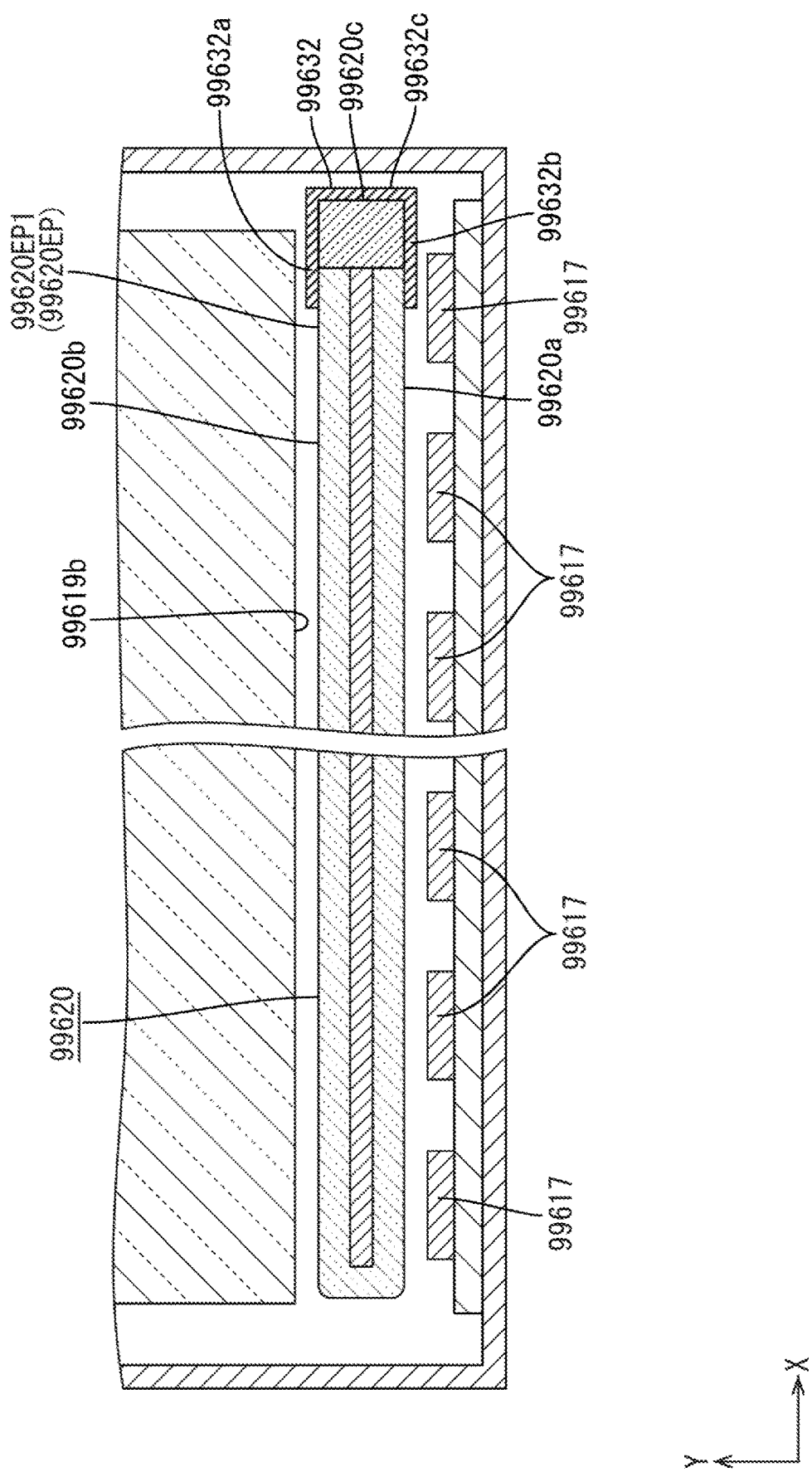
FIG. 47 is an enlarged horizontal sectional view of a backlight unit according to an eighteenth embodiment of the present invention.

An eighteenth embodiment of the present invention will be described with reference to FIG. 41. In the eighteenth embodiment, a formation area and the shape of a secondary wavelength converter 99632 are changed from those of the above-described seventeenth embodiment. Note that overlapping description of structures, features, and advantageous effects similar to those of the above-described seventeenth embodiment will not be made. The secondary wavelength converter 99632 according to the present embodiment is, at an outer surface of a sealing portion equipped end portion 99620EP1 as an end portion 99620EP of a main wavelength converter 99620, arranged to overlap with not only a light output surface 99620b and a light input surface 99620a but also an end surface 99620c in the X-axis direction, as illustrated in FIG. 47. That is, the secondary wavelength converter 99632 is formed in a fold-back shape as viewed in the plane, and is placed to surround the sealing portion equipped end portion 99620EP1 as viewed in the plane. The secondary wavelength converter 99632 is configured such that a first portion 99632a overlapping with the light output surface 99620b of the sealing portion equipped end port on 99620EP1 and a second portion 99632b overlapping with the light input surface 99620a are connected together through a third portion 99632c overlapping with the end surface 99620c in the X-axis direction, and therefore, are formed into a single component. Thus, the number of components is reduced. The end surface 99620c of the sealing portion equipped end portion 99620EP1 in the X-axis direction is formed as a surface adjacent to the light input surface 99620a and the light output surface 99620b along the Z-axis direction and the Y-axis direction (the normal direction of the length direction of a light entering end surface 99619b). According to such a configuration, when blue light output from an LED 99617 positioned at an end in the X-axis direction is input to the sealing portion equipped end portion 99620EP1 of the main wavelength converter 99620, the blue light is wavelength-converted into green light and red light by the second portion 99632b of the secondary wavelength converter 99632 arranged on the light input surface 99620a. The non-wavelength-converted blue light contained in the light output from the light output surface 99620b along the Y-axis direction through the sealing portion equipped end portion 99620EP1 is wavelength-converted into green light and red light by the first portion 99632a of the secondary wavelength converter 99632 arranged on the light output surface 99620b. Then, the non-wavelength-converted blue light contained in the light output from the end surface 99620c in the X-axis direction through the sealing portion equipped end portion 99620EP1 along the X-axis direction is wavelength-converted into green light and red light by the third portion 99632c of the secondary wavelength converter 99632 arranged on the end surface 99620c in the X-axis direction. Thus, the non-wavelength-converted light having transmitted through the sealing portion equipped end portion 99620EP1 can be further efficiently wavelength-converted.

Nineteenth Embodiment

Figure 48:
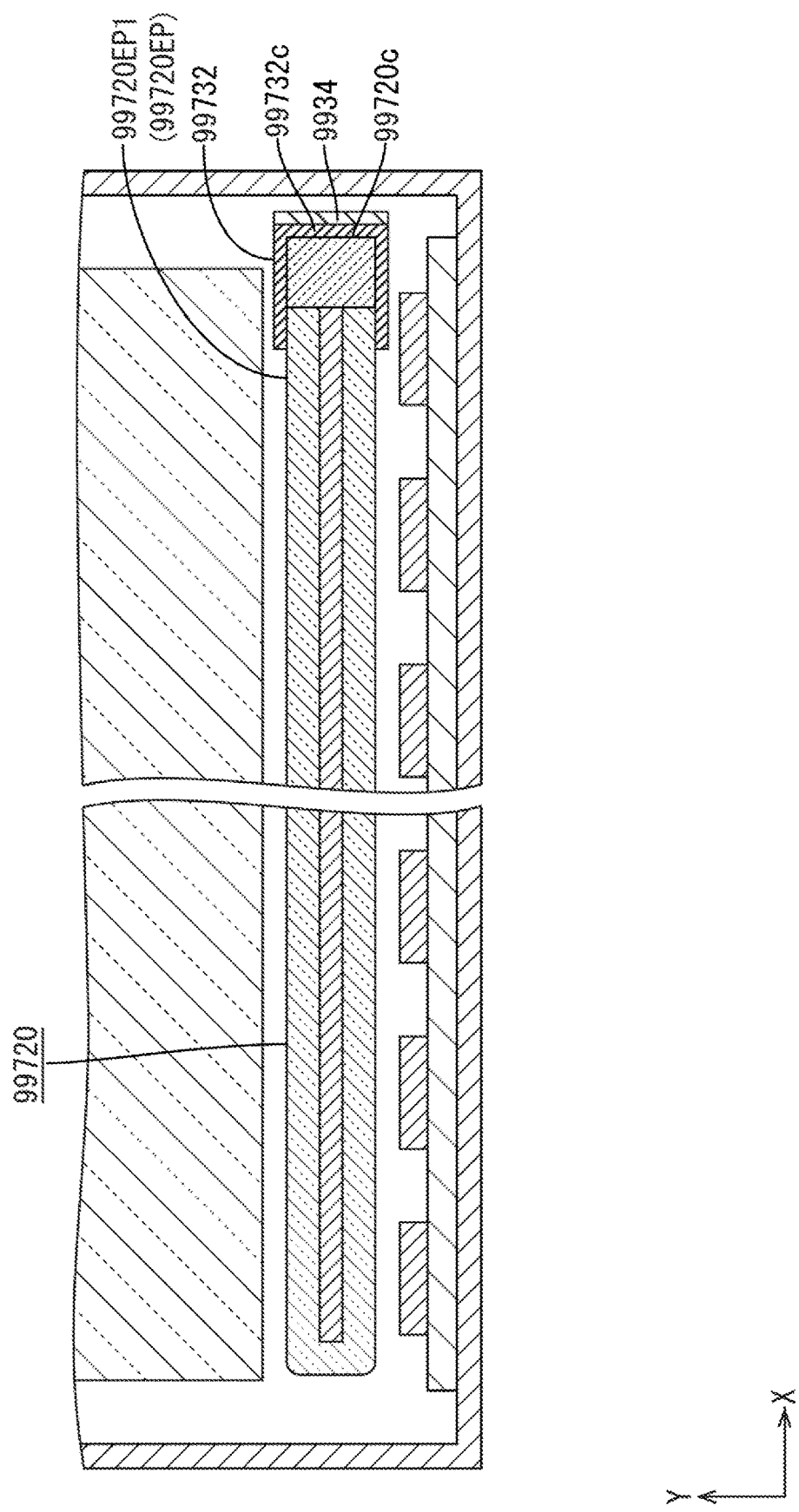
FIG. 48 is an enlarged horizontal sectional view of a backlight unit according to a nineteenth embodiment of the present invention.

A nineteenth embodiment of the present invention will be described with reference to FIG. 48. In the nineteenth embodiment, a reflection member 9934 is added to the above-described eighteenth embodiment. Note that overlapping description of structures, features, and advantageous effects similar to those of the above-described eighteenth embodiment will not be made. As illustrated in FIG. 48, the reflection member 9934 is provided to overlap with a secondary wavelength converter 99732 at a main wavelength converter 99720 according to the present embodiment. The reflection member 9934 has a structure similar to that of the reflection sheet 9925 described above in the twelfth embodiment. That is, the reflection member 9934 is made of synthetic resin (e.g., foamed PET) forming a surface with excellent light reflectivity and showing a white color. The reflection member 9934 is arranged to overlap from the outside (the opposite side of a sealing portion equipped end portion 99720EP1), with a third portion 99732*c* of the secondary wavelength converter 99732 overlapping with an end surface 99720*c* of the sealing portion equipped end portion 99720EP1 of the main wavelength converter 99720 in the X-axis direction, i.e., is arranged to cover the third portion 99732*c* from the outside. The size of the reflection member 9934 as viewed from the side is substantially the same as that of the third portion 99732*c*, and covers the third portion 99732*c* across the substantially entire area thereof. According to such a configuration, non-wavelength-converted blue light contained in light output from the end surface 99720*c* in the X-axis direction through the sealing portion equipped end portion 99720EP1 along the X-axis direction is wavelength-converted into green light and red light by the third portion 99732*c* of the secondary wavelength converter 99732, and then, is reflected by the reflection member 9934 to return inward in the X-axis direction, i.e., return toward the sealing portion equipped end portion 99720EP1. This avoids output of the light to the outside along the X-axis direction. Thus, an excellent efficiency of utilization of the light wavelength-converted by the secondary wavelength converter 99732 is provided.

Twentieth Embodiment

Figure 49:
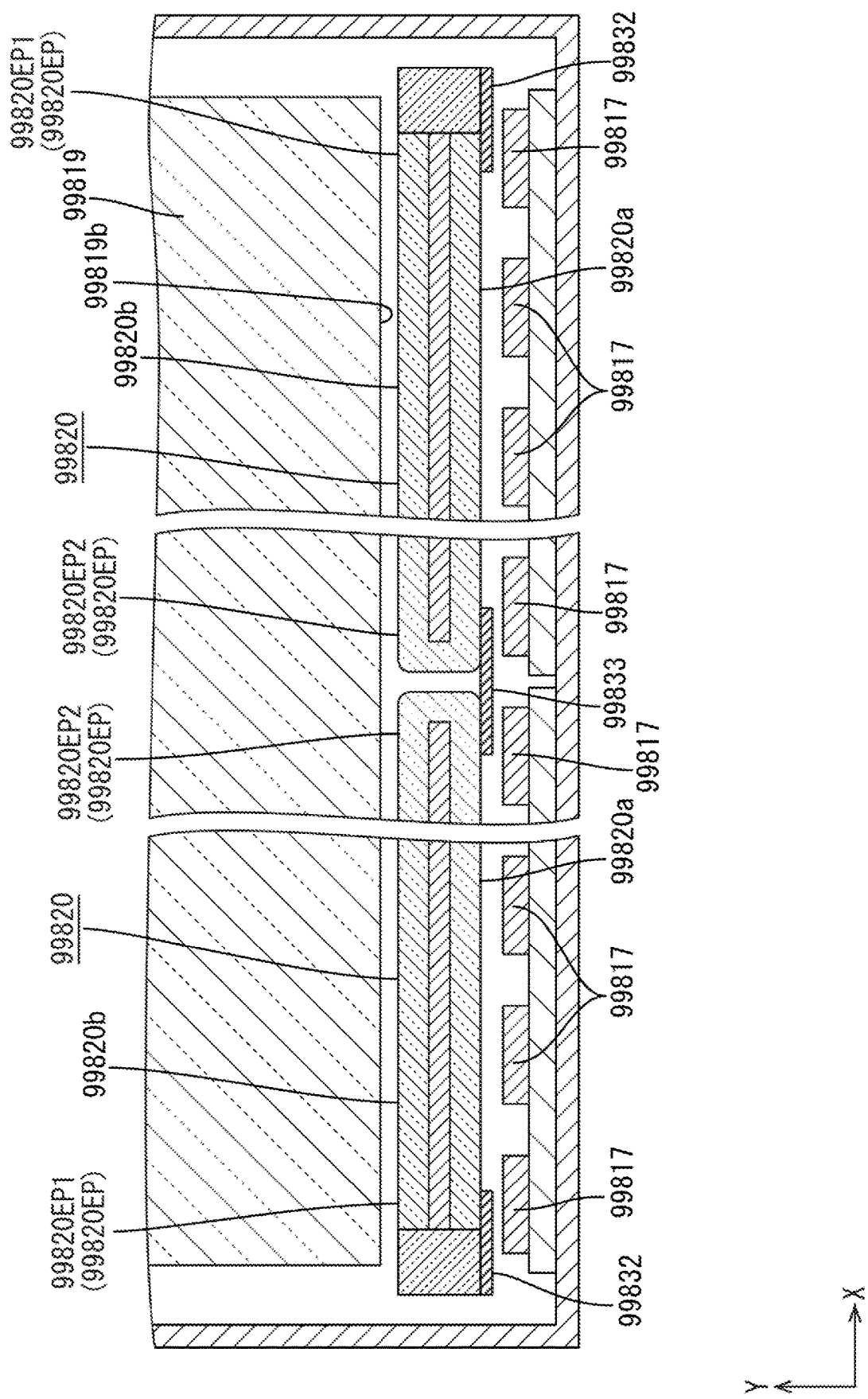
FIG. 49 is an enlarged horizontal sectional view of a backlight unit according to a twentieth embodiment of the present invention.

A twentieth embodiment of the present invention will be described with reference to FIG. 49. In the twentieth embodiment, arrangement of secondary wavelength converters 99832 and a center secondary wavelength converter 99833 is changed from that of the above-described fifteenth embodiment. Note that overlapping description of structures, features, and advantageous effects similar to those of the above-described fifteenth embodiment will not be made. The secondary wavelength converters 99832 and the center secondary wavelength converter 99833 according to the present embodiment are, as illustrated in FIG. 49, each arranged to overlap with light input surfaces 99820*a*, which are surfaces close to LEDs 99817, of outer surfaces of end portions 99820EP (sealing portion equipped end portions 99820EP1 and sealing portion non-equipped end portions 99820EP2) of two main wavelength converters 99820. That is, the secondary wavelength converters 99832 and the center secondary wavelength converter 99833 are, at the outer surfaces of the end portions 99820EP of the two main wavelength converters 99820, placed on the light input surfaces 99820*a* opposite to light output surfaces 99820*b* on which the secondary wavelength converters 99332 and the center secondary wavelength converter 9933 are placed in the above-described fifteenth embodiment. According to such a configuration, when blue light output from each LED 99817 facing the end portions 99820EP of the two main wavelength converters 99820 is input to each end portion 99820EP of the two main wavelength converters 99820, the blue light is wavelength-converted into green light and red light by the secondary wavelength converters 99832 and the center secondary wavelength converter 99833. The light (including the wavelength-converted green and red light and the non-wavelength-converted blue light) having transmitted through the secondary wavelength converters 99832 and the center secondary wavelength converter 99833 is output from light output surfaces 99820*b* through each end portion 99820EP, and then, is input to a light entering end surface 99819*b* of a light guide plate 99819.

Twenty-First Embodiment

Figure 50:
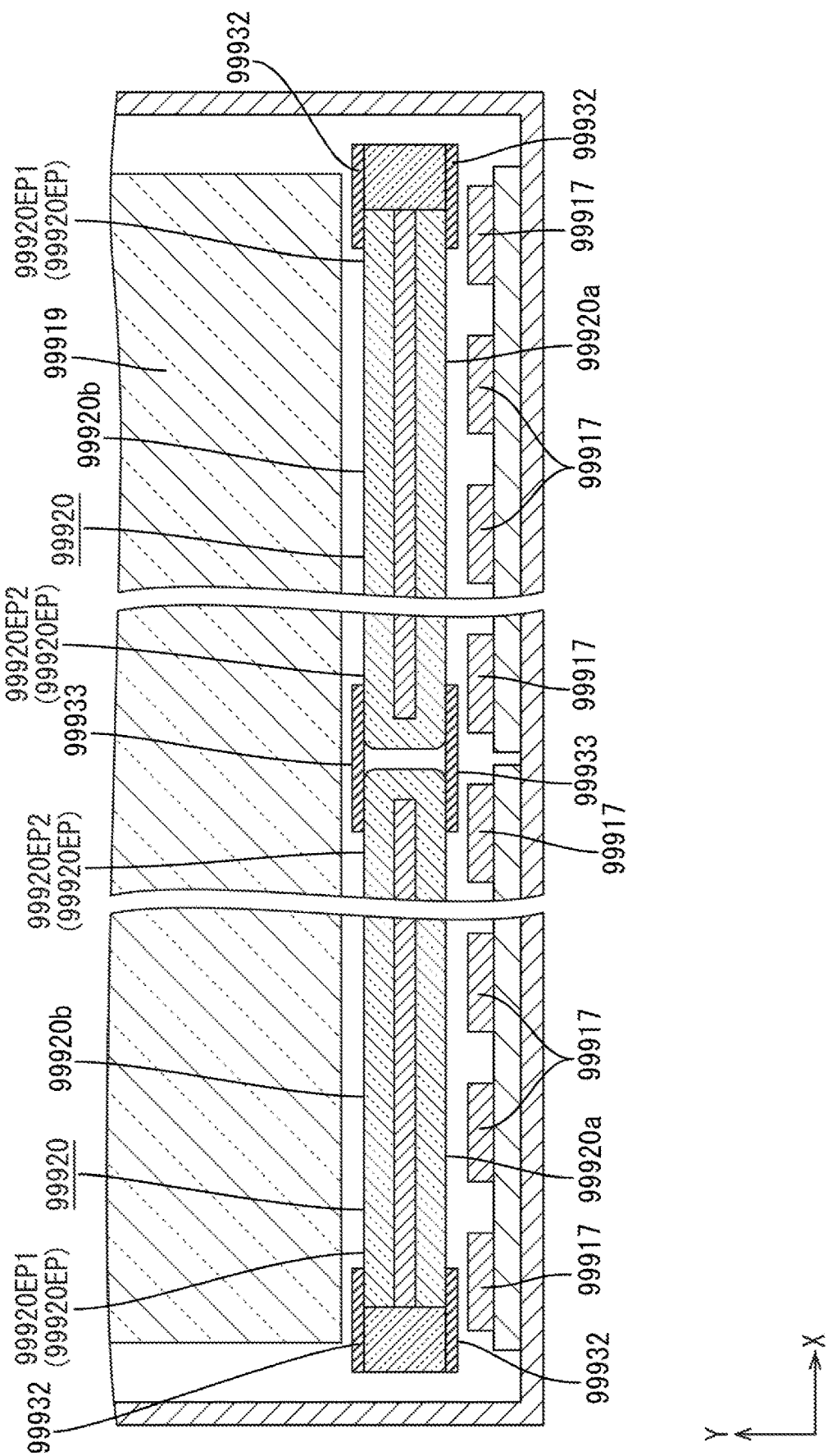
FIG. 50 is an enlarged horizontal sectional view of a backlight unit according to a twenty-first embodiment of the present invention.

A twenty-first embodiment of the present invention will be described with reference to FIG. 50. In the twenty-first embodiment, the number of installed secondary wavelength converters 99932 and the number of installed center secondary wavelength converters 99933 are changed from those of the above-described fifteenth and twentieth embodiments. Note that overlapping description of structures, features, and advantageous effects similar to those of the above-described fifteenth and twentieth embodiments will not be made. The secondary wavelength converters 99932 and the center secondary wavelength converters 99933 according to the present embodiment are, at outer surfaces of end portions 99920EP (sealing portion equipped end portions 99920EP1 and sealing portion non-equipped end portions 99920EP2) of two main wavelength converters 99920, arranged to overlap with not only light output surfaces 99920*b* as surfaces close to a light guide plate 99919 but also light input surface 99920*a* as surfaces close to LEDs 99917, as illustrated in FIG. 50. That is, the pair of secondary wavelength converters 99932 or the pair of center secondary wavelength converters 99933 is placed on the light output surface 99920*b* and the light input surface 99920*a* to sandwich each end portion 99920EP in a front-to-back direction, i.e., the Y-axis direction. According to such a configuration, when blue light output from each LED 99917 facing a corresponding one of the end portions 99920EP of the two main wavelength converters 99920 is input to the corresponding one of the end portions 99920EP, the blue light is wavelength-converted into green light and red light by the secondary wavelength converters 99932 and the center secondary wavelength converter 99933 arranged on the light input surfaces 99920*a*. Further, when the non-wavelength-converted blue light contained in the light having transmitted through each end portion 99920EP is output, such blue light is wavelength-converted into green light and red light by the secondary wavelength converters 99932 and the center secondary wavelength converter 99933 arranged on the light output surfaces 99920*b*. Thus, the non-wavelength-converted light having transmitted through each end portion 99920EP can be more efficiently wavelength-converted.

Twenty-Second Embodiment

Figure 51:
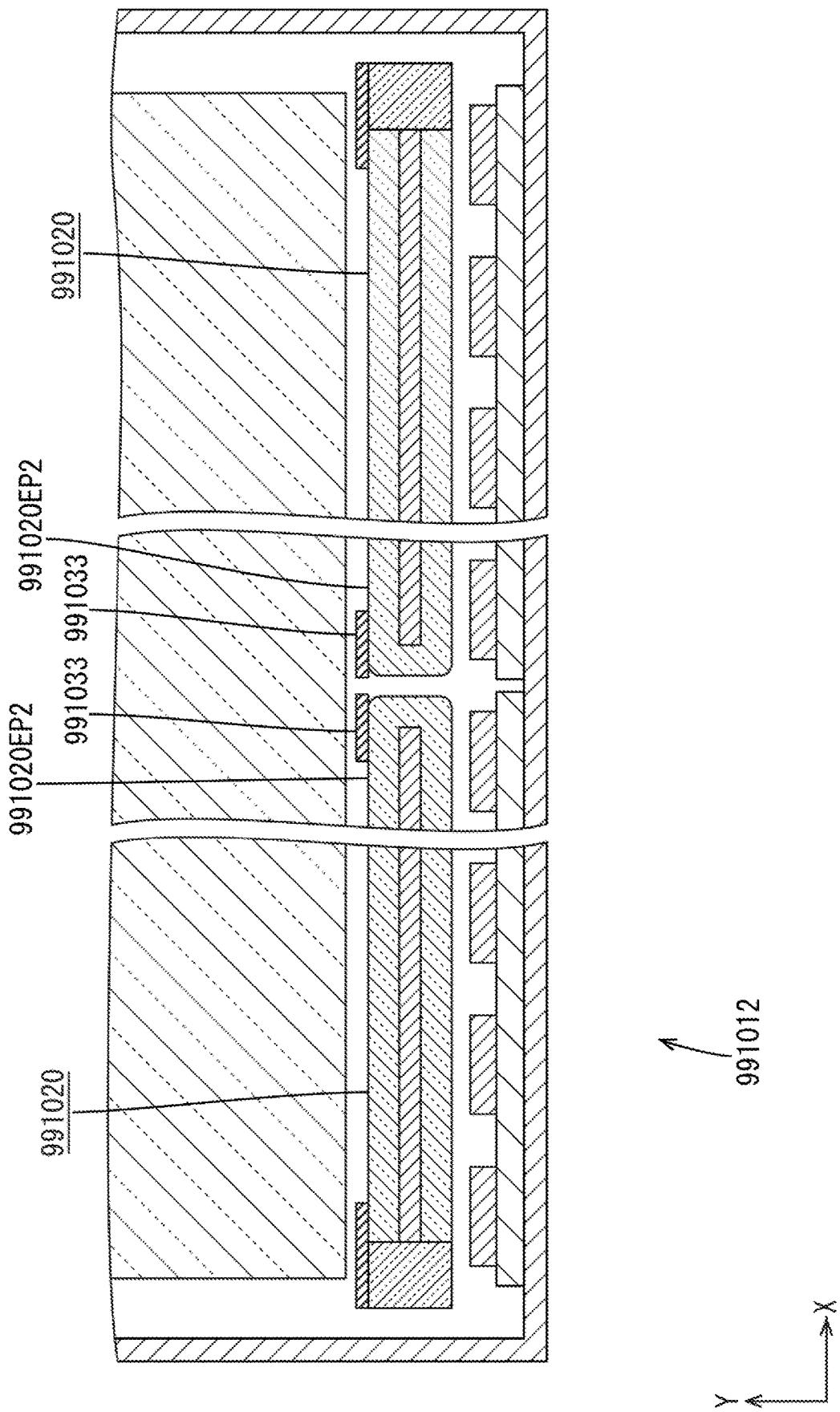
FIG. 51 is an enlarged horizontal sectional view of a backlight unit according to a twenty-second embodiment of the present invention.

A twenty-second embodiment of the present invention will be described with reference to FIG. 51. In the twenty-second embodiment, the configuration of each center secondary wavelength converter 991033 is changed from that of the above-described fifteenth embodiment. Note that overlapping description of structures, features, and advantageous effects similar to those of the above-described fifteenth embodiment will not be made. The center secondary wavelength converters 991033 according to the present embodiment are, as illustrated in FIG. 51, separately placed for each of two main wavelength converters 991020, and do not extend over the two main wavelength converters 991020. Specifically, the center secondary wavelength converters 991033 are separately attached to each of sealing portion non-equipped end portions 991020EP2 of the two main wavelength converters 991020, and are separated from each other. According to such a configuration, the two main wavelength converters 991020 can be separately incorporated into a backlight unit 991012 upon manufacturing, leading to excellent workability. Moreover, even in a case where the positions of the two main wavelength converters 991020 incorporated into the backlight unit 991012 shift, for example, from each other in the Y-axis direction or the Z-axis direction, stress to be acted on the center secondary wavelength converters 991033 is avoided. Thus, a problem such as detachment of the center secondary wavelength converters 991033 is less caused.

Twenty-Third Embodiment

Figure 52:
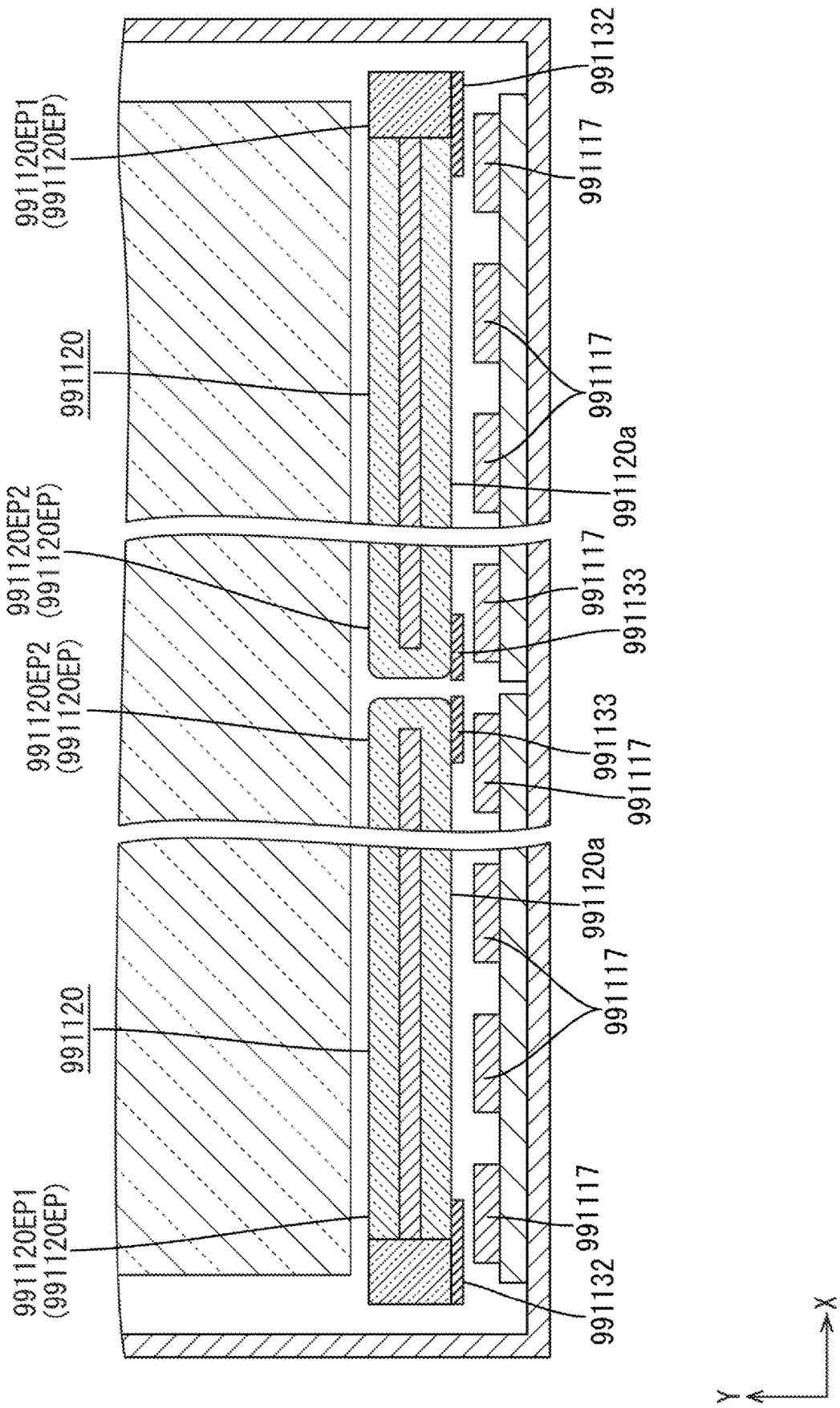
FIG. 52 is an enlarged horizontal sectional view of a backlight unit according to a twenty-third embodiment of the present invention.

A twenty-third embodiment of the present invention will be described with reference to FIG. 52. In the twenty-third embodiment, arrangement of secondary wavelength converters 991132 and center secondary wavelength converters 991133 is changed from that of the above-described twenty-second embodiment. Note that overlapping description of structures, features, and advantageous effects similar to those of the above-described twenty-second embodiment will not be made. The secondary wavelength converters 991132 and the center secondary wavelength converters 991133 divided for each of two main wavelength converters 991120 according to the present embodiment are, at outer surfaces of end portions 991120EP (sealing portion equipped end portions 991120EP1 and sealing portion non-equipped end portions 991120EP1) of the two main wavelength converters 991120, arranged to overlap with light input surfaces 991120a as surfaces close to LEDs 991117, as illustrated in FIG. 52. That is, the secondary wavelength converters 991132 and the center secondary wavelength converters 991133 are in arrangement similar to that described above in the twentieth embodiment.

Twenty-Fourth Embodiment

Figure 53:
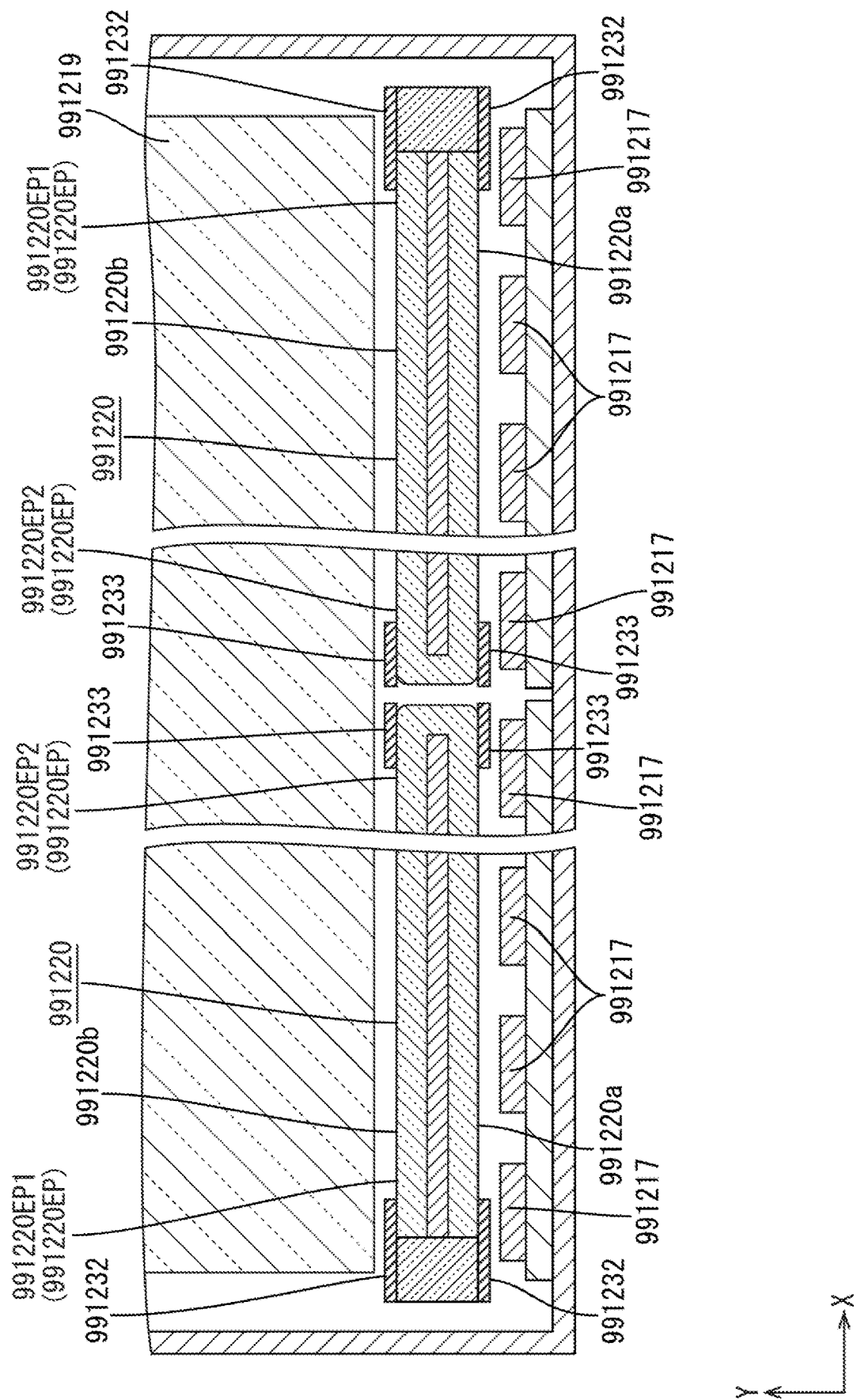
FIG. 53 is an enlarged horizontal sectional view of a backlight unit according to a twenty-fourth embodiment of the present invention.

A twenty-fourth embodiment of the present invention will be described with reference to FIG. 53. In the twenty-fourth embodiment, the number of installed secondary wavelength converters 991232 and the number of installed center secondary wavelength converters 991233 are changed from those of the above-described twenty-second and twenty-third embodiments. Note that overlapping description of structures, features, and advantageous effects similar to those of the above-described twenty-second and twenty-third embodiments will not be made. The secondary wavelength and converters 991232 the center secondary wavelength converters 991233 divided for each of two main wavelength converters 991220 according to the present embodiment are, at outer surfaces of end portions 991220EP (sealing portion equipped end portions 991220EP1 and sealing portion non-equipped end portions 991220EP2) of the two main wavelength converters 991220, arranged to overlap with not only light output surfaces 991220b as surfaces close to a light guide plate 991219 but also light input surfaces 991220a as surfaces close to LEDs 991217, as illustrated in FIG. 53. That is, the secondary wavelength converters 991232 and the center secondary wavelength converters 991233 are in arrangement similar to that described above in the twenty-first embodiment.

Twenty-Fifth Embodiment

A twenty-fifth embodiment of the present invention will be described with reference to FIGS. 54 and 55. In the twenty-fifth embodiment, arrangement of center secondary wavelength converters 991333 is changed from that of the above-described twenty-first embodiment, and reflection members 991334 are added. Note that overlapping description of structures, features, and advantageous effects similar to those of the above-described twenty-first embodiment will not be made.

Figure 54:
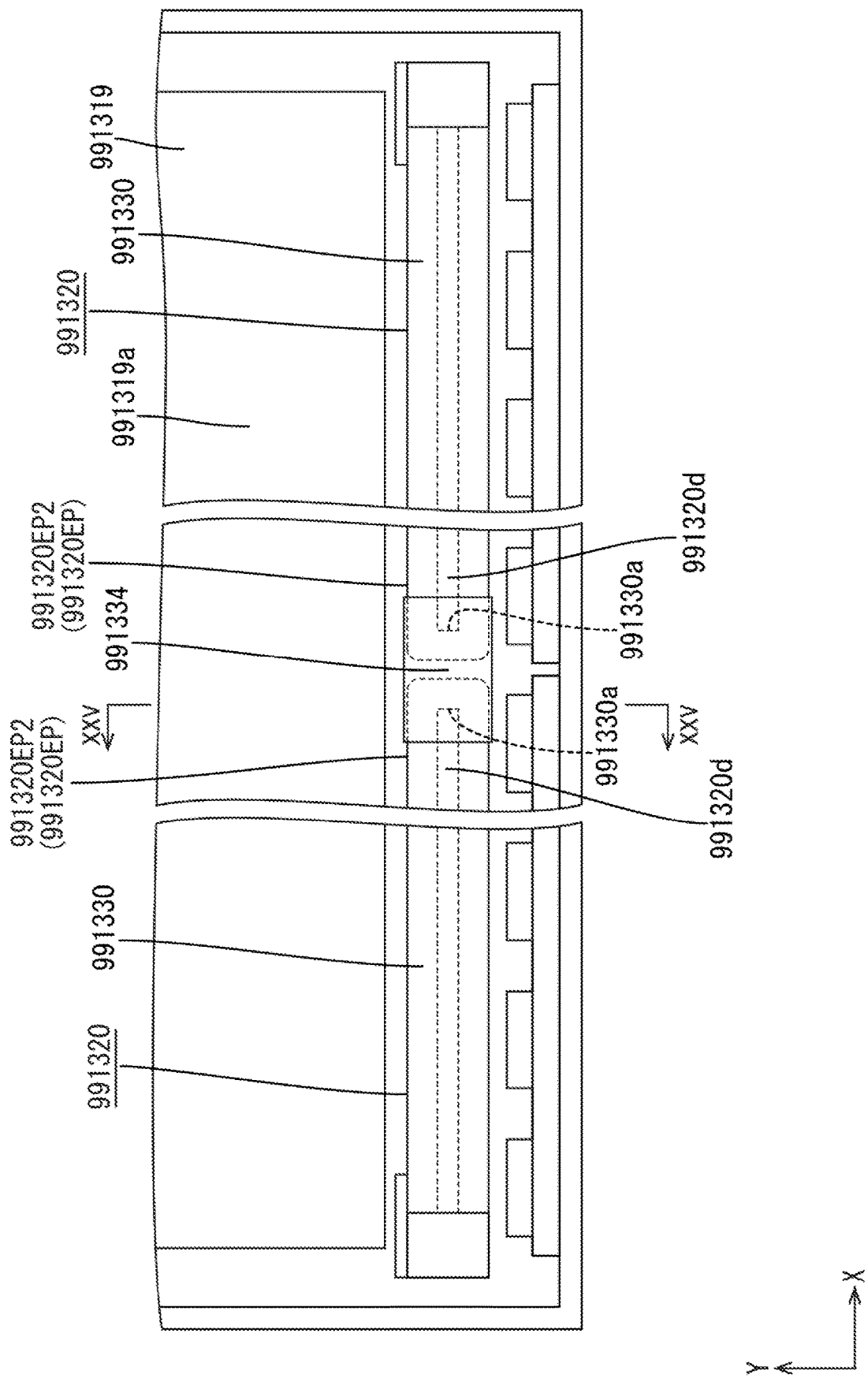
FIG. 54 is an enlarged plan view of a backlight unit according to a twenty-fifth embodiment of the present invention.
Figure 55:
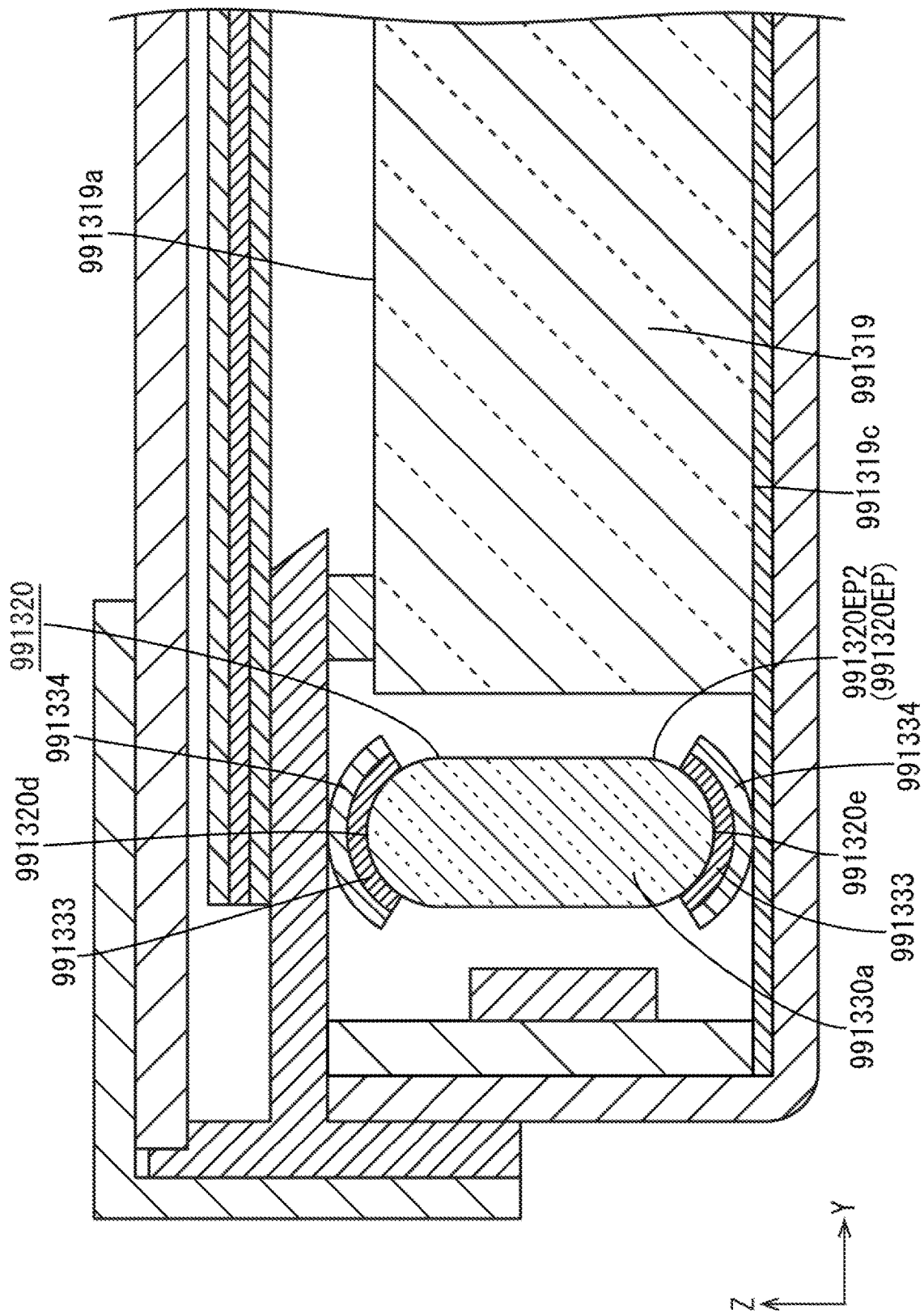
FIG. 55 is a sectional view of FIG. 54 along an xxv-xxv line.

As illustrated in FIGS. 54 and 55, the two center secondary wavelength converters 991333 according to the present embodiment are arranged to extend over adjacent sealing portion non-equipped end portions 9913205P2 of two main wavelength converters 991320, and at outer surfaces of the sealing portion non-equipped end portions 991320EP2, are arranged to overlap with front (the upper side as viewed in FIG. 55) surfaces 991320d and back (the lower side as viewed in FIG. 55) surfaces 991320e. The front surface 991320d of the sealing portion non-equipped end portion 991320EP2 provided with one of the center secondary wavelength converters 991333 is formed as a surface on the same side as a light exiting plate surface 991319a of a light guide plate 991319. The back surface 991320e of the sealing portion non-equipped end portion 991320EP2 provided with the other center secondary wavelength converter 991333 is formed as a surface on the opposite side of the light exiting plate surface 991319a of the light guide plate 991319, i.e., on the same side as an opposite plate surface 991319c. That is, the two center secondary wavelength converters 991333 are placed in a pair on the front surface 991320d and the back surface 991320e to sandwich the sealing portion non-equipped end portion 9913205P2 in a front-to-back direction, i.e., the Z-axis direction.

Further, the two reflection members 991334 are each provided to overlap with the two center secondary wavelength converters 991333 on the outside thereof. One of the reflection members 991334 is arranged to cover, from the front side (the side opposite to the sealing portion non-equipped end portions 991320EP2), the center secondary wavelength converters 991333 overlapping with the front surfaces 991320d of the sealing portion non-equipped end portions 991320EP2. The other reflection member 991334 is arranged to cover, from the back side (the side opposite to the sealing portion non-equipped end portions 991320EP2), the center secondary wavelength converters 991333 overlapping with the back surfaces 991320e of the sealing portion non-equipped end portions 991320EP2. The size of each reflection member 991334 as viewed in the plane is substantially the same as that of a corresponding one of the center secondary wavelength converters 991333, and each reflection member 991334 covers a corresponding one of the center secondary wavelength converters 991333 across the substantially entire area thereof. The reflection member 991334 has a structure similar to that of the reflection member 9934 (see FIG. 48) described above in the eighth embodiment.

According to such a configuration, non-wavelength-converted blue light contained in light toward the front surfaces 991320d through the sealing portion non-equipped end portions 991320EP2 (bottom portions 991330a of containers 991330) of the two main wavelength converters 991320 is wavelength-converted into green light and red light by the front-side center secondary wavelength converters 991333, and the non-wavelength-converted blue light contained in the light toward the back surfaces 991320e through the sealing portion non-equipped end portions 991320EP2 is wavelength-converted into green light and red light by the back-side center secondary wavelength converters 991333. The light having transmitted through the center secondary wavelength converters 991333 is reflected by the reflection members 991334, and then, returns inward in the Z-axis direction, i.e., returns toward the sealing portion non-equipped end portions 991320EP2. This avoids light output to the outside along the Z-axis direction. Thus, an excellent efficiency of utilization of the light wavelength-converted by the center secondary wavelength converters 991333 is provided.

Twenty-Sixth Embodiment

Figure 56:
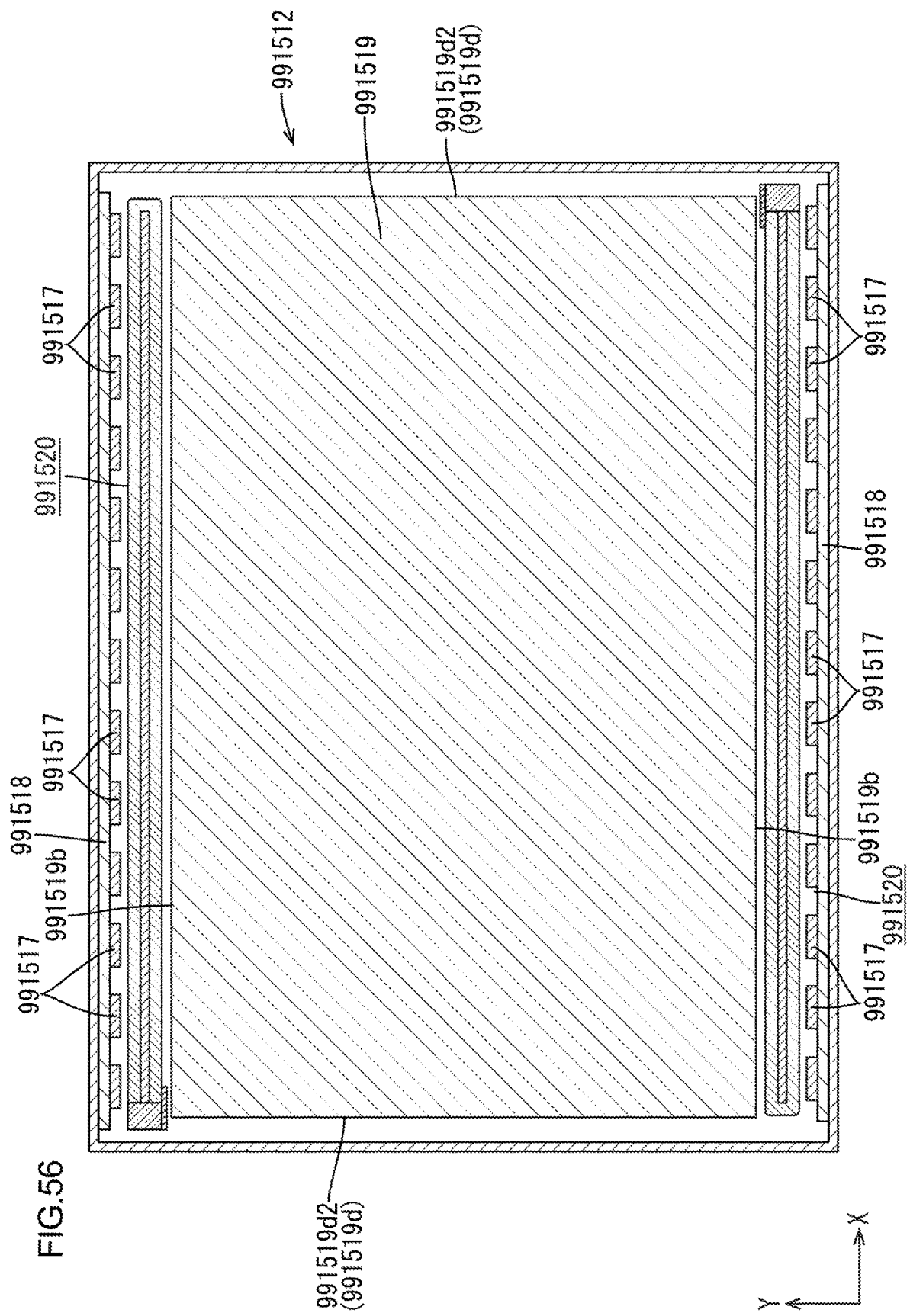
FIG. 56 is a plan view of a backlight unit according to a twenty-sixth embodiment of the present invention.

A twenty-sixth embodiment of the present invention will be described with reference to FIG. 56. In the twenty-sixth embodiment, the number of installed LED substrates 991518 and the number of installed main wavelength converters 991520 are changed from those of the above-described twelfth embodiment. Note that overlapping description of structures, features, and advantageous effects similar to those of the above-described twelfth embodiment will not be made. A backlight unit 991512 according to the present embodiment is configured such that LEDs 991517 and the LED substrates 991518 are arranged at both long-side end portions as illustrated in FIG. 56. Specifically, a pair of LED substrates 991518 is arranged such that each LED 991517 mounted on the LED substrates 991516 faces a corresponding one of both long-side end surfaces of an outer peripheral end surface of a light guide plate 991519. Thus, in the present embodiment, each of the long-side end surfaces of the outer peripheral end surface of the light guide plate 991519 is formed as a light entering end surface 991519b to which light is input from the LEDs 991517, and the remaining short-side end surfaces are formed as non-light-input end surfaces 991519d. Thus, the non-light-input end surfaces 991519d according to the present embodiment do not include a non-light-input opposite end surface 991941 as described above in the twelfth embodiment, but include a pair of non-light-input-side end surfaces 991519d2 adjacent to the light entering end surfaces 99159b. As described above, the backlight unit 991512 according to the present embodiment is of a both-sided light input type such that the guide plate 991519 is sandwiched by both LED substrates 991518 and the LEDs 991517 mounted on the LED substrates 991518 from both sides in the short side direction (the Y-axis direction) of the right wide plate 991519. Moreover, the pair of main wavelength converters 991520 is interposed among the LED substrates 991518 and the light entering end surfaces 991519b. Thus light emitted from each LED 991517 of the LED substrates 991518 is wavelength-converted by the main wavelength converters 991520, and then, is input to the light entering end surfaces 991519b of the light guide plate 991519.

Twenty-Seventh Embodiment

Figure 57:
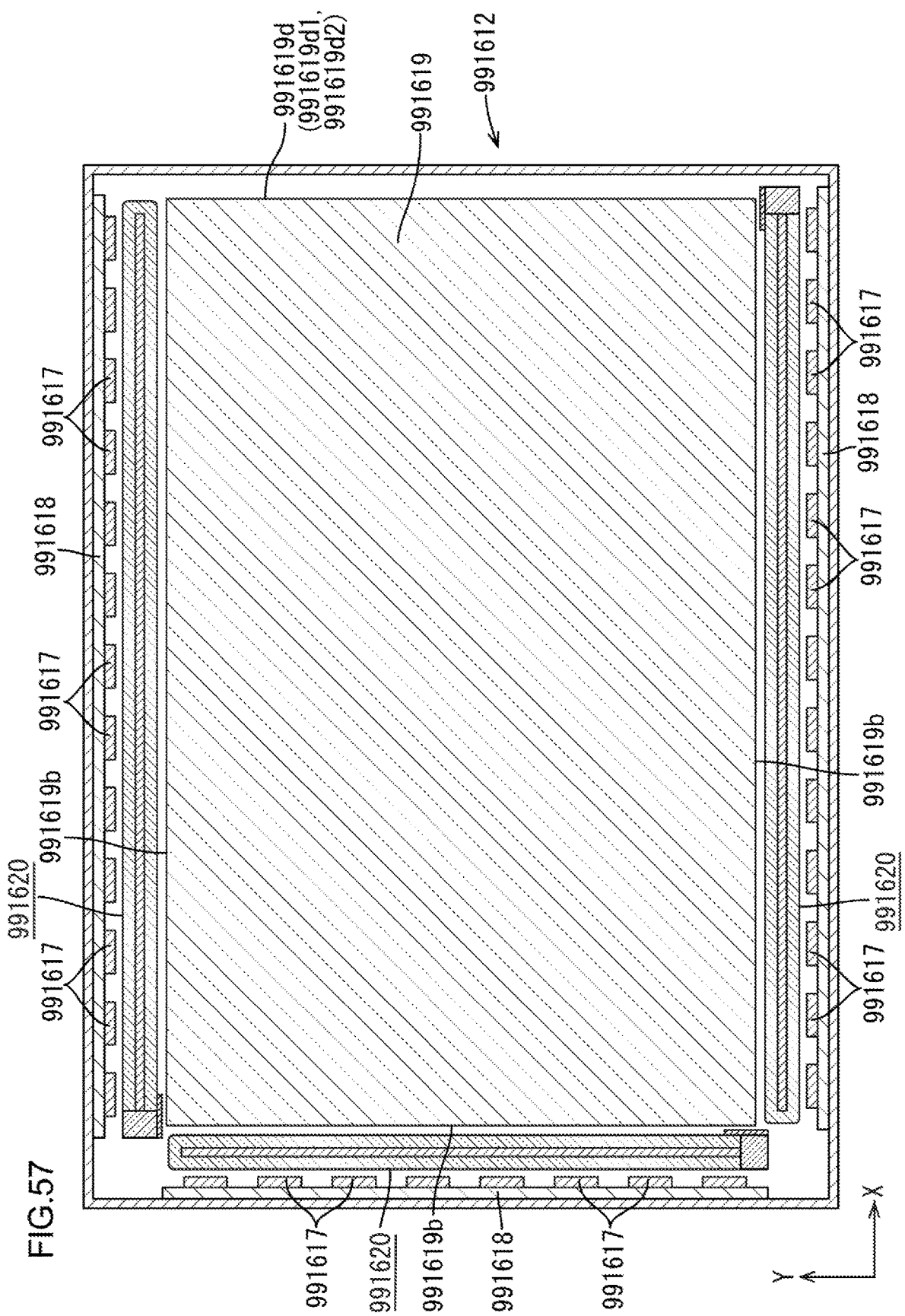
FIG. 57 is a plan view of a backlight unit according to a twenty-seventh embodiment of the present invention.

A twenty-seventh embodiment of the present invention will be described w the reference to FIG. 57. In the twenty-seventh embodiment, the number of installed LED substrates 991618 and the number of installed main wavelength converters 991620 are changed from those of the above-described twenty-sixth embodiment. Note that overlapping description of structures, features, and advantageous effects similar to those of the above-described twenty-sixth embodiment will not be made. As illustrated in FIG. 57, a backlight unit 991612 according to the present embodiment is configured such that LEDs 991617 and the LED substrates 991618 are arranged at both long-side end portions and one short-side end portion. Specifically, each LED substrate 991618 is arranged such that each mounted LED 991617 faces a corresponding one of both long-side end surfaces and one short-side end surface of an outer peripheral end surface of a light guide plate 991619. Thus, in the present embodiment, each of both long-side end surfaces and one short-side end surface of the outer peripheral end surface of the light guide plate 991619 is formed as a light entering end surface 991619b to which light is input from, the LEDs 991617, and the remaining other short-side end surface is formed as a non-light-input end surface 991619d. Thus, the non-light-input end surface 991619d according to the present embodiment serves as a non-light-input opposite end surface 991619d1 for the short-side light entering end surfaces 991619b, and serves as a non-light-input-side end surface 991619d2 for both long-side light entering end surfaces 991619b. As described above, the backlight unit 991612 according to the present embodiment is of a three-sided light input type such that light is input to the light guide plate 991619 from the three LED substrates 991618 arranged along three sides of the light guide plate 991619 and each LED 991617 mounted on the LED substrates 991618. Moreover, three main wavelength converters 991620 are interposed among the LED substrates 991618 and the light entering end surfaces 991619b. With this configuration, the light emitted from each LED 991617 of the LED substrates 991618 is wavelength-converted by the main wavelength converters 991620, and then, is input to the light entering end surfaces 991619b of the light guide plate 991619.

Twenty-Eighth Embodiment

Figure 58:
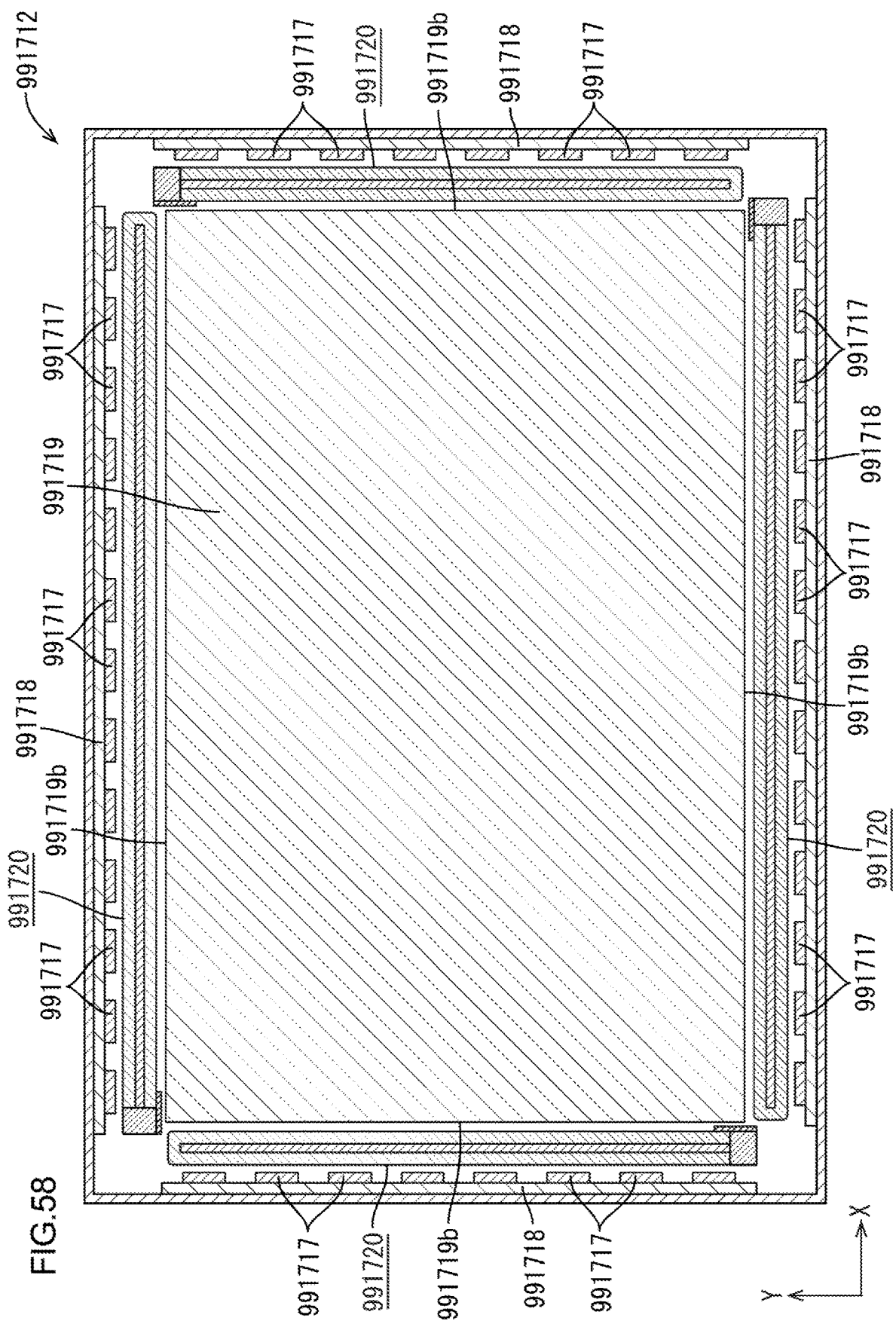
FIG. 58 is a plan view of a backlight unit according to a twenty-eighth embodiment of the present invention.

A twenty-eighth embodiment of the present invention will be described with reference to FIG. 58. In the twenty-eighth embodiment, the number of installed LED substrates 991718 and the number of installed main wavelength converters 991720 are changed from those of the above-described twenty-sixth embodiment. Note that overlapping description of structures, features, and advantageous effects similar to those of the above-described twenty-sixth embodiment will not be made. As illustrated in FIG. 58, a backlight unit 991712 according to the present embodiment is configured such that LEDs 991717 and the LED substrates 991718 are arranged at both long-side end portions and both short-side end portions, i.e., is configured such that the LEDs 991717 and the LED substrates 991718 are arranged across the entire circumference of an outer peripheral end portion. Specifically, the LED substrates 991718 are arranged such that the mounted LEDs 991717 face the entire circumference of an outer peripheral end surface of a light guide plate 991719. Thus, in the present embodiment, it is configured such that the entire circumference of the outer peripheral end surface of the light guide plate 991719 is formed as light entering end surfaces 991719b to which light is input from the LEDs 991717 and no non-light-input end surface is formed at the outer peripheral end surface of the light guide plate 991719. As described above, the backlight unit 991712 according to the present embodiment is of a four-sided light input type such that the light is input to the light guide plate 991719 from the four LED substrates 991718 arranged along four sides of the light guide plate 991719 and each LED 991717 mounted on the LED substrates 991718. Moreover, tour main wavelength converters 991720 are interposed among the LED substrates 991718 and the light entering end surfaces 991719b. With this configuration, the light emitted from each LED 991717 of the LED substrates 991718 is wavelength-converted by the main wavelength converters 991720, and then, is input to the light entering end surfaces 991719b of the light guide plate 991719.

Twenty-Ninth Embodiment

Figure 59:
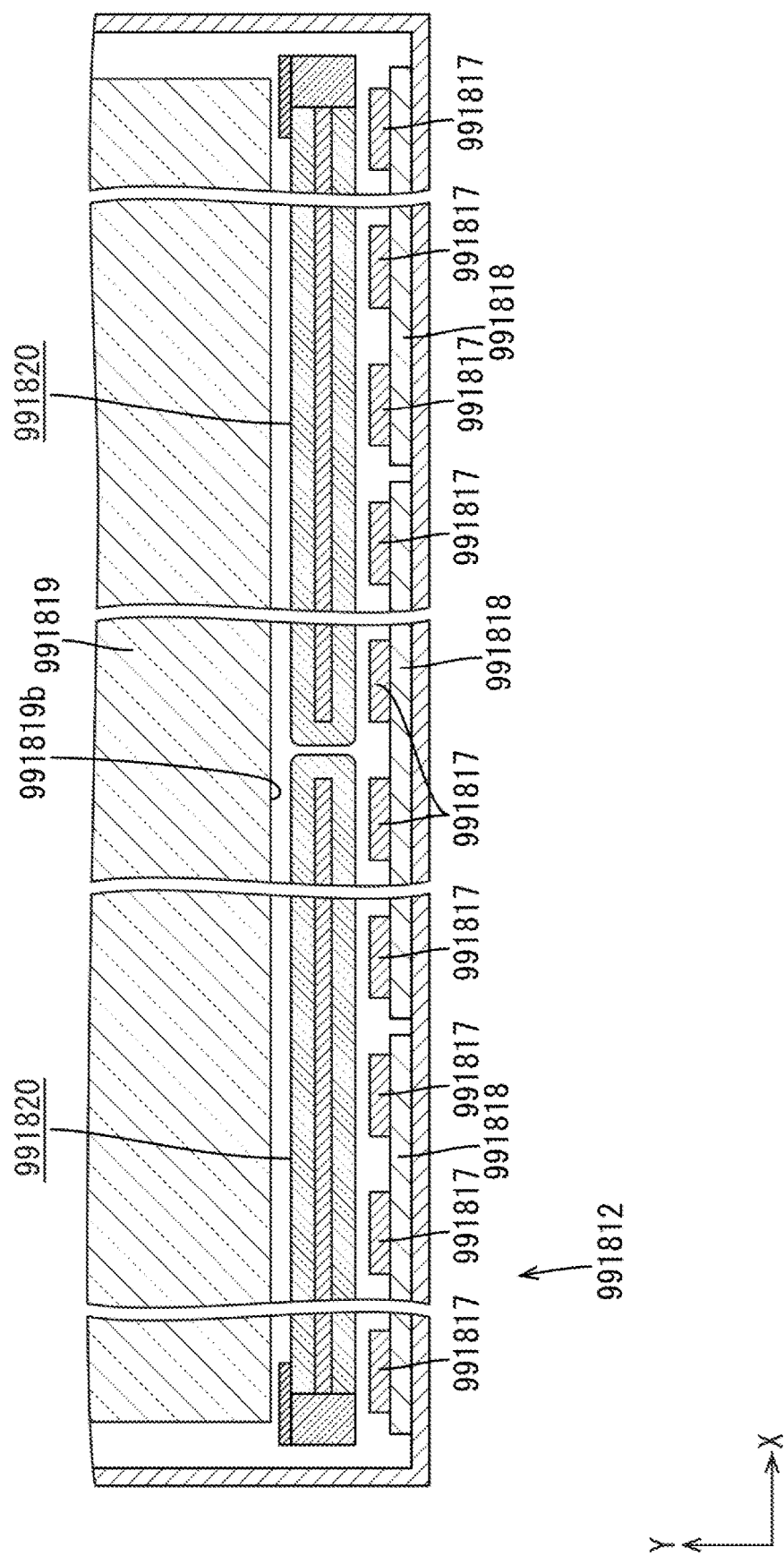
FIG. 59 is an enlarged side sectional view of a backlight unit according to a twenty-ninth embodiment of the present invention.

A twenty-ninth embodiment of the present invention will be described with reference to FIG. 59. In the twenty-ninth embodiment, the number of installed LED substrates 991818 is changed from that of the above-described fourteenth embodiment. Note that overlapping description of structures, features, and advantageous effects similar to those of the above-described fourteenth embodiment will not be made. As illustrated in FIG. 59, three LED substrates 991818 according to the present embodiment are arranged adjacent to each other along the length direction (the X-axis direction) of a light entering end surface 991819b of a light guide plate 991819. The length dimension of each LED substrate 991818 is shorter than that of each main wavelength converter 991820. Some (LEDs 991817 positioned at ends of a backlight unit 991812 in the X-axis direction) of multiple LEDs 991817 mounted on both LED substrates 991818 positioned at both ends in the X-axis direction are arranged to overlap with sealing portion equipped end portions 991820EP1 of the main wavelength converters 991820 in the X-axis direction. On the other hand, some (LEDs 991817 positioned at the center of the backlight unit 991812 in the X-axis direction) of the multiple LEDs 991817 positioned at the center in the X-axis direction and mounted on the LED substrates 991818 are arranged to overlap with sealing portion non-equipped end portions 991820EP2 of the main wavelength converters 991820 in the X-axis direction configuration is suitable for a larger backlight unit 991812.

Other Embodiment

The present invention is not limited to the embodiments described above and illustrated in the figures. The following embodiments may be included in the technical scope of the present invention, for example.

(1) By a combination of the above-described first and second embodiments, the concentrations of the contained phosphors may be set higher in the end portion as the great light emission portion of the wavelength converter than in the center portion, and the end portion may be formed thicker than the center portion.

(2) By a combination of the above-described second and third embodiments, one (the sealing portion side) end portion of the wavelength converter may be formed thicker than the center portion and the other end portion.

(3) By a combination of the above-described second and fourth embodiments, both end portions of the wavelength converter may be formed thicker than the center portion, and one (the sealing portion side) end portion may be further formed thicker than the other end portion.

(4) The configurations (the configuration in which one or both end portions of the wavelength converter is formed thick) described in the above-described second and fourth embodiments may be combined with the fifth to seventh embodiments, as necessary. Specifically, a combination of the fourth and sixth embodiments is effective in a case where occurrence of color unevenness due to arrangement in which other (the opposite side of the sealing portion side) end portions of the wavelength converters are adjacent to each other at the center in the length direction of the light entering end surface of the light guide plate is concerned.

(5) The configurations described above in the second to seventh embodiments may be combined with the eighth to eleventh embodiments, as necessary.

(6) The above-described fifth embodiment shows the case where the contents of the phosphors and the amount of light to be wavelength-converted per unit length are different between one end portion and the other end portion of the wavelength converter, but the contents of the phosphors and the amount of light to be wavelength-converted per unit length may be the same between one end portion and the other end portion of the wavelength converter.

(7) The above-described fifth and sixth embodiments show, by way of example, the configuration in which the two wavelength converters are arranged along the length direction of the light entering end surface of the light guide plate, but it may be configured such that three or more wavelength converters are arranged along such a length direction.

(8) Each embodiment described above (excluding the ninth to eleventh embodiments) shows, by way of example, the one-sided light input type backlight unit configured such that one of the long-side end surfaces of the light guide plate is formed as the light entering end surface, but the present invention is also applicable to a one-sided light input type backlight unit configured such that the other long-side end surface of the guide plate is formed as the light entering end surface. Moreover, the present invention is also applicable to a one-sided light input type backlight unit configured such that any one of the short-side end surfaces of the light guide plate is formed as the light entering end surface.

(9) The above-described ninth embodiment shows, by way of example, the both-sided light input type backlight unit configured such that both long-side end surfaces of the light guide plate are formed as the light entering end surfaces, but the present invention is also applicable to a both-sided light input type backlight unit configured such that both short-side end surfaces of the light guide plate are formed as the light entering end surfaces.

(10) The above-described tenth embodiment shows, by way of example, the three-sided light input type backlight unit configured such that the other short-side end surface of the light guide plate is formed as the non-light-input end surface, but the present invention is also applicable to a three-sided light input type backlight unit configured such that any one of one short-side end surface and both long-side end surfaces of the light guide plate is formed as the non-light-input end surface.

(11) Each embodiment described above shows the configuration in which the LED includes the blue LED element. However, instead of the blue LED element, an LED including a purple LED element configured to emit purple light as a visible light beam or an ultraviolet LED element (a near-ultraviolet LED element) configured to emit ultraviolet light (e.g., near-ultraviolet light) may be used, for example. The wavelength converter used in combination with the LED including the purple LED element or the ultraviolet LED element preferably contains the red phosphor, the green phosphor, and a blue phosphor. As another example, the wavelength converter used in combination with the LED including the purple LED element or the ultraviolet LED element may contain one or two phosphors selected from the red phosphor, the green phosphor, and the blue phosphor, and the remaining one or two phosphors may be contained in a sealing material of the LED. In addition to these case, a specific phosphor color, etc. may be changed as necessary.

(12) Each embodiment described above shows, by way of example, the configuration in which the LED has the blue LED element and the wavelength converter has the green phosphor and the red phosphor, but it may be configured such that the LED has, in addition to the blue LED element, a red LED element configured to emit red light to emit magenta light and the wavelength converter used in combination with such an LED has the green phosphor. Instead of the red LED element, the sealing material of the LED may contain the red phosphor configured to emit the red light by means of the blue light as the excitation light.

(13) In addition to (12) described above, it may be configured such that the LED has, in addition to the blue LED element, a green LED element configured to emit green light to emit cyan light and the wavelength converter used in combination with such an LED has the red phosphor. Instead of the green LED element, the sealing material of the LED may contain the green phosphor configured to emit the green light by means of the blue light as the excitation light.

(14) Each embodiment described above shows the case where the wavelength converter contains the green phosphor and the red phosphor, but it may be configured such that the wavelength converter contains only a yellow phosphor or contains the red phosphor or the green phosphor in addition to the yellow phosphor.

(15) Each embodiment described above shows, by way of example, the case where the quantum dot phosphor used as the phosphor contained in the wavelength converter is of the core-shell type made of CdSe and. ZnS, but a core quantum dot phosphor configured such that an internal composition is a single composition may be used. For example, material combinations (CdSe, CdS, ZnS) of Zn, Cd, Hg, Pb, etc. as divalent cations and O, S, Se, Te, etc. as divalent anions may be used alone. Further, material combinations (e.g., indium phosphide (InP) and gallium arsenide (GaAs)) of Ga, In, etc. as trivalent cations and P, As, Sb, etc. as trivalent anions, chalcopyrite compounds (e.g., $CuInSe_2$), etc. may be used alone. In addition to the core-shell or core quantum dot phosphor, an alloy quantum dot phosphor may be used. Alternatively, a quantum dot phosphor containing no cadmium may be used.

(16) Each embodiment described above shows, by way of example, the case where the quantum dot phosphor used as the phosphor contained in the wavelength converter is of the core-shell type with CdSe and ZnS, but a core-shell quantum dot phosphor made of a combination of other materials may be used. Alternatively, the quantum dot phosphor used as the phosphor contained in the wavelength converter may be the quantum dot phosphor containing no cadmium (Cd).

(17) Each embodiment described above shows, by way of example, the configuration in which the quantum dot phosphors are contained in the wavelength converter, but the wavelength converter may contain other types of phosphors. For example, a sulfide phosphor may be used as the phosphor contained in the wavelength converter Specifically, $SrGa_2S_4:Eu^{2+}$ may be used as the green phosphor, and (Ca, Sr, Ba) $S:Eu^{2+}$ may be used as the red phosphor.

(18) In addition to (17) described above, the green phosphor contained in the wavelength converter may be (Ca, Sr, Ba)$_3SiO_4:Eu^{2+}$, β-SiAlON:$Eu^{2+}$, or $Ca_3Sc_2Si_3O_{12}:Ce^{3+}$, for example. Moreover, the red phosphor contained in the wavelength conversion sheet may be (Ca, Sr, Ba)$_2SiO_5N_8:Eu^{2+}$, $CaAlSiN_3:Eu^{2+}$, or a complex fluoride phosphor (manganese-activated potassium silicofluoride ($K_2TiF_6$)), for example. Further, the yellow phosphor contained in the wavelength conversion sheet may be (Y, Gd)$_3$ (Al, Ga)$_5O_{12}$: $Ce^{3+}$ (commonly known as YAG:$Ce^{3+}$) α-SiAlON:$Eu^{2+}$, or (Ca, Sr, Ba)$_3SiO_4:Eu^{2+}$, for example.

(19) In addition to (17) and (18) described above, an organic phosphor may be used as the phosphor contained in the wavelength converter. A low-molecular organic phosphor having triazole or oxadiazole as a basic skeleton may be used as the organic phosphor, for example.

(20) In addition to (17), (18), and (19) described above, a phosphor configured to perform wavelength conversion by energy transfer via dressed photons (near-field light) may be used as the phosphor contained in the wavelength converter. Specifically, a phosphor configured such that DCM dye is dispersively mixed with zinc oxide quantum dots (ZnO-QD) having a diameter of 3 nm to 5 nm (preferably a diameter of about 4 nm) may be preferably used as the phosphor of this type.

EXPLANATION OF SYMBOLS

10: Liquid crystal display device (Display device)
10TV: Television device
11: Liquid crystal panel (Display panel)
12, 412, 712, 812, 912, 1012: Backlight unit (Lighting device)
17, 117, 417, 617, 717, 817, 917, 1017: LED (Light source)
19, 219, 419, 519, 719, 819, 919, 1019: Light guide plate
19a: Light output plate surface
19b, 219b, 419b, 519b, 719b, 819b, 919b, 1019b: Light input end surface
20, 120, 220, 320, 420, 520, 720, 820, 920, 1020: Wavelength converter
20CP, 120CP, 2200P, 320CP, 420CP, 520CP: Center portion
20EP, 120EP, 220EP, 320EP, 420EP, 520EP: End portion
29, 129, 229, 329: Phosphor containing portion (phosphor)
30, 130, 230, 330: Container
31, 131, 231, 331, 431, 531, 631: Sealing portion
32, 232, 332, 432, 532, 632: Great light emission portion

The invention claimed is:
1. A lighting device comprising:
a light source;
a light guide plate including:
 a light entering end surface through which light from the light source enters, the light entering end surface being at least a section of an outer peripheral end surface of the light guide plate; and
 a light exiting plate surface through which the light exits, the light exiting plate surface being any of plate surfaces of the light guide plate;
at least one main wavelength converter extending along a length direction of the light entering end surface, interposed between the light source and the light entering end surface, and including a phosphor configured to wavelength-convert the light from the light source; and a secondary wavelength converter provided in at least an end portion of the main wavelength converter in the length direction to wavelength-convert the light from the light source;

wherein the light source is configured to emit blue light;

wherein the at least one main wavelength converter includes a phosphor containing portion and a phosphor non-containing portion, the phosphor containing portion includes a red phosphor and a green phosphor, the red phosphor is configured to emit red light when excited by the blue light from the light source, the green phosphor is configured to emit green light when excited by the blue light from the light source, the phosphor non-containing portion is at an end in a length direction of the main wavelength converter;

wherein the secondary wavelength converter has a sheet shape;

wherein the secondary wavelength converter overlaps at least the phosphor non-containing portion of the main wavelength converter;

wherein the secondary wavelength converter includes a wavelength conversion layer and protection layers that sandwich the wavelength conversion layer; and wherein the wavelength conversion layer includes another red phosphor configured to emit red light when excited by the blue light that is not converted by the main wavelength converter and another green phosphor configured to emit green light when excited by the blue light that is not converted by the main wavelength converter.

2. The lighting device according to claim 1, wherein the secondary wavelength converter is arranged to overlap with at least a light-guide-plate-side surface of an outer surface of the end portion.

3. The lighting device according to claim 1, wherein the secondary wavelength converter is arranged to overlap with at least a light-source-side surface of an outer surface of the end portion.

4. The lighting device according to claim 1, wherein
the at least one main wavelength converter includes a plurality of main wavelength converters arranged in the length direction, and
the secondary wavelength converter is arranged to extend over adjacent end portions of the plurality of main wavelength converters.

5. The lighting device according to claim 1, wherein the secondary wavelength converter is arranged to overlap with at least an end surface of an outer surface of the end portion in the length direction.

6. The lighting device according to claim 1, wherein the secondary wavelength converter is arranged to overlap with at least any one of a surface of an outer surface of the end portion on a side identical to the light exiting plate surface of the light guide plate or a surface of the outer surface of the end portion on an opposite side of the light exiting plate surface.

7. A display device comprising:
the lighting device according to claim 1; and
a display panel configured to display an image by means of light emitted from the lighting device.

8. A television device comprising:
the display device according to claim 7.

* * * * *